(12) United States Patent
Clayton et al.

(10) Patent No.: US 12,449,133 B2
(45) Date of Patent: *Oct. 21, 2025

(54) AUTOMATIC OVEN

(71) Applicant: WHIRLPOOL CORPORATION, Benton Harbor, MI (US)

(72) Inventors: Alexander L. Clayton, St. Joseph, MI (US); Vince Huang, Shenzhen (CN); Xiangxu Liu, Shenzhen (CN); Ken Lei, Shenzhen (CN); Hanks Hu, Shenzhen (CN); Juan Chen, Norrkoping (SE); Tracy Yu, Shenzhen (CN); Jack Li, Shenzhen (CN); Roy Qiu, Shenzhen (CN); Seth Herndon, Benton Harbor, MI (US); Donald John Gilmore, Berrien Springs, MI (US); Cristiano Vito Pastore, Comerio (IT); Dick Ge, Shenzhen (CN); Pallavi Manjrekar, Stevensville, MI (US); Bruce M. Wiatrak, Bolingbrook, IL (US); Andrea Ferrise, Benton Harbor, MI (US); Blake Cartwright, Benton Harbor, MI (US); Richard J. Hughes, Coloma, MI (US); Joel Fletty, Benton Harbor, MI (US); Wyndham F. Gary, Jr., Whitefish Bay, WI (US); Joshua G. Abdoo, Stevensville, MI (US); Collin A. Stipe, West Unity, OH (US); Nicholas Brenn, St. Joseph, MI (US); Casey L. McCuan, St. Joseph, MI (US); Christopher L. Carpenter, Pearisburg, VA (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,052

(22) Filed: Aug. 17, 2023

(65) Prior Publication Data

US 2023/0392796 A1    Dec. 7, 2023

Related U.S. Application Data

(60) Continuation of application No. 17/319,727, filed on May 13, 2021, now Pat. No. 11,767,983, which is a
(Continued)

(51) Int. Cl.
*F24C 7/08*    (2006.01)
*A21B 1/06*    (2006.01)
(Continued)

(52) U.S. Cl.
CPC ............... *F24C 7/085* (2013.01); *A21B 1/06* (2013.01); *A21B 1/40* (2013.01); *A21B 3/02* (2013.01)

(58) Field of Classification Search
CPC . A21B 1/40; A21B 1/06; F24C 15/006; F24C 7/046; F24C 7/085
See application file for complete search history.

(56) References Cited

U.S. PATENT DOCUMENTS 3,257,921 A    6/1966  Gorey
3,882,843 A *  5/1975  Barnett ................. F24C 15/006
                                        126/21 A
(Continued)

FOREIGN PATENT DOCUMENTS

CN    109330356 A    2/2019
EP      0512716 A1   11/1992
(Continued)

OTHER PUBLICATIONS

SCIO Brochure, ConsumerPhysics, www.consumerphysics.com/business, 4 pages, accessed Jun. 5, 2018.
(Continued)

*Primary Examiner* — Thien S Tran
(74) *Attorney, Agent, or Firm* — McGarry Bair PC

(57) ABSTRACT

A cooking appliance having a cabinet including an insert within the cabinet to define cooking chamber with an access opening and a door selectively closing/opening the access
(Continued)

opening, the cooking appliance comprising at least one of a first cooling flow path through a back wall of the cabinet, over a top wall of the insert, and out a side wall of the cabinet, a second cooling flow path through a bottom wall of the cabinet, along the bottom wall of the cabinet, and out a side wall of the cabinet, and a third cooling flow path through a bottom wall of the cabinet, out a front wall of the cabinet, into the door, out of the door, into a front wall of the cabinet, and out of a side wall of the cabinet.

19 Claims, 50 Drawing Sheets

Related U.S. Application Data division of application No. 16/240,224, filed on Jan. 4, 2019, now Pat. No. 11,047,578.

(51) Int. Cl.
*A21B 1/40* (2006.01)
*A21B 3/02* (2006.01)

(56) References Cited

U.S. PATENT DOCUMENTS

| | | | |
|---|---|---|---|
| 3,889,100 A | 6/1975 | Dills | |
| 3,911,893 A * | 10/1975 | Baker | F24C 15/006 126/198 |
| 4,180,049 A * | 12/1979 | Carr | H05B 6/642 219/400 |
| 4,184,945 A | 1/1980 | Morgan et al. | |
| 4,332,992 A * | 6/1982 | Larsen | H05B 6/766 219/400 |
| 5,193,520 A * | 3/1993 | Gostelow | F24C 15/006 126/198 |
| 5,204,503 A * | 4/1993 | Maiellano, Jr. | H05B 6/766 219/400 |
| 5,441,036 A * | 8/1995 | Mikalauskas, II | F24C 15/006 126/200 |
| 5,814,793 A * | 9/1998 | Yu | H05B 6/6473 219/757 |
| 6,034,607 A | 3/2000 | Vidaillac | |
| 6,864,472 B2 | 3/2005 | Kang | |
| 6,940,554 B2 | 9/2005 | Robins et al. | |
| 7,228,857 B2 * | 6/2007 | Kim | F24C 15/04 219/391 |
| 7,235,763 B2 * | 6/2007 | Christiaansen | H05B 6/6485 219/460.1 |
| 7,296,565 B2 | 11/2007 | Kim et al. | |
| 7,348,527 B2 | 3/2008 | Braunisch et al. | |
| 7,537,003 B2 | 5/2009 | Iwamoto | |
| 7,650,881 B2 * | 1/2010 | Brown | F24C 15/006 126/21 R |
| 7,696,454 B2 | 4/2010 | Nam et al. | |
| 7,766,436 B1 | 8/2010 | Steinkuhl et al. | |
| 7,856,973 B2 | 12/2010 | Kim et al. | |
| 8,101,891 B2 * | 1/2012 | Lee | F24C 15/02 219/400 |
| 8,141,549 B2 | 3/2012 | Armstrong et al. | |
| 8,164,036 B2 | 4/2012 | Lee | |
| 8,168,928 B2 * | 5/2012 | Kim | F24C 7/08 219/757 |
| 8,178,142 B2 | 5/2012 | Greiner et al. | |
| 8,208,043 B2 | 6/2012 | Deng et al. | |
| 8,563,059 B2 | 10/2013 | Luckhardt et al. | |
| 8,835,810 B2 | 9/2014 | Moon | |
| 8,931,400 B1 | 1/2015 | Allen | |
| 9,291,504 B2 | 3/2016 | Goldring et al. | |
| 9,414,444 B2 | 8/2016 | Libman et al. | |
| 9,420,641 B2 | 8/2016 | Corona et al. | |
| 9,494,322 B2 | 11/2016 | Luckhardt et al. | |
| 9,528,972 B2 | 12/2016 | Minvielle | |
| 9,578,694 B2 * | 2/2017 | Meusburger | H05B 6/6423 |
| 9,644,847 B2 | 5/2017 | Bhogal et al. | |
| 9,927,129 B2 * | 3/2018 | Bhogal | F24C 7/086 |
| 9,933,166 B2 | 4/2018 | Matarazzi et al. | |
| 9,936,706 B2 * | 4/2018 | Deming | A21D 8/06 |
| 9,980,321 B2 | 5/2018 | Sorenson et al. | |
| 10,024,544 B2 | 7/2018 | Bhogal et al. | |
| 10,064,244 B2 | 8/2018 | Cheng et al. | |
| 10,066,839 B2 * | 9/2018 | Lee | F24C 15/08 |
| 10,085,592 B1 | 10/2018 | Cheng | |
| 10,154,548 B2 * | 12/2018 | Nishijima | H05B 6/642 |
| 10,914,473 B2 * | 2/2021 | Kim | F24C 15/2014 |
| 11,047,578 B2 * | 6/2021 | Clayton | F24C 7/046 |
| 11,767,983 B2 * | 9/2023 | Clayton | F24C 15/006 99/331 |
| 2005/0133503 A1 * | 6/2005 | Kim | H05B 6/6414 219/757 |
| 2007/0267402 A1 * | 11/2007 | Harned | F24C 15/026 219/408 |
| 2008/0134903 A1 * | 6/2008 | Kim | F24C 15/02 99/324 |
| 2009/0008379 A1 | 1/2009 | Ingemanson | |
| 2010/0046577 A1 | 2/2010 | Sheard et al. | |
| 2013/0153569 A1 * | 6/2013 | Ueki | F24C 15/006 219/757 |
| 2013/0255655 A1 * | 10/2013 | Johnson | F24C 15/2007 126/15 A |
| 2013/0308678 A1 | 11/2013 | Bach et al. | |
| 2014/0026762 A1 | 1/2014 | Riefenstein | |
| 2015/0260413 A1 | 9/2015 | Chadwick et al. | |
| 2015/0302569 A1 | 10/2015 | Armstrong et al. | |
| 2015/0330640 A1 | 11/2015 | Stork Genannt Wersborg | |
| 2015/0366219 A1 | 12/2015 | Stork Genannt Wersborg | |
| 2016/0004144 A1 | 1/2016 | Laroia et al. | |
| 2016/0005327 A1 | 1/2016 | Young et al. | |
| 2016/0123818 A1 | 5/2016 | Van Rens et al. | |
| 2016/0213189 A1 | 7/2016 | Yoon et al. | |
| 2016/0309548 A1 | 10/2016 | Libman et al. | |
| 2016/0327281 A1 | 11/2016 | Bhogal et al. | |
| 2016/0345390 A1 | 11/2016 | Corona et al. | |
| 2016/0348918 A1 * | 12/2016 | Bhogal | F24C 15/04 |
| 2017/0020324 A1 | 1/2017 | Young et al. | |
| 2017/0074522 A1 | 3/2017 | Cheng | |
| 2017/0139385 A1 | 5/2017 | Young et al. | |
| 2017/0150842 A1 | 6/2017 | Young et al. | |
| 2017/0162073 A1 | 6/2017 | Young et al. | |
| 2017/0176019 A1 | 6/2017 | Bhogal et al. | |
| 2017/0211815 A1 | 7/2017 | Padula | |
| 2017/0223774 A1 | 8/2017 | Cheng et al. | |
| 2017/0343220 A1 | 11/2017 | Ha et al. | |
| 2018/0009703 A1 | 1/2018 | Hayashi et al. | |
| 2018/0023817 A1 | 1/2018 | Johnson et al. | |
| 2018/0058702 A1 | 3/2018 | Jang et al. | |
| 2018/0063900 A1 | 3/2018 | Minvielle et al. | |
| 2018/0156467 A1 | 6/2018 | Bhogal et al. | |
| 2018/0202667 A1 | 7/2018 | Cheng | |
| 2018/0295676 A1 | 10/2018 | Cheng et al. | |
| 2019/0000267 A1 | 1/2019 | Li et al. | |

FOREIGN PATENT DOCUMENTS

| | | |
|---|---|---|
| EP | 2674013 B1 | 5/2017 |
| EP | 2454528 B1 | 11/2017 |
| ES | 1060617 | 10/2005 |
| FR | 2726633 A1 | 5/1996 |
| FR | 2779510 A1 | 12/1999 |
| GB | 2100978 A1 | 1/1983 |
| GB | 2262601 A | 6/1993 |
| KR | 100214592 B1 | 8/1999 |
| KR | 20140051153 A | 4/2014 |
| RU | 110892 U1 | 11/2011 |
| WO | 1999042883 A1 | 8/1999 |
| WO | 2011010824 A2 | 1/2011 |
| WO | 12062890 A2 | 5/2012 |

(56) References Cited

FOREIGN PATENT DOCUMENTS

| WO | 2017056516 A1 | 4/2017 |
| WO | 2018153690 A1 | 8/2018 |

OTHER PUBLICATIONS

Definition of Term: Modulation Transfer Function, retrieved from http://www.digitizationguidelines.gov/term.php?term=modulationtransferfunction, accessed Oct. 3, 2018.
Wikipedia Definition of Term: Optical Transfer Function, retrieved from https://en.wikipedia.org/wiki/Optical_transfer_function, Jan. 2, 2018.
Consumer Physics Business Resources page, retrieved from https://www.consumerphysics.com/business/resources/, accessed Mar. 20, 2019.
Copper Chef Crisper Tray, retrieved from https://www.amazon.com/Copper-Chef-Crisper-Tray-Transform/dp/B01N3JX20L, accessed Nov. 28, 2018.
Crisp 'N Bake Air Fry Toaster Oven, retrieved from http://www.blackanddeckerappliances.com/products/cooking-appliances/convection-and-toaster-ovens/to3215ss-crisp-n-bake-air-fry-toaster-oven.aspx, accessed Nov. 28, 2018.
European Search Report for Counterpart EP20150259.8, 13 Pages, Dated May 4, 2021.

\* cited by examiner

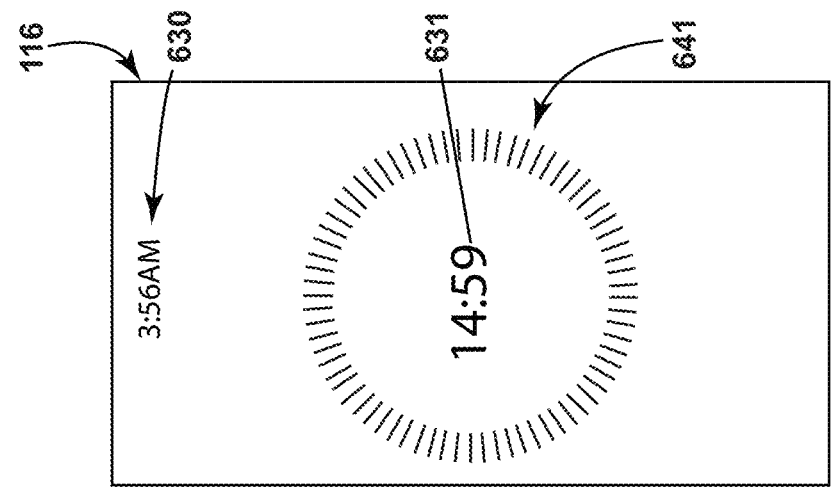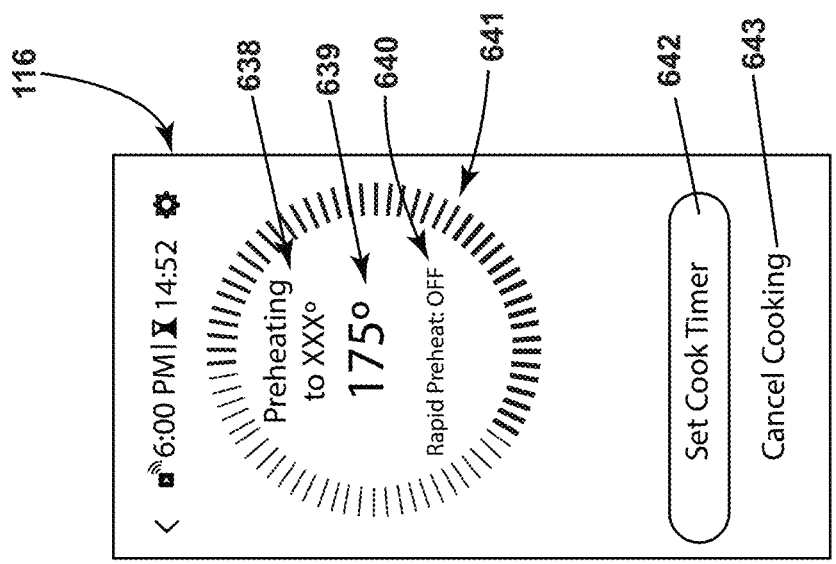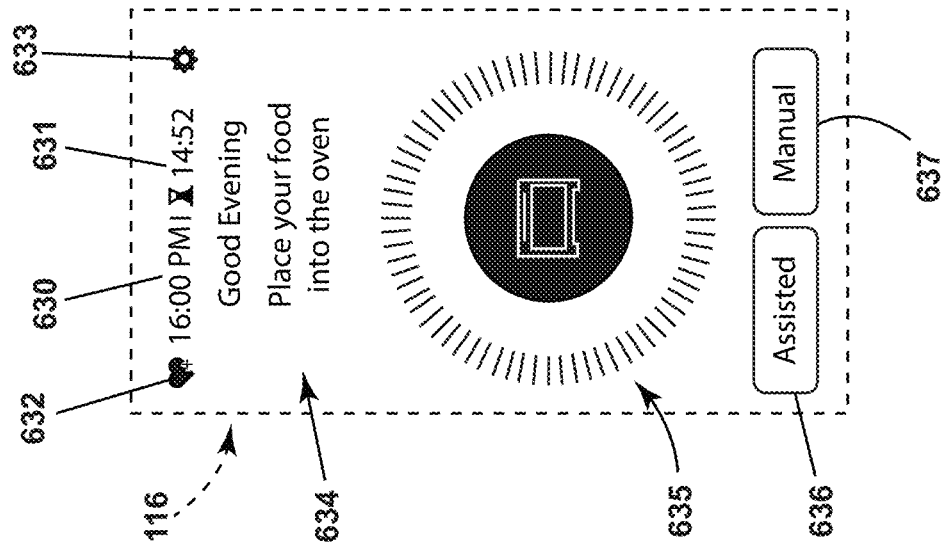

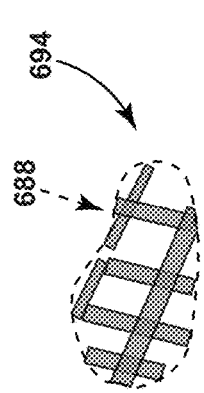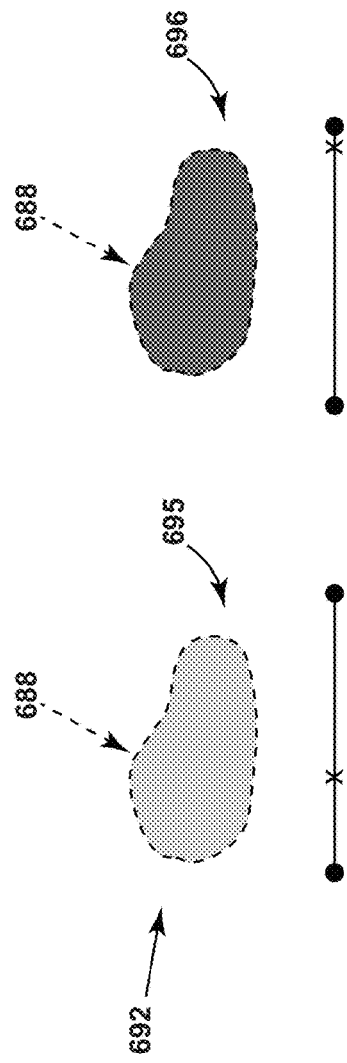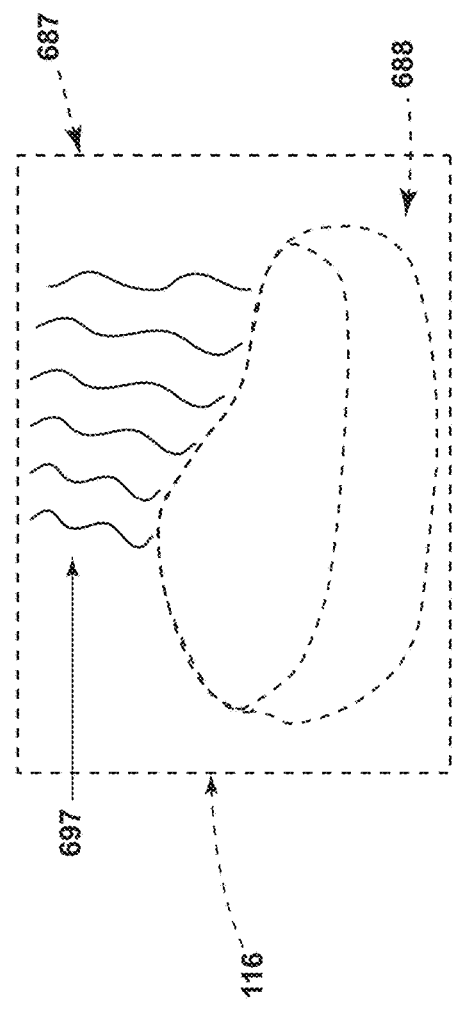
FIG. 34A
FIG. 34B
FIG. 34C

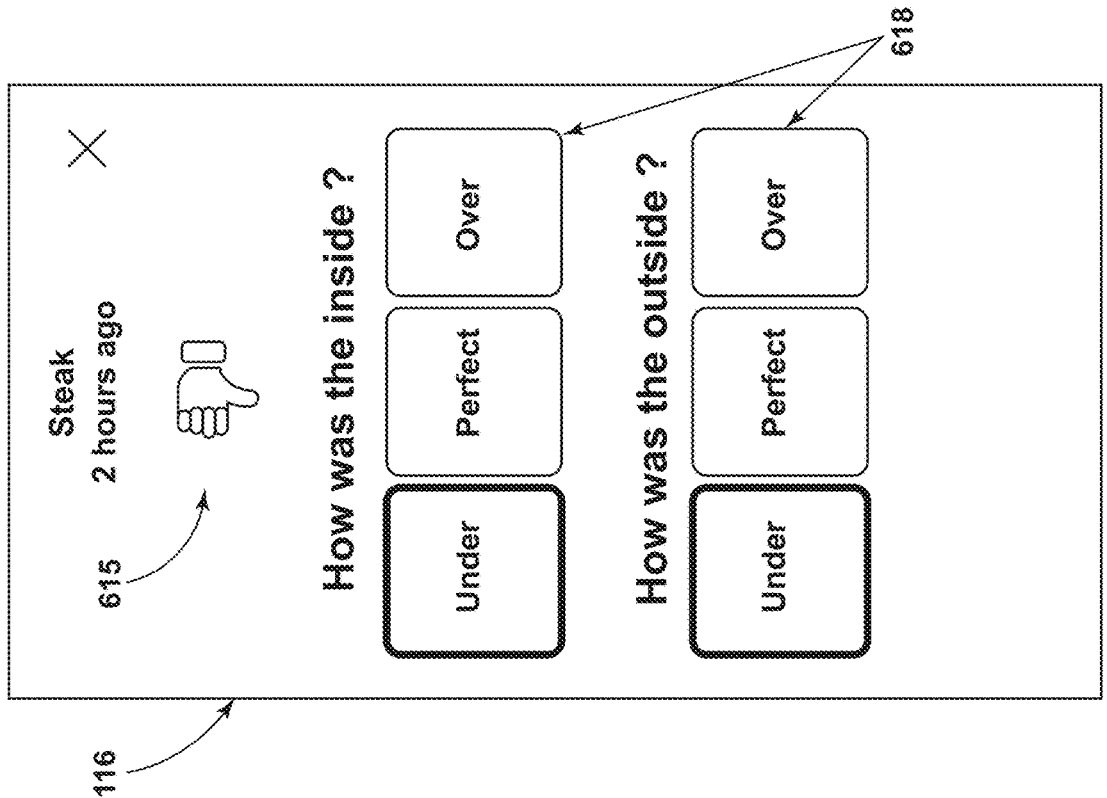
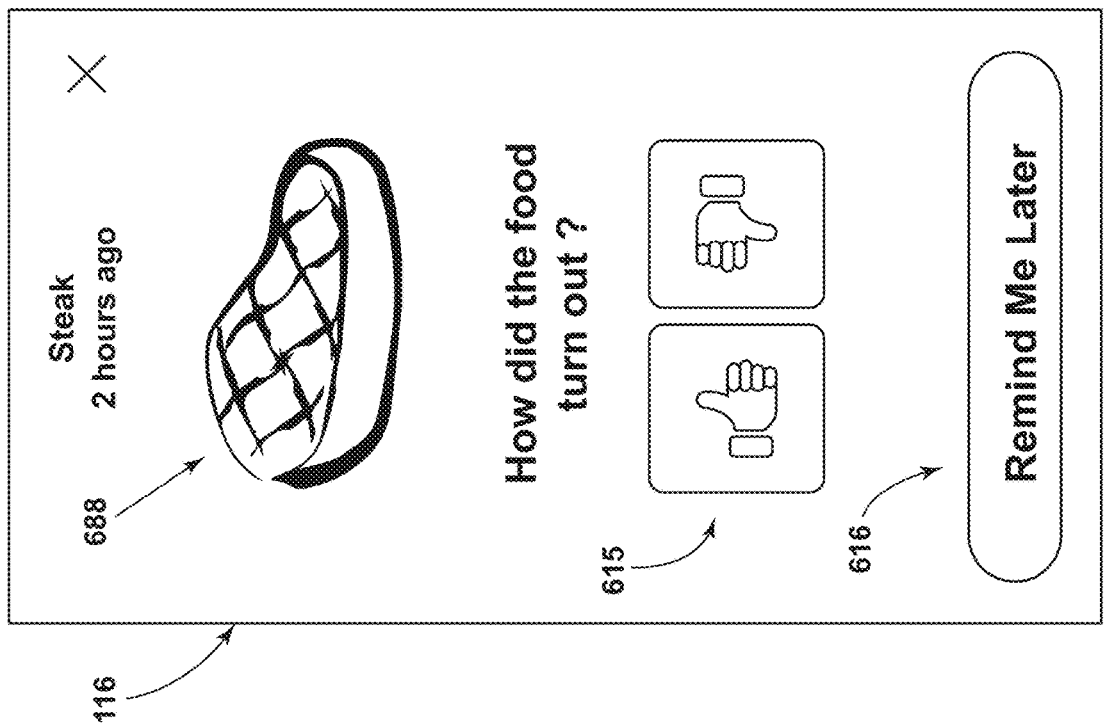
FIG. 35B
FIG. 35A

AUTOMATIC OVEN

CROSS-REFERENCE TO RELATED APPLICATIONS

The application is a continuation application of U.S. patent application Ser. No. 17/319,727, filed May 13, 2021, now U.S. Pat. No. 11,767,983, issued Sep. 26, 2023, which is a divisional application of U.S. patent application Ser. No. 16/240,224, filed Jan. 4, 2019, now U.S. Pat. No. 11,047,578, issued June 29,2021, both of which are hereby incorporated herein by reference in their entirety.

BACKGROUND

Cooking appliances, such as ovens, are commonly used to cook a variety of food items which can vary in not only the type of food item, but also the amount of the food item. Different food items can also require different or special cooking methods for degree of doneness, which can vary based on consumer preference.

Some consumers are known to have a lack of understanding of how to cook a particular type of food. Similarly, some consumers find it difficult to estimate a particular amount of food. The lack of understanding of how to cook a particular type of food and inaccuracy in estimating an amount of a particular type of food, can lead to a consumer erroneously programming a cooking appliance to accomplish the desired cooking and finish of the food type.

Automatic cooking appliances, such as automatic ovens, are starting to appear in the marketplace. Such automatic cooking appliances intend to remove the burdens of cooking from the consumer by automatically detecting the type, amount, and initial state, of the food item and then automatically cooking the food item, which can be done in accordance with a consumer input preference.

BRIEF SUMMARY

In one aspect, the present disclosure relates to a method of cooling a cooking appliance having a cabinet including an insert within the cabinet to define cooking chamber with an access opening and a door selectively closing/opening the access opening, the method comprising at least one of flowing cooling air through a back wall of the cabinet, over a top wall of the insert, and out a side wall of the cabinet to define a first cooling flow path, flowing cooling air through a bottom wall of the cabinet, along the bottom wall of the cabinet, and out a side wall of the cabinet to define a second cooling flow path, and flowing cooling air through a bottom wall of the cabinet, out a front wall of the cabinet, into the door, out of the door, into a front wall of the cabinet, and out of a side wall of the cabinet to define a third cooling flow path.

In another aspect, the present disclosure relates to a cooking appliance having a cabinet including an insert within the cabinet to define cooking chamber with an access opening and a door selectively closing/opening the access opening, the cooking appliance comprising at least one of a first cooling flow path through a back wall of the cabinet, over a top wall of the insert, and out a side wall of the cabinet, a second cooling flow path through a bottom wall of the cabinet, along the bottom wall of the cabinet, and out a side wall of the cabinet, and a third cooling flow path through a bottom wall of the cabinet, out a front wall of the cabinet, into the door, out of the door, into a front wall of the cabinet, and out of a side wall of the cabinet.

BRIEF DESCRIPTION OF THE DRAWINGS

FIGS. 30A-30C are a set of exemplary interactive displays demonstrating a view of available interaction screens of the human machine interface.

FIGS. 34A-34C are a set of exemplary interactive displays demonstrating overlaying an image based on a set of cooking options of the human machine interface.

FIGS. 35A-35B are a set of exemplary interactive displays demonstrating a new of a feedback interactive screen of the human machine interface.

DETAILED DESCRIPTION

Figure 1:
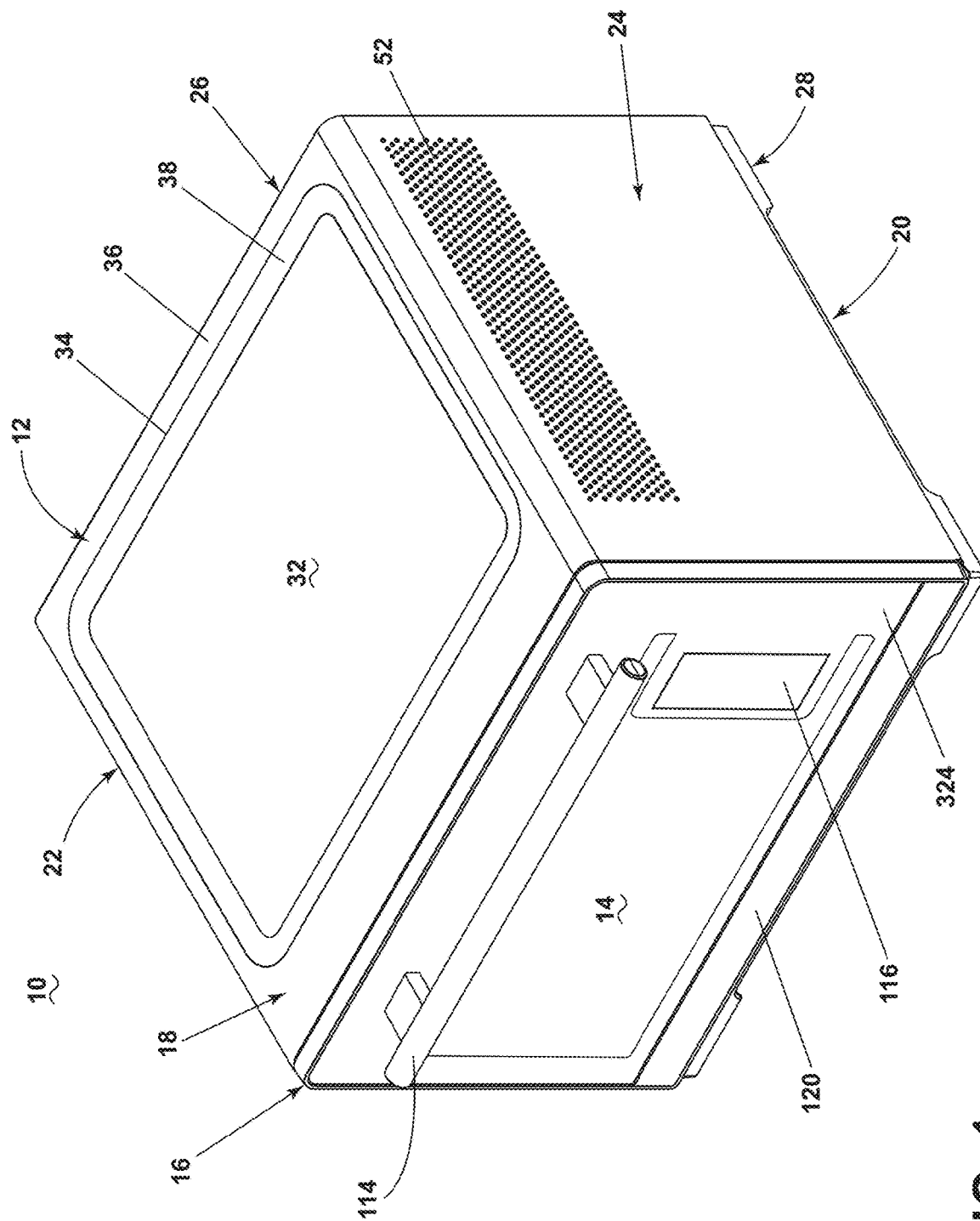
FIG. 1 is a perspective view of an oven with a closed door.

FIGS. 1-8 provide an overview of the automatic oven 10, which is the subject of this description. FIG. 1 is a perspective view of the automatic oven 10 and illustrates the primary structure of the oven 10 including a cabinet 12 defining an interior 14, which is selectively accessible through a door 16. The cabinet 12 includes a top wall 18, bottom wall 20, left side wall 22, right side wall 24, and rear wall 26. A pedestal 28 extends from the bottom wall 20.

Figure 2:
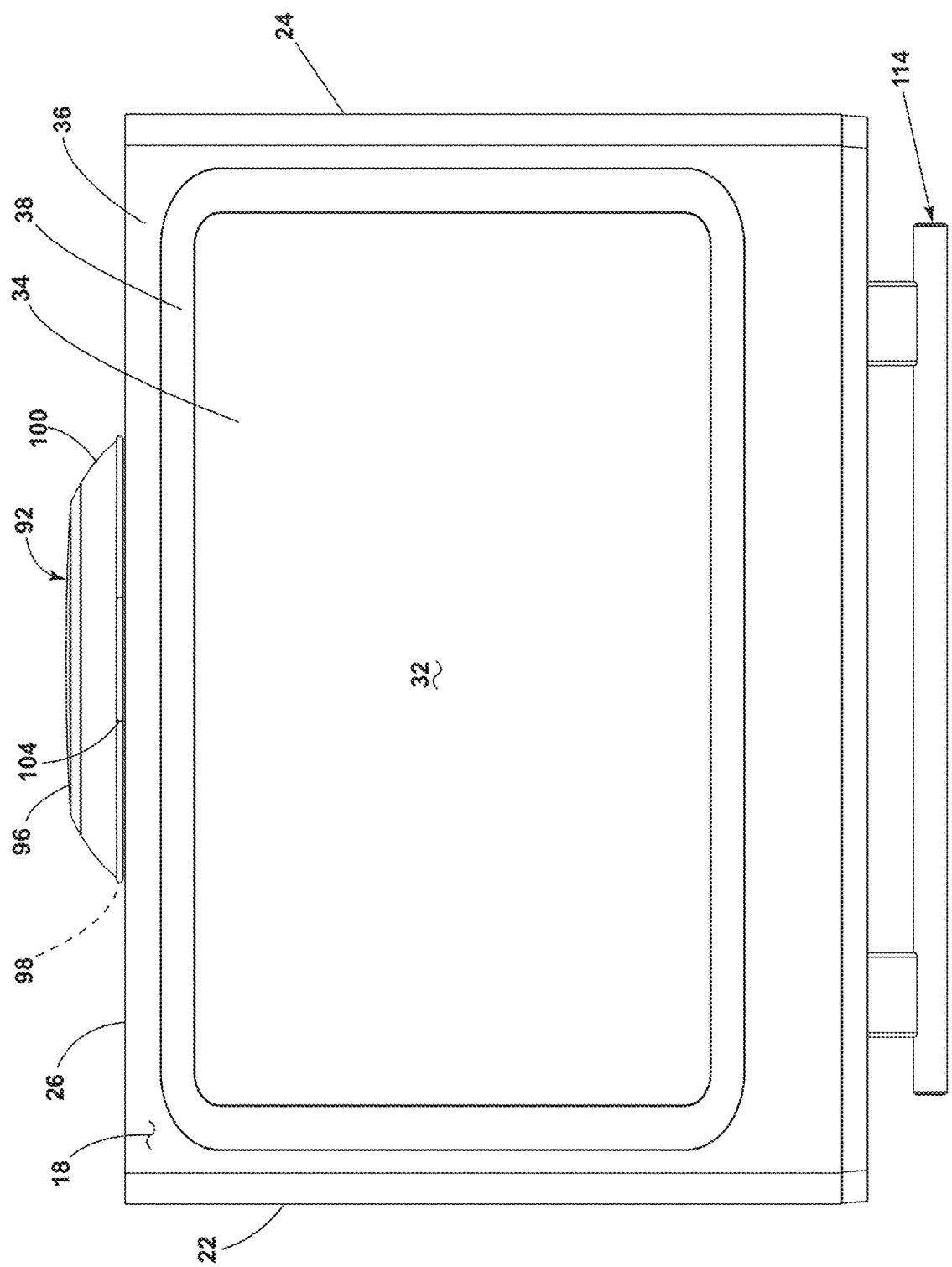
FIG. 2 is a top view of the oven of FIG. 1.

Referring to FIG. 2, a top view of the oven 10 illustrates that the top wall 18 comprises an accessory seat 32 in the form of a recess 34 provided in an otherwise generally planar upper surface 36 of the top wall 18. A bevel or similarly sloped surface forms the transition from the upper surface 36 to a recess wall 38 (for example, defined by the bevel) to form the recess 34. While the upper surface 36 is shown unadorned, the upper surface 36 can have a decorative texture or pattern. The bevel and recess wall 38 can also be unadorned or have a decorative texture or pattern, which can be the same or different than the upper surface 36.

Figure 3:
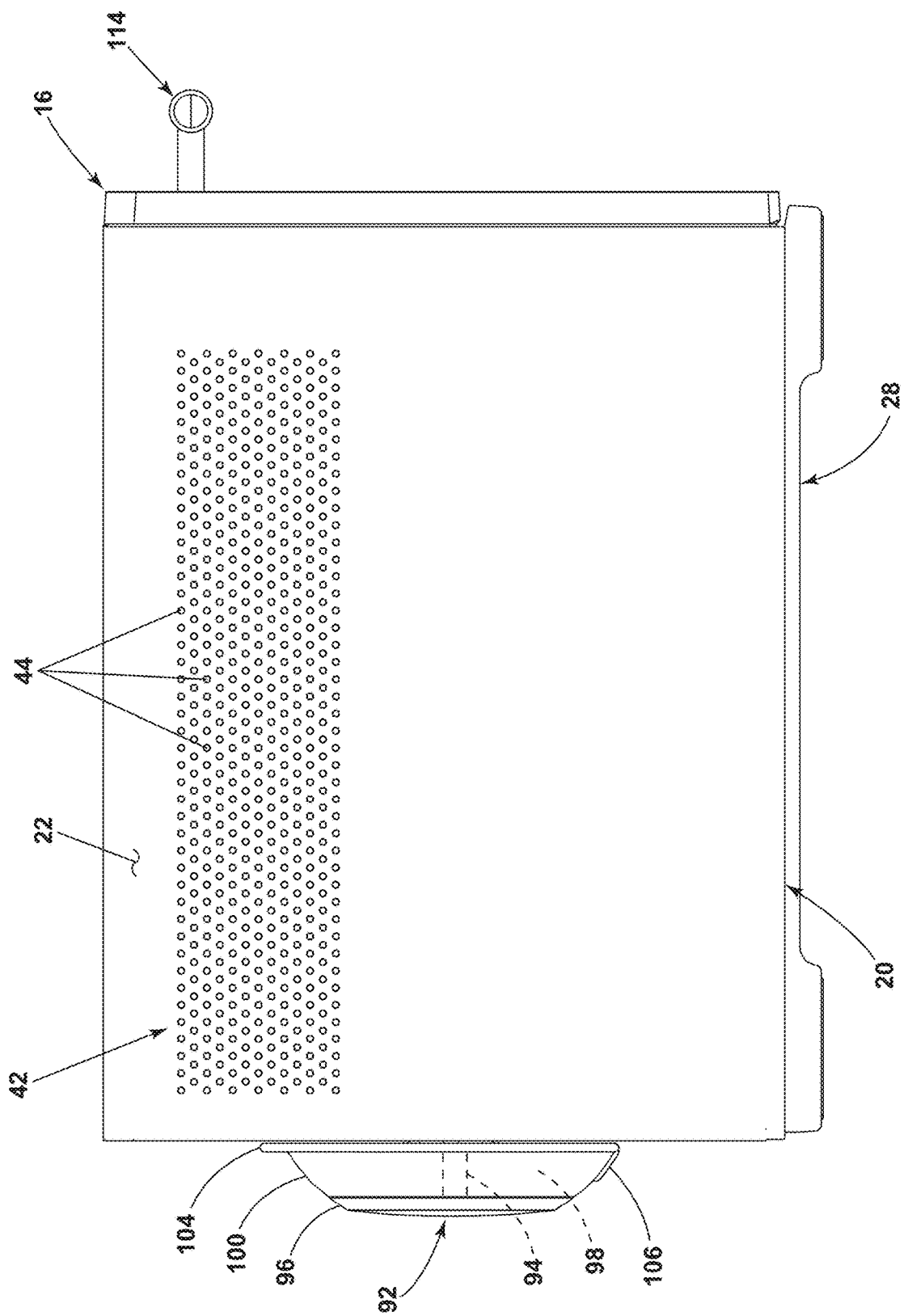
FIG. 3 is a left side view of the oven of FIG. 1.

Referring to FIG. 3, a left side view of the oven 10 illustrates the left side wall 22 has a left side vent 42 formed by a plurality of through openings 44, which are arranged in offset, horizontal rows. While the left side vent 42 is formed by through openings 44, other structures are contemplated, such as louvers, or a combination of through openings 44 and dimples, with it contemplated, but not necessary, that the dimples are complementary in size with the through openings 44. Also, the through openings 44 are arranged to form a rectangular shape, but other arrangements and shapes are contemplated. Similarly, the through openings 44 are circular but other cross sections are contemplated and include, without limitation, square, triangular, ovate, polygonal, or irregular.

Figure 4:
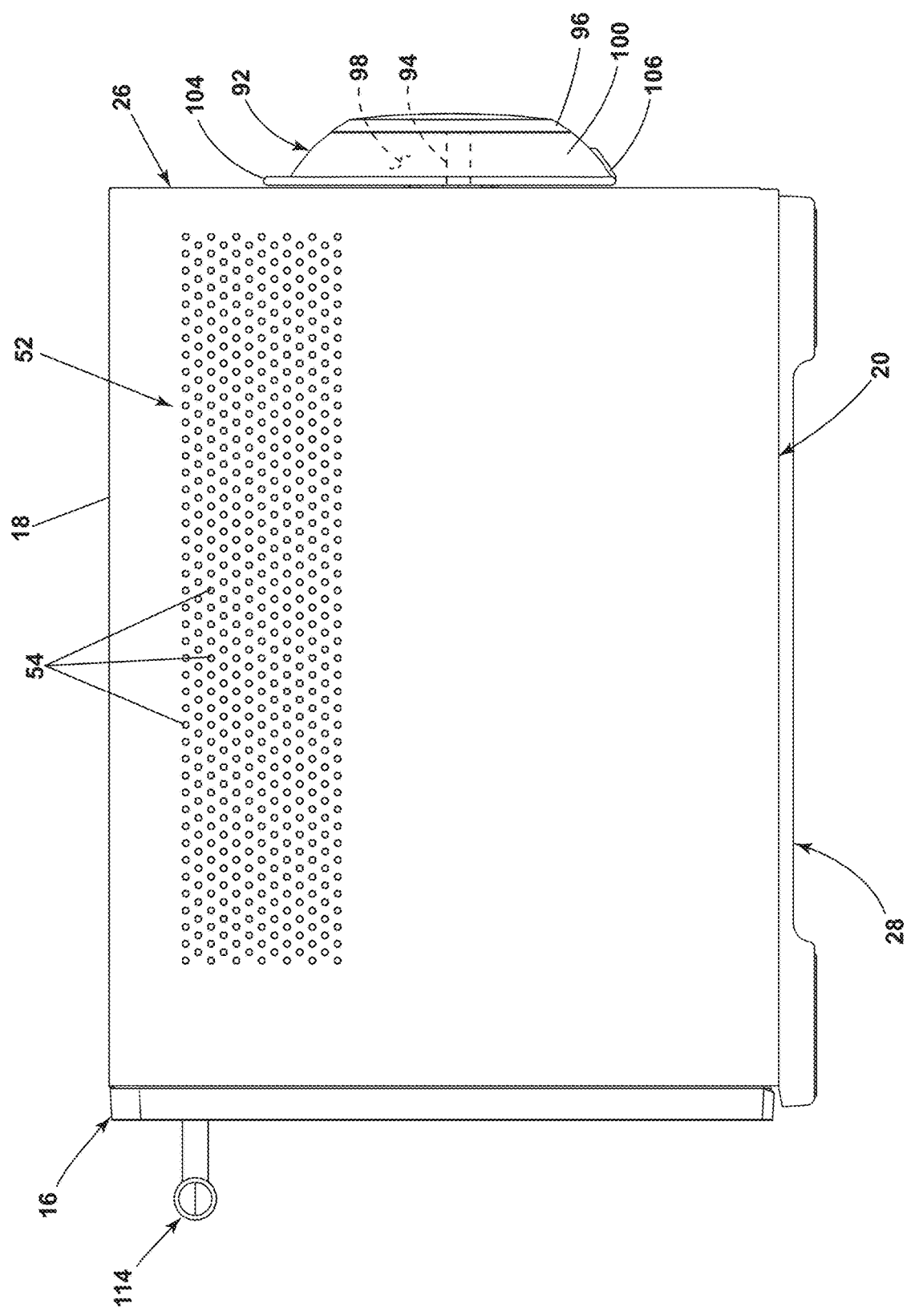
FIG. 4 is a right side view of the oven of FIG. 1.

Referring to FIG. 4, a right side view of the oven 10 illustrates that the right side wall 24, as illustrated, is a mirror image of the left side wall 22, and includes a right side vent 52 with through openings 54. Therefore, the description of the left side wall 22 applies equally as well to the right side wall 24.

While the right side wall 24 and left side wall 22 are illustrated as mirror images of each other, it is contemplated that they can be different, including having different vent structures and/or vent configurations and/or through hole arrangements. While the surfaces of the left side wall 22 and right side wall 24 are unadorned, it is contemplated that they can have a decorative texture or pattern.

Figure 5:
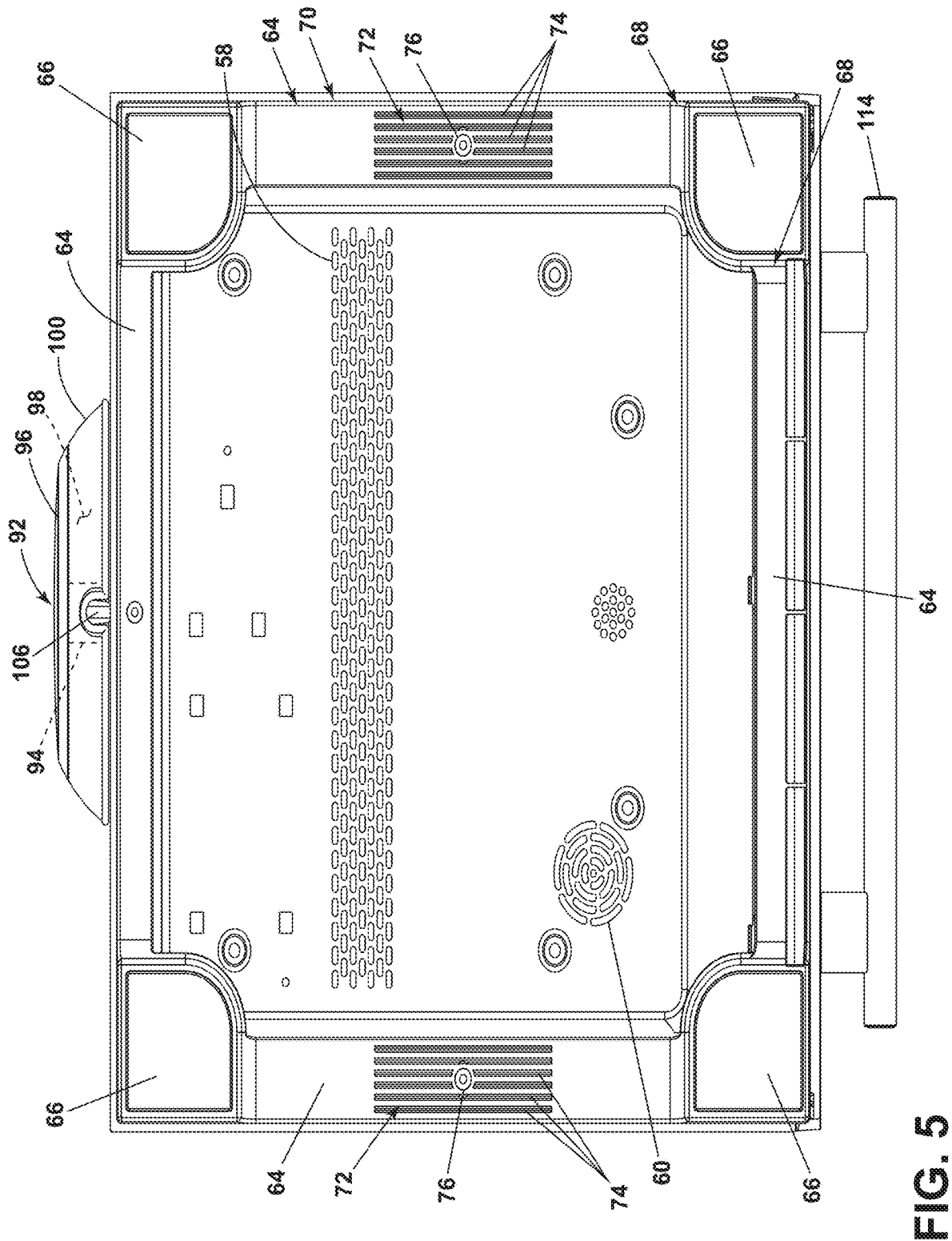
FIG. 5 is a bottom view of the oven of FIG. 1.

Referring to FIG. 5, a bottom view of the oven 10 illustrates the bottom wall 20, in combination with the attached pedestal 28, which is shown with two vents 58, 60, with the vent 60 being smaller than the vent 58 and located at the right-front corner of the cabinet 12, when viewed from the front. The vent 58 is larger than the vent 60 and substantially spans the width of the portion of the bottom wall 20 bounded by the pedestal 28. The vents 58, 60 are made of through openings 62 as previously described for the left and right side walls 22, 24, including the variations. The through openings 62 of the vent 60 are arranged in multiple concentric circles forming a disc while the through openings 62 of the vent 58 are arranged in offset rows forming a rectangle. While the surface of the bottom 20 is unadorned, it is contemplated that they can have a decorative texture or pattern.

The pedestal 28 comprises a frame 64 from which depend a plurality of feet 66. As illustrated the frame 64 is complementary to the shape of the bottom wall 20, with the feet 66 located at each corner of the frame 64. The frame 64 and feet 66 are illustrated as a monolithic structure, i.e. made from a single piece of material, with radius corners 68 forming transitions from the frame 64 to the feet 66. A chamfer 70 is provided about the periphery of the pedestal 28. Grips 72 in the form of spaced, longitudinal grooves 74 are formed in portions of the frame 64, such as along the portions adjacent the left and right side walls 22, 24 and aid a user in picking up the cabinet 12, such as while standing in front of the door 16. While the grips 72 can be provided as only including the longitudinal grooves 74 formed or molded within the frame 64, it will also be understood that the grips 72 can comprise an additional piece comprising the longitudinal grooves 74, such as, but not limited to, longitudinal grooves 74 included on a piece of a material having a high coefficient of friction, such as rubber. Fastening apertures 76 can be located within the grooves 74, which collectively provide an aesthetic cover for fasteners securing the pedestal 28 to the bottom wall 20, which aids in visually hiding any fasteners, while providing and aesthetic appearance to the pedestal 28.

While the pedestal 28 is contemplated to be a monolithic structure made from machined metal or injection molded as a single piece, the pedestal 28 can be a unitary structure, i.e. physically separate pieces secured together. The pedestal can have a color that is different from the top wall 18, left side wall 22, and right side wall 24. It is contemplated that the pedestal 28 is a bronze color, such as Sunset Bronze, while the top wall 18, left side wall 22, and right side wall 24 are black.

Figure 6:
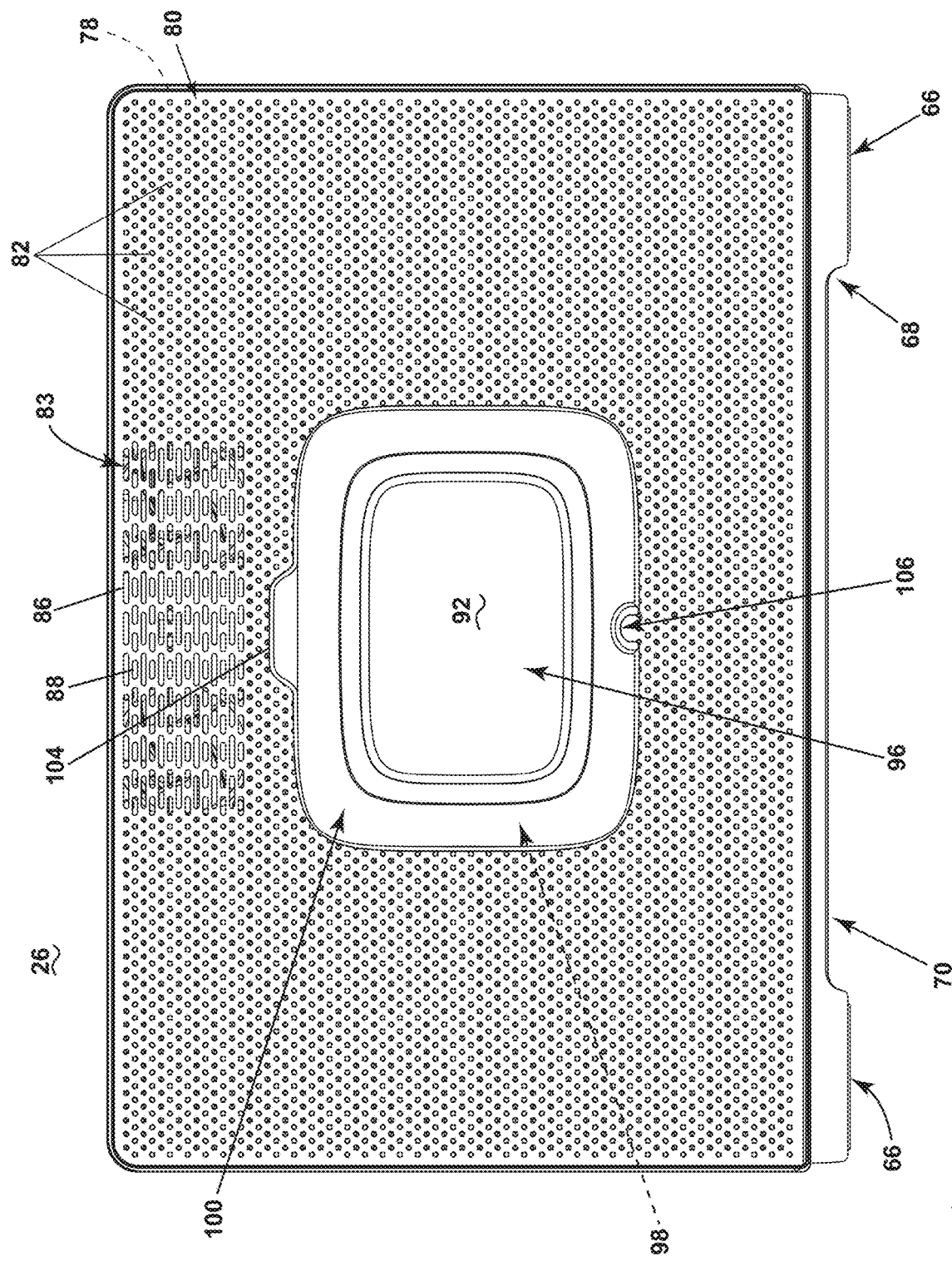
FIG. 6 is a rear view of the oven of FIG. 1.

Referring to FIG. 6, a rear view of the oven 10 illustrates that the rear wall 26 includes a structural wall 78 and a decorative outer panel 80, which hides any fasteners securing the structural wall to the rest of the cabinet 12, such that the rear wall 26 has an ornamental appearance. Embossments 82 are located on the outer panel 80 arranged in offset rows. The embossments 82 can have the same shape as those described for the through openings 44, 54 of the side walls 22, 24, with the obvious difference that embossments are not through openings, but are projections from the outer panel 80. In this way, the embossments 82 can have a complementary shape with the through openings 44, 54. Also, dimples could be used instead of the embossments 82. In such a substitution, the dimples would be identical to the embossments, except the dimples extend inwardly from the surface 80, whereas the embossments 82 extend outwardly.

A vent 84 is located in an upper-center portion of the rear wall 26. The vent 84 comprises through openings in the form of alternating rows of slots, with the slots 86 of one row being longer than the slots 88 of another row. Two of the longer slots 86 approximately equal the length of three of the shorter slots 88. The ratio of length between the longer and shorter slots 86, 88 is not limited to this ratio. The spacing between the slots in the alternating rows is such that the spaces between the slots do not line up in an uninterrupted column, although such an alignment is contemplated.

A cord wrap 92 is provided on the rear wall 26 and includes a stem 94 (FIG. 18D), extending from the rear wall 26, and an end plate 96 affixed to a distal end of the stem 94, along with a mounting bezel 97 (FIG. 18D), to form an annular cord space 98 (FIG. 18D) about the stem 94 and between the end plate 96 and the rear wall 26. A flexible flange 100 circumscribes the periphery of the end plate 96. As illustrated, the flexible flange 100 extends toward the rear wall 26 so as to at least partially, if not completely, overlie and hide the cord space 98, and, thereby, hide a cord 102 wrapped around the stem 94 and residing within the cord space 98.

A pull tab 104 can be provided on the flexible flange 100 to aid in deflecting the flexible flange 100 and uncover the cord space 98. A cord slot 106 can be formed in the flexible flange 100 to provide for the cord 102 to extend from under the flexible flange 100, without the need to flex the flexible flange 100.

Figure 7:
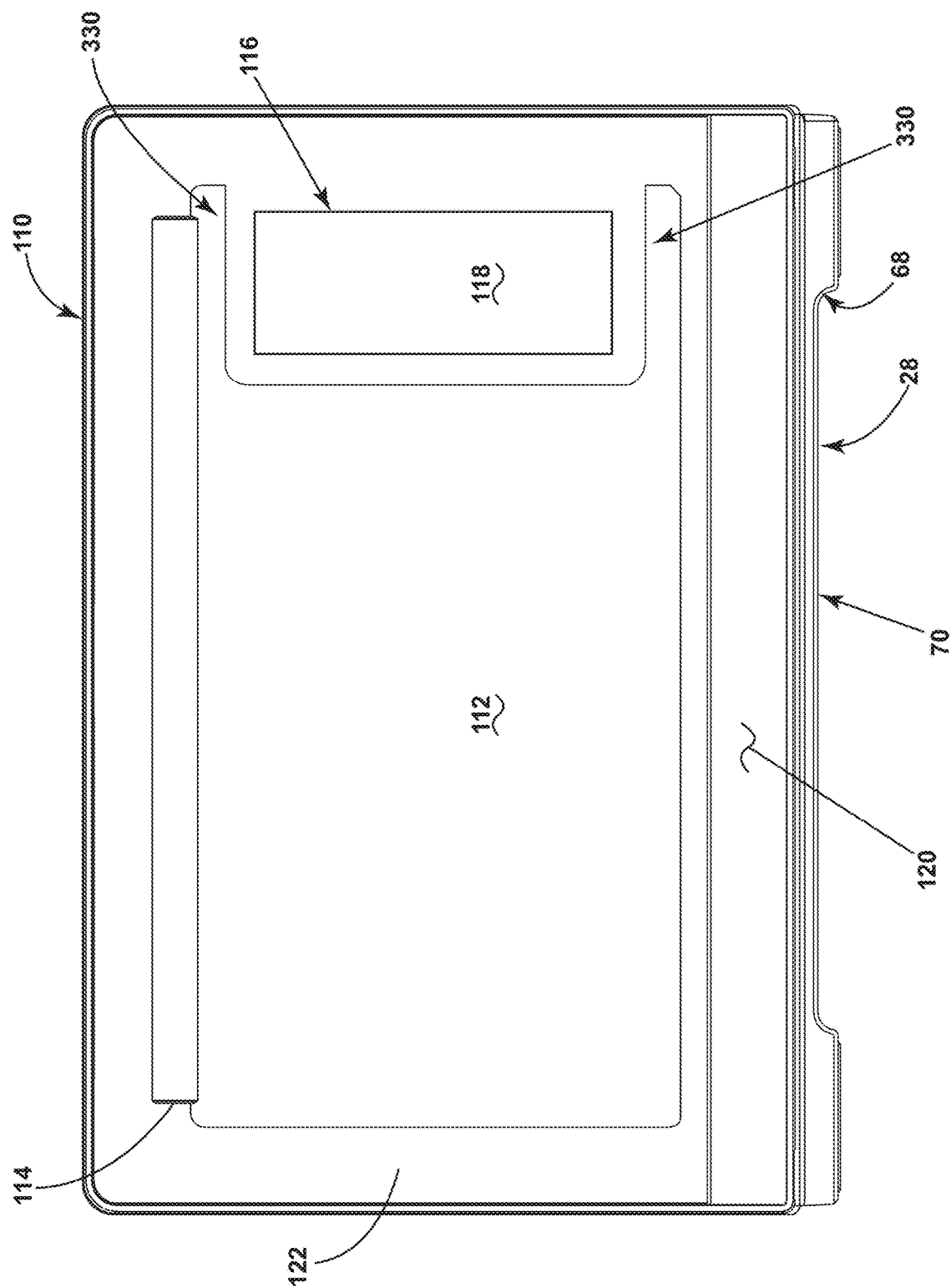
FIG. 7 is a front view of the oven of FIG. 1.

Referring to FIG. 7, a front view of the oven 10 illustrates the door 16 in a closed position. The door 16 includes a frame 110 bounding a window 112. A handle 114 is mounted to an upper portion of the window 112. A human machine interface ("HMI") 116 is also mounted to the window 112 and includes a display 118, which is visible through the window 112. A spacer or trim element 120 along the bottom of the window 112. The handle 114 can be made of the same metal and have the same texture, color, or finish as the pedestal 28. A mask 122 can be provided on portions of the window 112 to provide a border or boundary for either the window 112 or the HMI 116.

Figure 8:
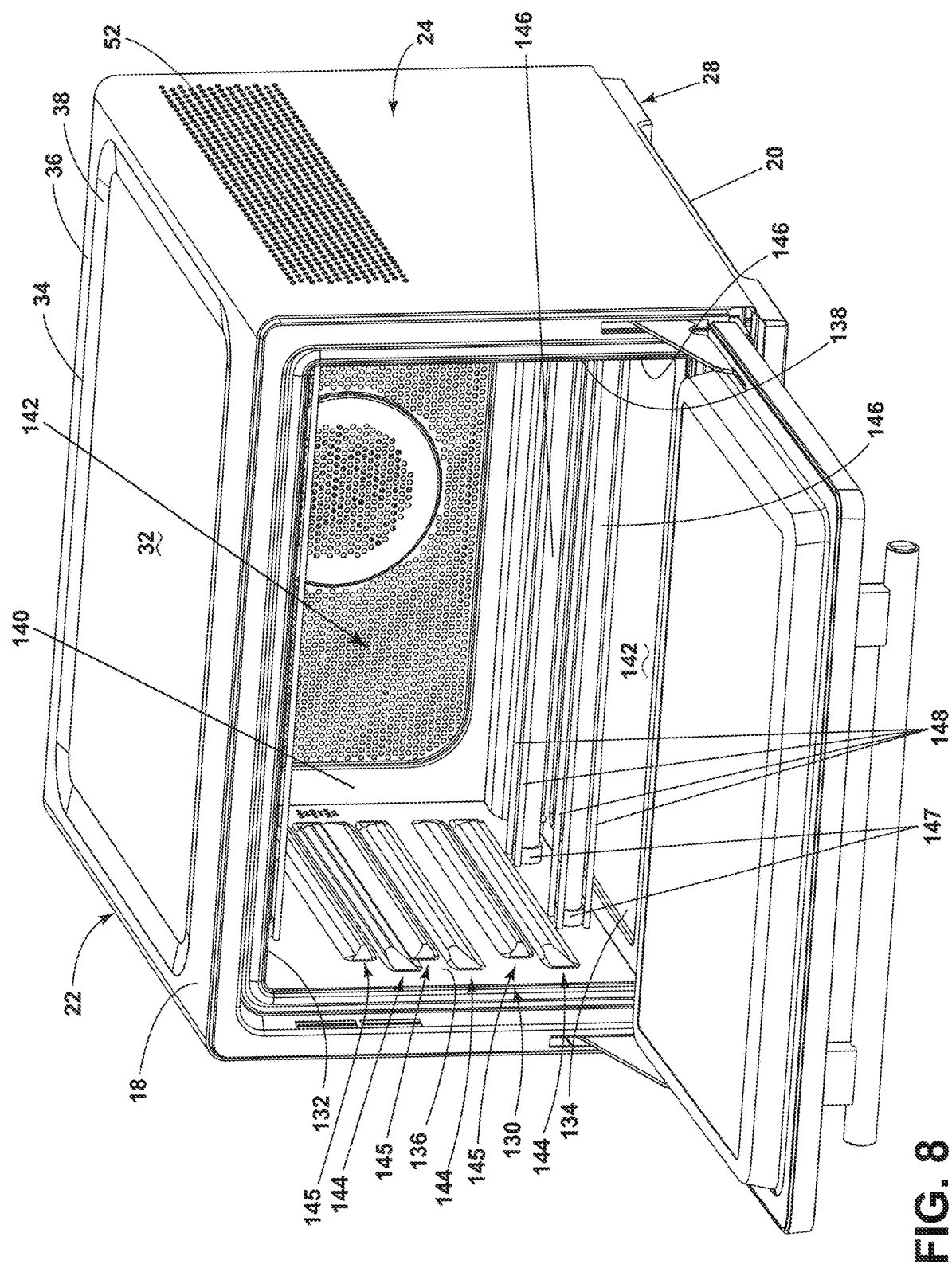
FIG. 8 is a front view of the oven of FIG. 1 with the door opened.

Referring to FIG. 8, a front view of the oven 10 is illustrated with the door 16 in an opened position with an empty interior 14. The interior 14 is formed by an insert 130 having top side 132, bottom side 134, left side 136, right side 138, and rear side 140, which collectively form a cooking chamber 142. Multiple rails 144, with corresponding upper stop rails 145, are integrally formed on the left and right sides 136, 138. Radiant heating elements 146 extend between the left and right sides 136, 138, along with protective bumpers in the form of rods 148. Insulators 147, illustrated as ceramic elements, support the heating elements 146 to the left and right sides 136, 138 to protect the sides 136, 138 from the heat of the heating elements 146.

Figure 9:
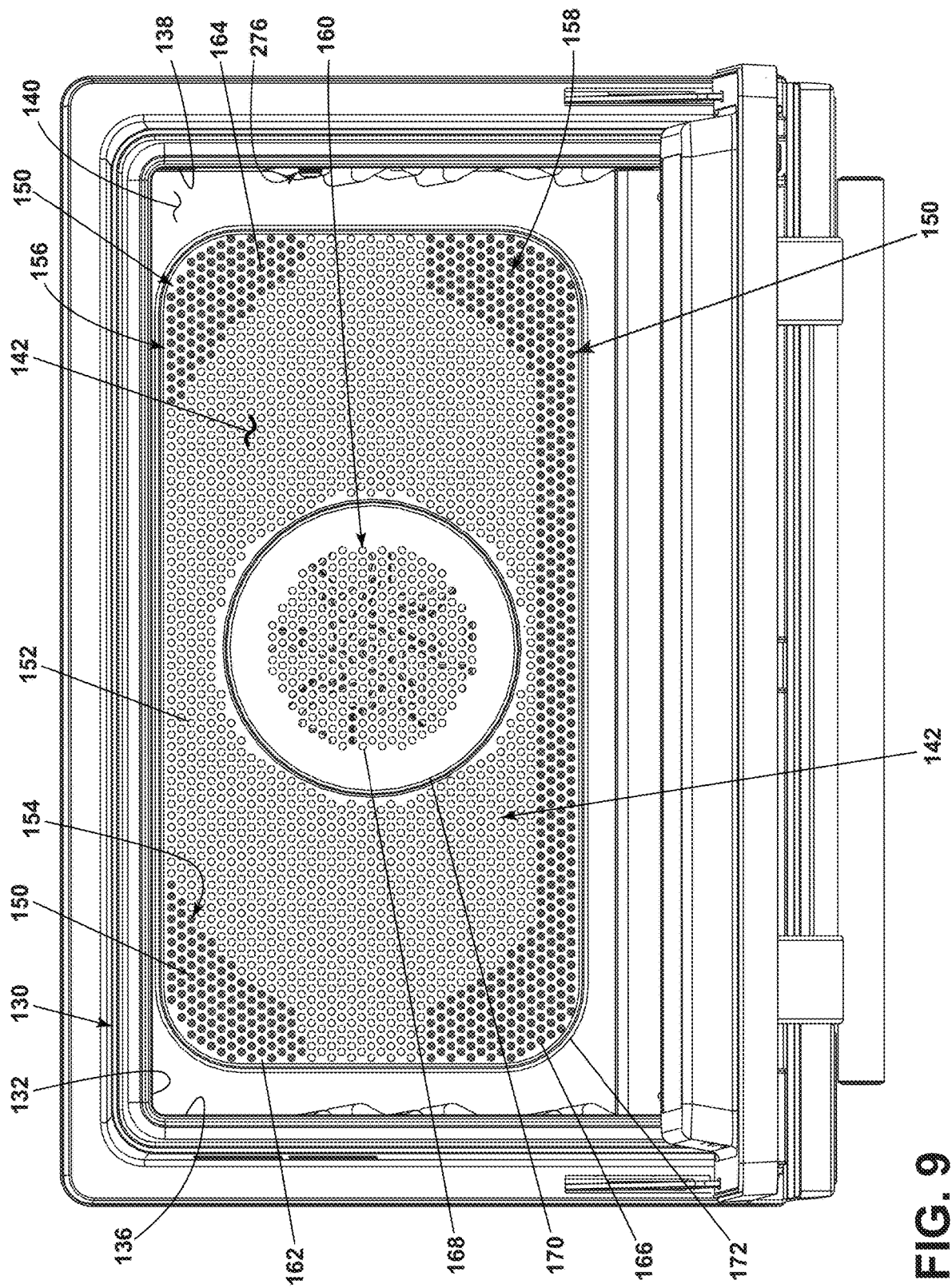
FIG. 9 is a close up of a rear wall of a cooking chamber insert viewable through the opened door of FIG. 8.

Referring to FIG. 9, which is a close up view of the rear side 140 of the insert 130, it can be seen that the rear side 140 comprises a plurality of through openings 150 and dimples 152, which can have similar or dissimilar shapes. As illustrated, the through openings 150 and dimples 152 have the same shape, which happens to be a circle, with the through openings having a darker appearance. However, as with all the other through openings of this description, the through openings 150 can have any other ornamental shape, including, without limitation, square, triangular, ovate, polygonal, or irregular. The through openings 150 and dimples 152 are arranged in offset rows.

The through openings 150 are also arranged in multiple groups 154-160, with each group defining a vent for the cooking chamber 142. Two of the through opening groups, 154 and 156, are located in the upper left and right corners to define corner vents 162, 164, respectively. A third group of through openings extends across the bottom of the rear wall 140 from a lower left corner to a lower right corner and form a lower vent 166. A final grouping of the through openings 150 are located in a central portion of the rear wall 140 and form a central vent 168. As illustrated, the central vent 168 is located on a circular raised portion 170 of the rear wall 140, which is otherwise planar, except for the raised boundary 170. The central vent 168 is an air supply or air recirculation vent while the corner vents 162, 164 and lower vent 166 are air return vents.

The through openings create a different visual appearance than the dimples because the through openings extend all the way through the rear wall 140 whereas the dimples do not. Thus, the through openings 150 and dimples 152 can be selected to provide the rear wall with a desired visual appearance without negatively impacting the vent function. As illustrated, the different vents are arranged such that they form a smiling face, with the upper left/right vents 154, 156 forming the eyes, the central vent 168 forming the nose, and the lower vent 166 forming the mouth. While other arrangements of the vents are contemplated, the illustrated arrangement provides a touch of aesthetic whimsy on top of the functionality, which is not necessary for the proper function of the oven 10.

Figure 10:
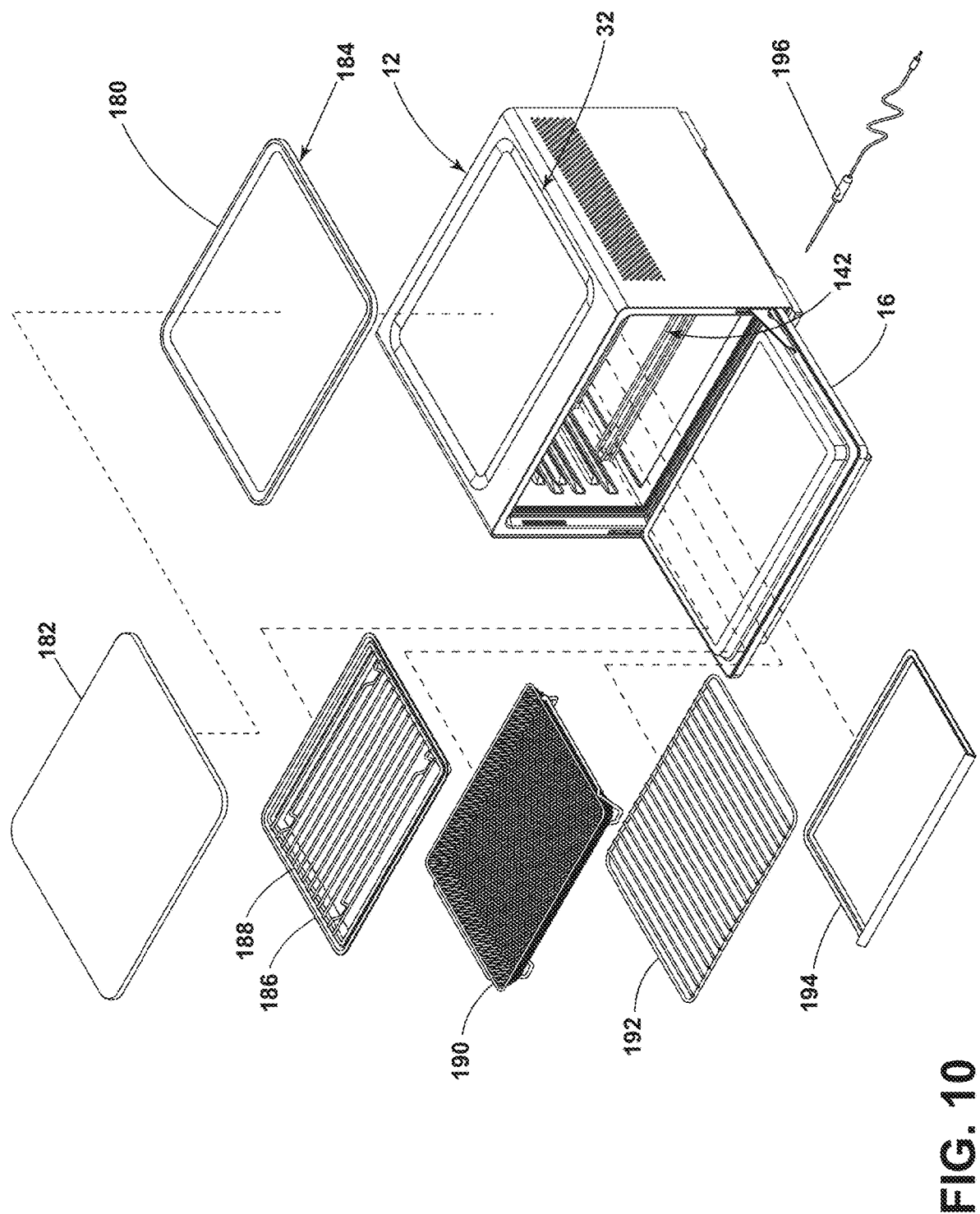
FIG. 10 is a perspective view of the oven of FIG. 1 with the door opened and illustrating a variety of accessories that can be used with the oven, including, without limitation a: cutting board, baking stone, baking sheet, sheet rack, air bake basket, baking rack, crumb pan, and a temperature probe.

Referring to FIG. 10, with the overview of the oven 10 complete, attention is turned to a description of some of the accessories contemplated for use with the oven 10. A first group of accessories are those designed to seat within the accessory seat 32 on the top wall 18 of the cabinet 12. Two examples of such accessories are illustrated and include a cutting board 180 and a baking stone 182, which can be sized to fit within the cooking chamber 142. A second group of accessories are those designed to fit within the cooking chamber 142. Examples of the second group include a baking sheet 186, with optional sheet rack 188, an air bake basket 190, a baking rack 192, and a crumb pan 194. A third group of accessories are those designed to aid in process control. An example is a temperature probe 196.

Figure 11A:
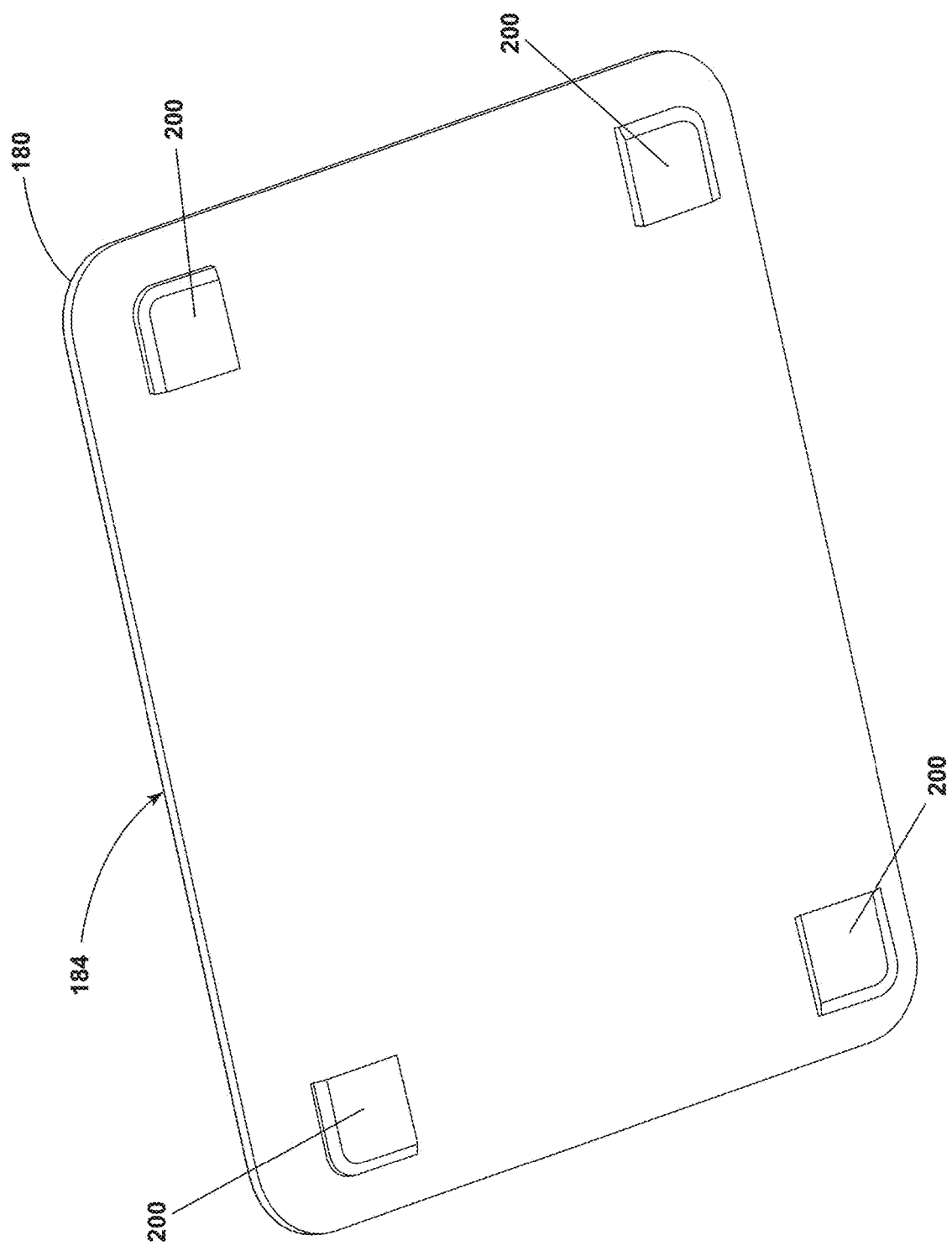
FIGS. 11A-11C are bottom perspective views of the cutting board and illustrating different seating or indexing structures.
Figure 11B:
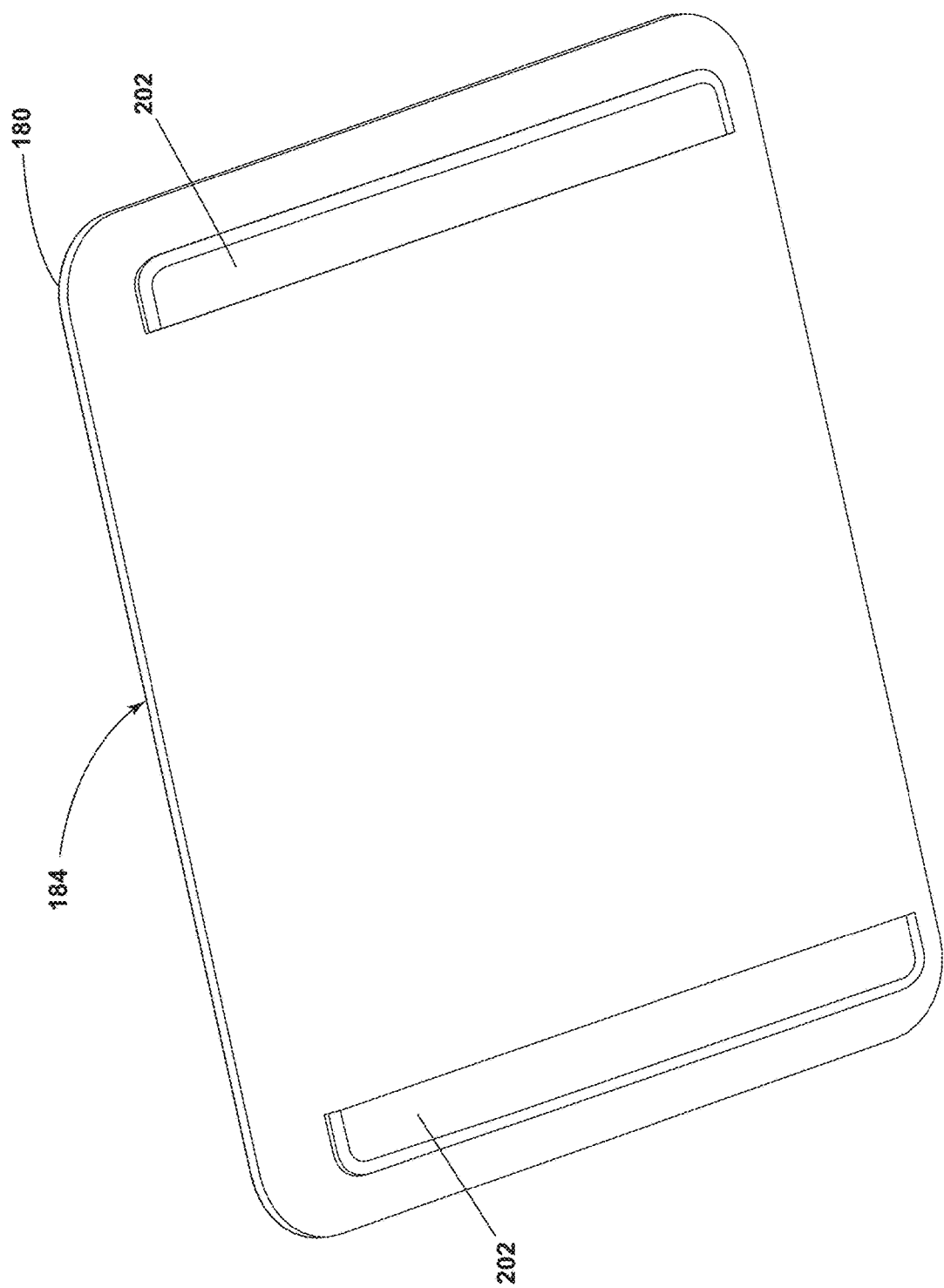
Figure 11C:
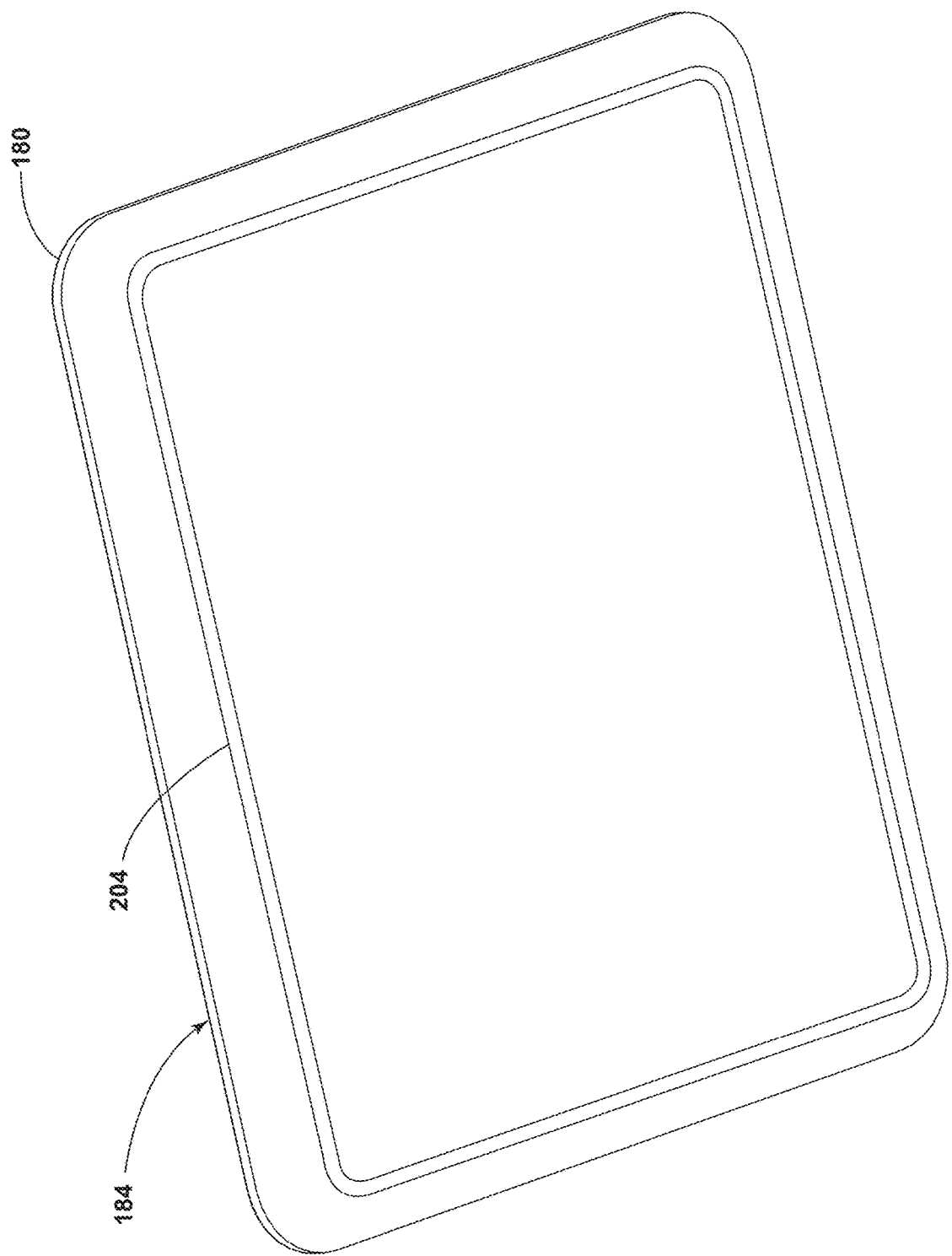

Looking at the different groups of accessories in greater detail, for the first group, to seat within the seat 32, the accessory can have a shape that is complementary to the shape of the seat 32. For example, the cutting board 180 has a bevel 184 that is complementary in shape to the bevel or recess wall 38 of the seat 32. Additionally, referring to FIG. 11A, indexing structures, such as feet 200 can be provided on a bottom of the cutting board 180. Alternatives to the feet 200 include strips 202 (FIG. 11B) or a circumferential rib 204 (FIG. 11C). These indexing structures are located on the cutting board 180 so as to naturally locate the cutting board 180 within the recess 34 of the seat 32 when the accessory is set on the top wall 18 of the cabinet 12. While the indexing structures are illustrated on the cutting board 180, they can also be used on the baking stone 182 as long as they are made from a material that can withstand the temperatures in the cooking chamber 142. Either or both of the cutting board 180 or the baking stone 182 can include a variety of indicia, including, but not limited to, logos, embossments, or inlays.

Figure 12:
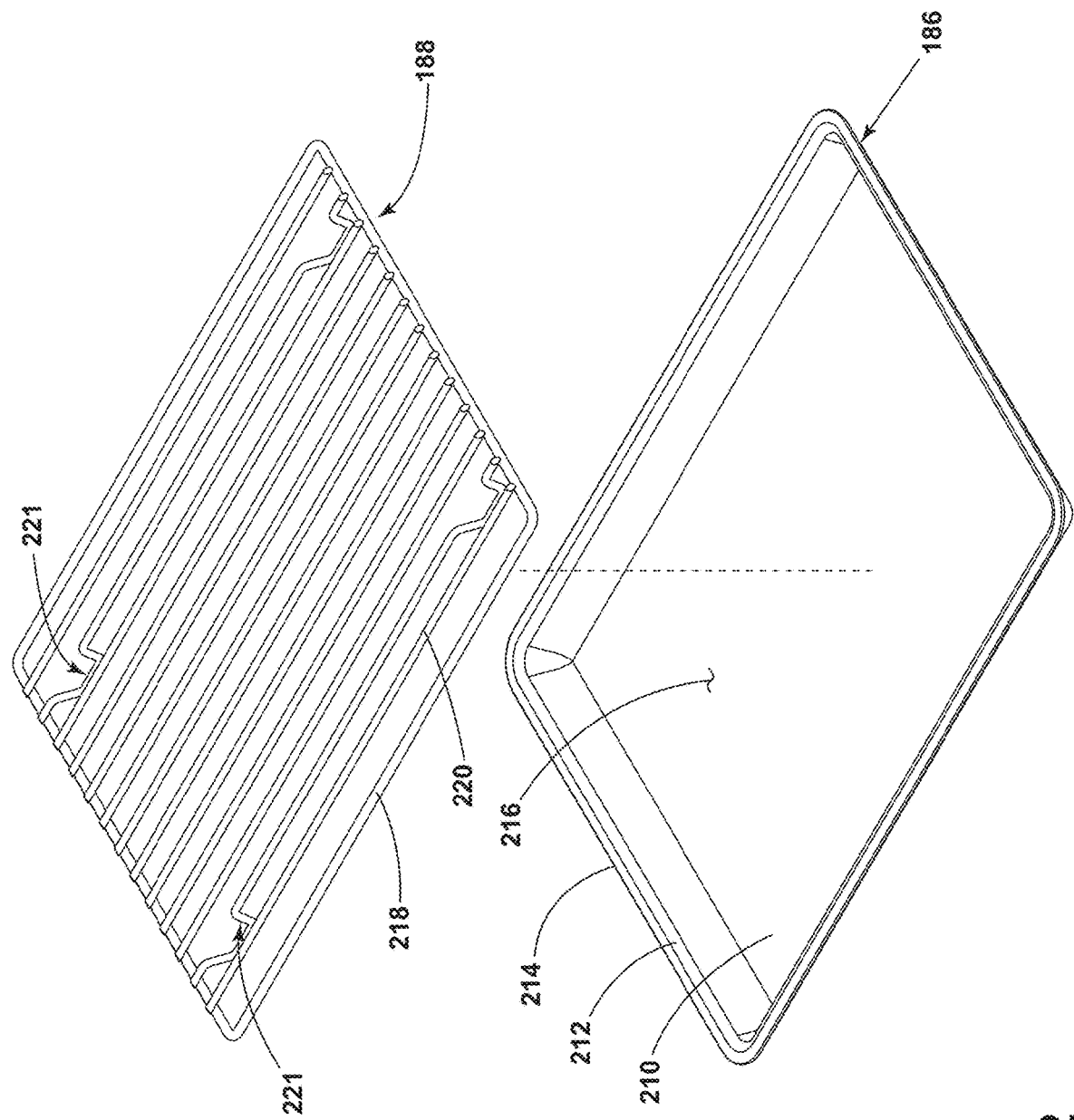
FIG. 12 is a perspective view of the baking sheet and sheet rack.

Looking at the second group, reference is made to FIG. 12 illustrating the baking sheet 186 with the sheet rack 188. The baking sheet 186 has a bottom 210 from which extends a peripheral wall 212, which terminates in a peripheral flange 214 to define a recess 216. The peripheral flange 214 is sized such that when the baking sheet 186 is slid into the cooking chamber 142, the peripheral flange overlies the rails 145 in the left and right sides 136, 138 of the cooking chamber 142.

The sheet rack 188 comprises a frame having a peripheral element 218 and spanning elements 220, which span the interior bounded by the peripheral element 218. Some of the spanning elements 220 can have feet 221 that rest on the bottom 210 of the baking sheet 186. Whether or not feet 221 are provided, the sheet rack 188 can rest on the peripheral flange 214. While the sheet rack 188 is illustrated with a peripheral element 218 and spanning elements 220, additional frame elements, such as crossing elements (not shown), can be provided. The crossing elements could span the peripheral element 218 in a direction transverse to the spanning elements 220 to form a crisscross or orthogonal grid structure. Other suitable grid or latticework configurations are contemplated.

The baking sheet 186 and sheet rack 188 can provide different functionalities, alone or in combination. When used in combination, the baking sheet 186 can function as a drip pan, with the baking sheet rack 188 being used to support a food item prone to dripping, such as any meat product. The peripheral wall 212 will retard dripping liquid from overflowing and spilling onto the bottom 134 of the cooking chamber 142. The baking sheet can also be used to hold food items for baking, such as cakes or brownies. The baking sheet rack 188 can be used to support items, like pizza, with the baking sheeting catching any drippings or crumbs.

Figure 13:
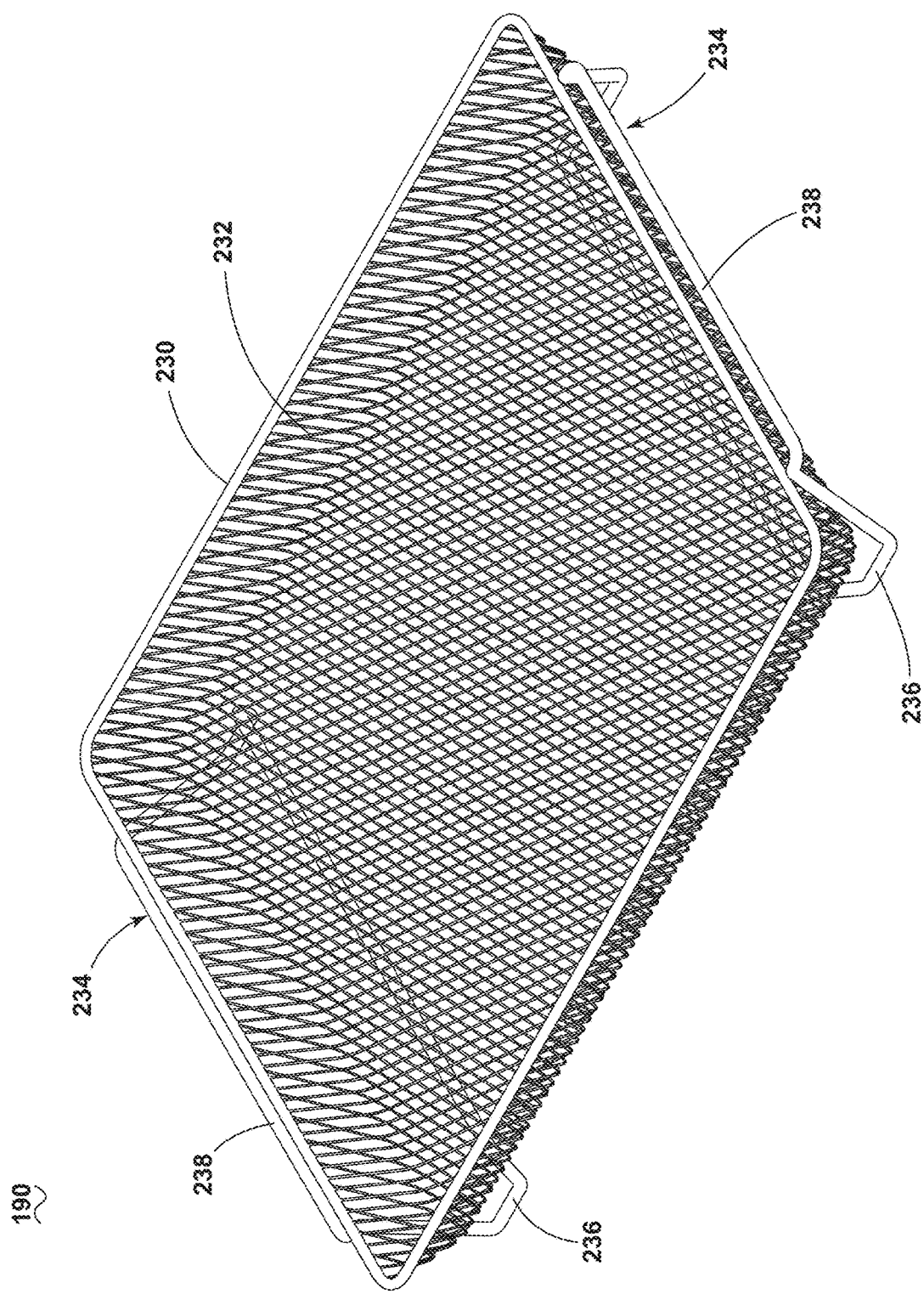
FIG. 13 is a perspective view of the air bake basket.

Referring to FIG. 13, the air bake basket 190 comprises a peripheral frame 230, illustrated as a bent wire element, supporting a mesh basket 232. Handles 234 are located at each side of the mesh basket 232. The handles 234, like the peripheral frame 230, can be a bent wire element. The handles 234, as illustrated, include feet 236 and grips 238. The grips 238 are sized to overlie the rails 145 when the air bake basket 190 is slid into the cooking chamber 142 to support the air bake basket 190 within the cooking chamber 142. The air bake basket 190 is sized, like the baking sheet rack 188, so as to sit within the baking sheet 186. In such a nesting configuration the feet 236 can rest on the bottom 210 of the baking sheet 186 and/or the handles 234 rest on the peripheral flange 214.

The air bake basket 190 is intended to suspend items for baking within the cooking chamber 142. It is contemplated that battered items, or other items prone to dripping or to generating crumbs, may be placed within the air bake basket 190. Under such conditions, the baking sheet 186 can be used in combination with the air bake basket 190, such as slidably suspending them from different sets of rails 145. The use of the baking sheet 186 in combination with the air bake basket 190 can also be useful when loaded items for baking into the air bake basket 190 when the air bake basket 190 is placed on, for example, a countertop or a table, rather than within the oven 10. In this way, the baking sheet 186 can prevent drips or crumbs from being left behind, either on the countertop or table, or within the oven 10.

Figure 14:
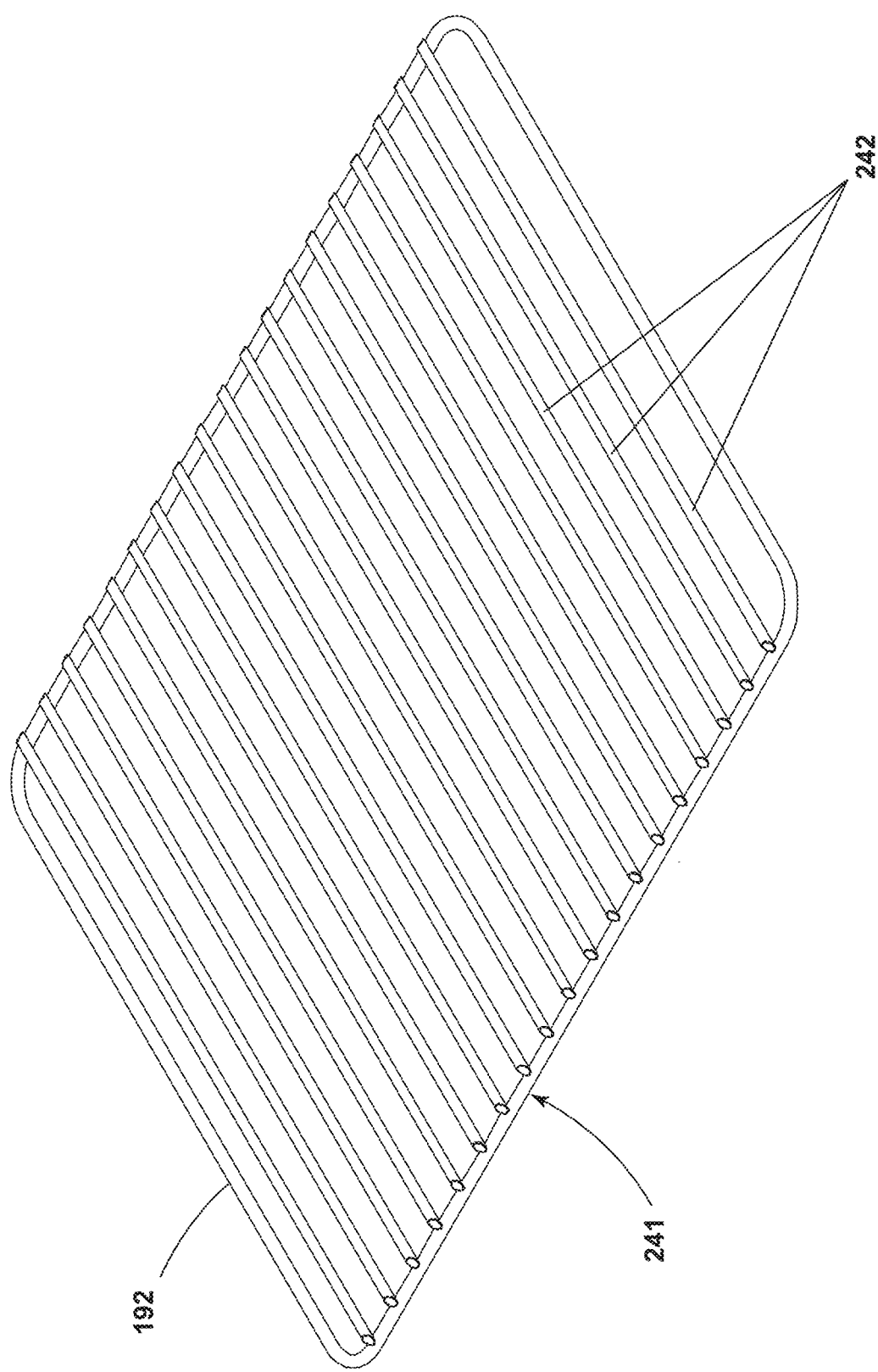
FIG. 14 is a perspective view of the baking rack.

Referring to FIG. 14, the baking rack 192 comprises a peripheral frame 241 with spanning elements 242, which is a configuration similar to the sheet rack 188. In this sense the baking rack 192 and the sheet rack 188 are structurally similar, with one difference being the backing rack 192 is sized to overly the rails 145 when the baking rack 192 is slid into the cooking cavity. Thus, the description of the sheet rack 188 applies equally as well to the baking rack 192. The baking rack 192 is a traditional baking rack and intended to be used in the traditional manner, such as by supporting food items contained in bakeware or directly supporting food items. As with the air bake basket 190, the baking rack 192 can be used in combination with the baking sheet 186.

Figure 15:
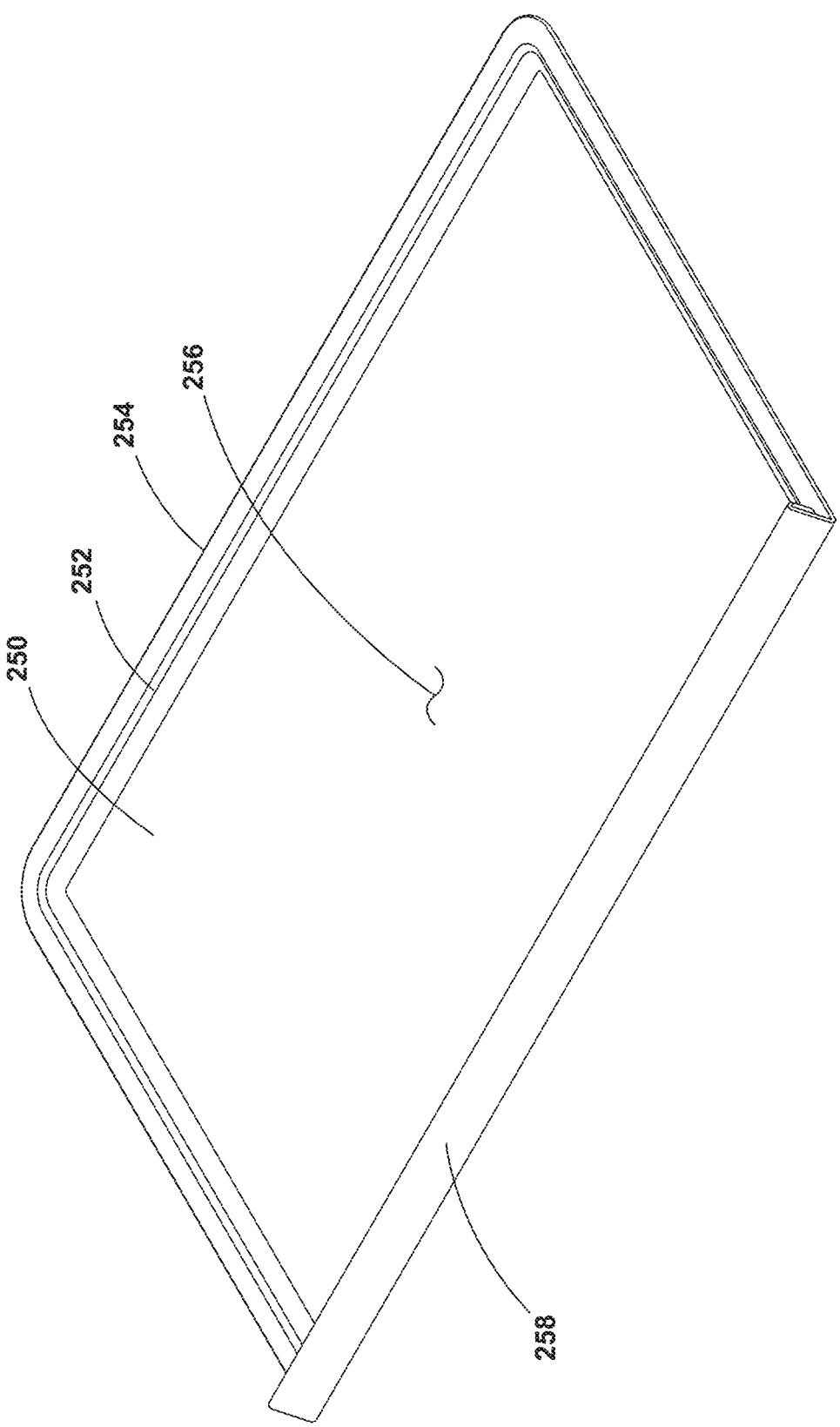
FIG. 15 is a perspective view of the crumb pan.
Figure 16:
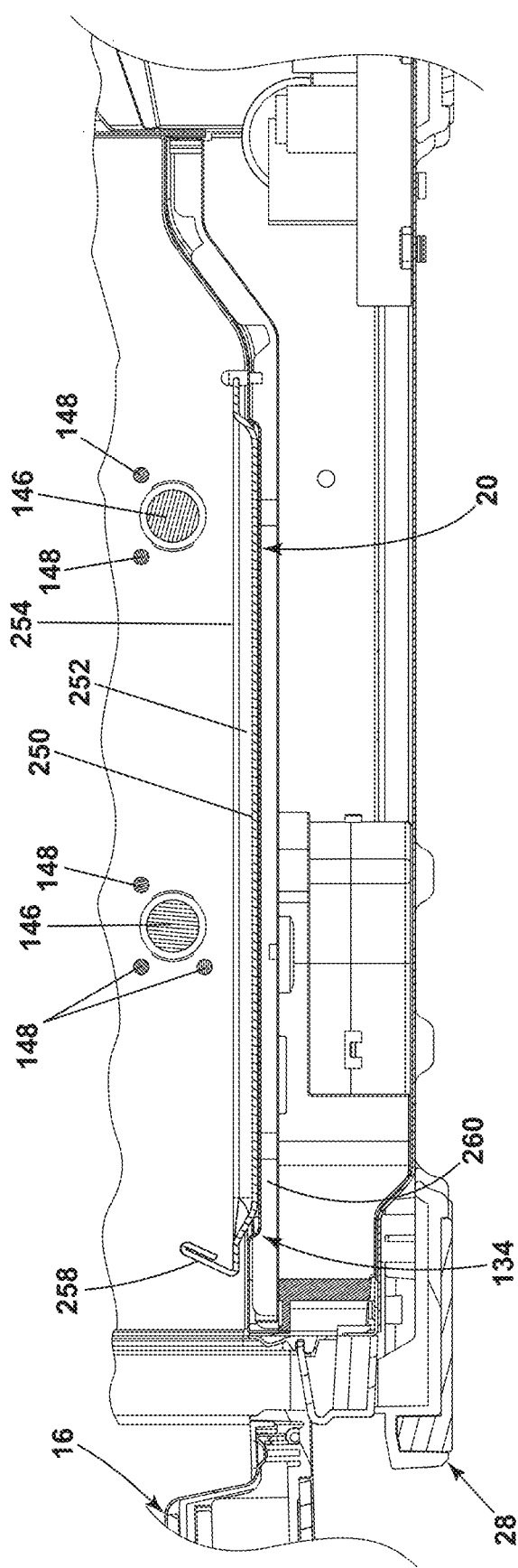
FIG. 16 is a sectional view of the crumb pan when placed within the cooking chamber insert.

Referring to FIG. 15, the crumb pan 194 comprises a bottom 250 from which extends a peripheral wall 252, which terminates in at least a partial peripheral flange 254 to define a recess 256. A pull 258 is provided on a front portion of the peripheral flange 254. As seen in FIG. 16, the crumb pan 194 sits within a seat 260 in the bottom side 134 of the cooking chamber 142. The crumb pan 194 and seat 260 can be configured in the same way as the first group of accessories and the accessory seat 32, whose description applies equally to the crumb pan 194 and seat 260. It will be understood that use of the oven 10 without the crumb pan 194 in place is also possible.

Figure 17:
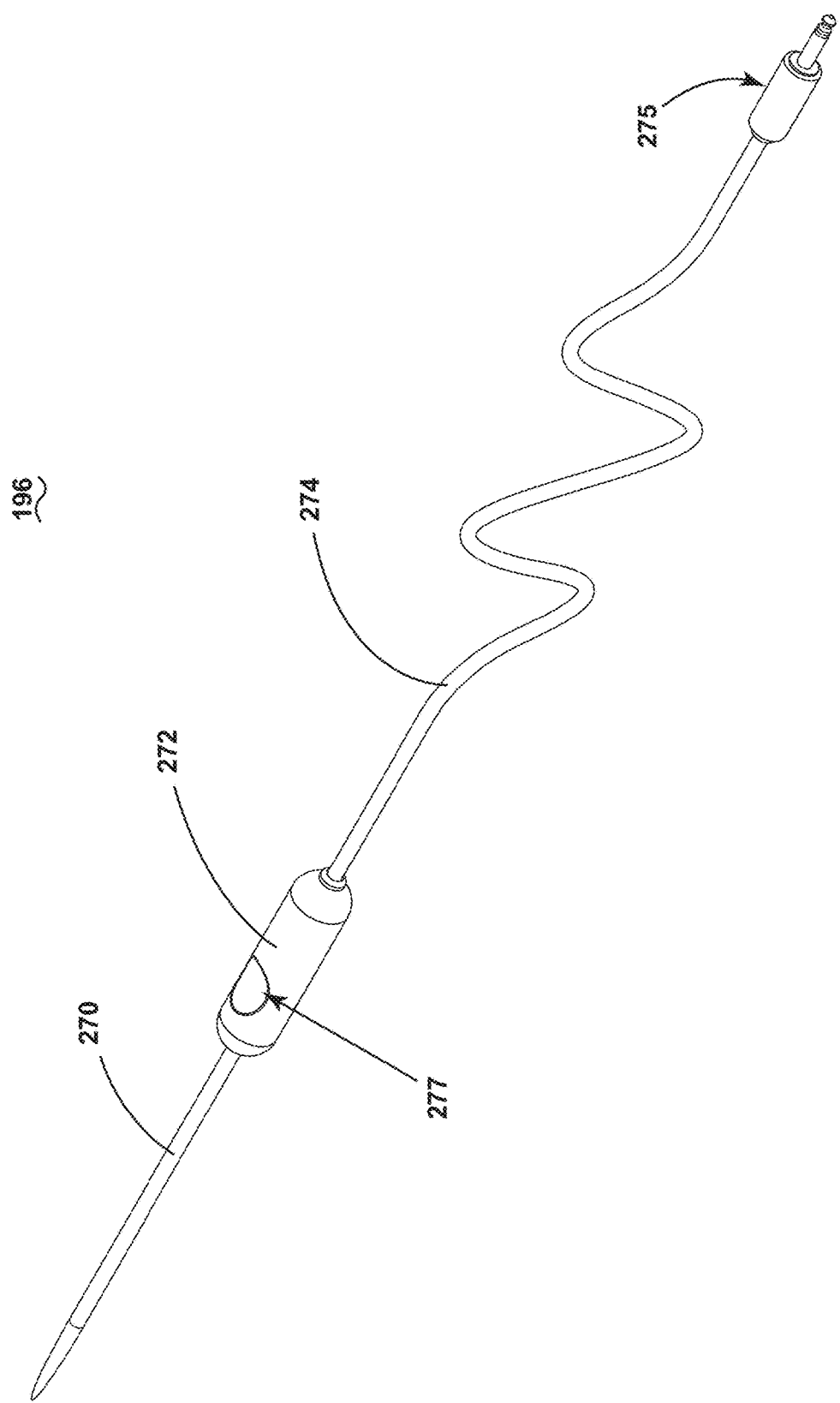
FIG. 17 is a perspective view of the temperature probe.

Referring to FIG. 17, the temperature probe 196 is illustrated as a corded temperature probe having a probe 240 supporting a processor 272 from which extends a cord 274, terminating in a plug 275 which can be plugged into an outlet 276 (FIG. 9) formed in the right side wall 138 of the cooking chamber 142. The processor 272 can optionally include finger grips 277 sized and shaped to accommodate a thumb and/or one or more fingers of a user's hand. The probe 240 is intended to be inserted into the food item being cooked in the cooking cavity, and provide input to the processor 272, which converts the input into a temperature signal that is sent along the cord 274 to the oven 10. The cord 274 can provide for both data and power transmission to and from the processor 272. The supply of power along the cord 274 negates the need for the temperature probe 196 to house a power source. While the temperature probe 196 is illustrated as a wired temperature probe, in that data is communicated across a wire plugged into the oven 10, it is contemplated that the temperature probe 196 can be a wireless temperature probe that transmits data wirelessly through any conventional method, such as radio waves, near field communication, or Wi-Fi, for example.

Figure 18A:
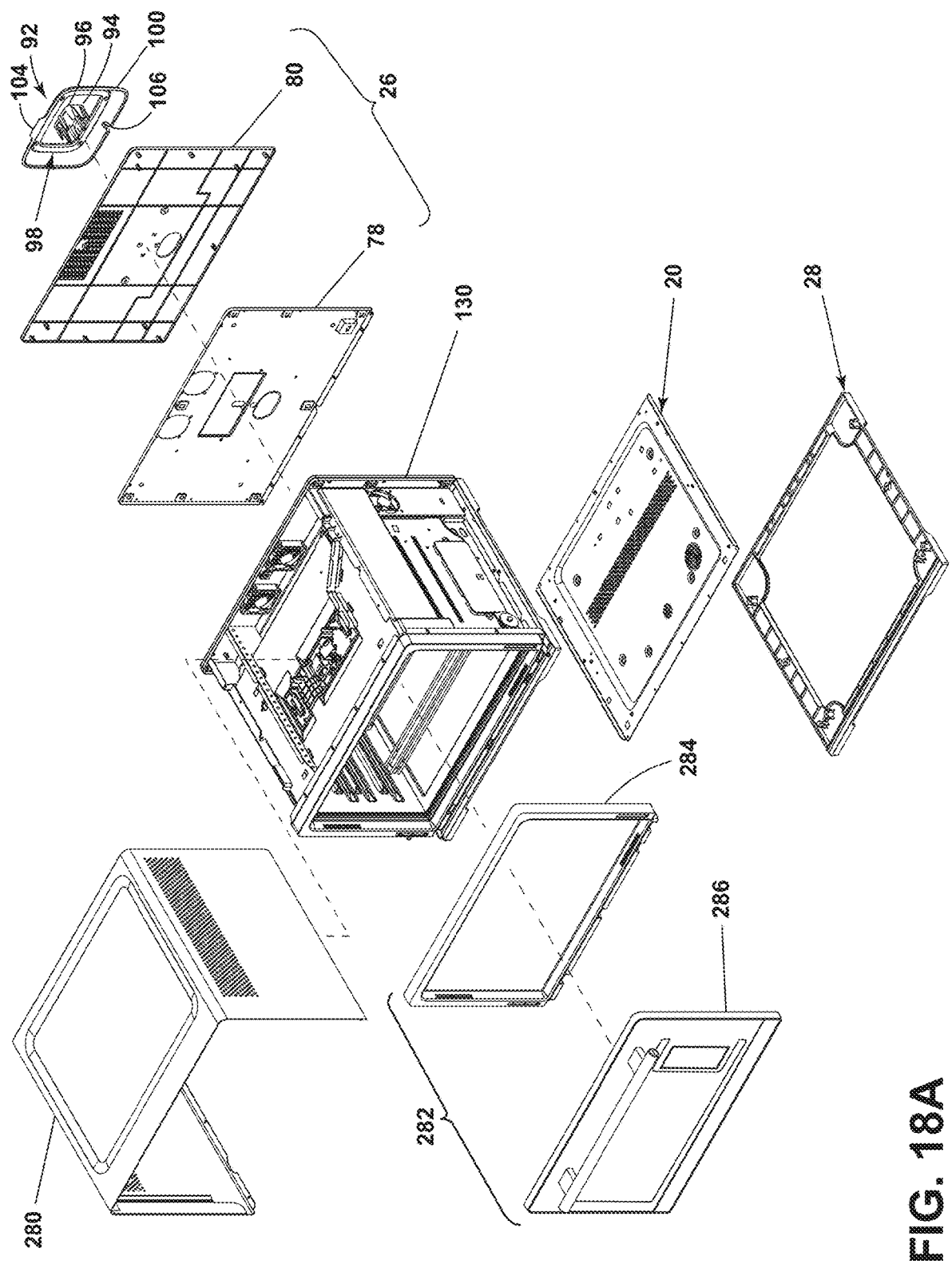
FIGS. 18A-D are exploded views of the oven of FIG. 1 and illustrating the major components of the cooking chamber insert, cabinet, heating elements, sensor assembly, door assembly, system controller, fans, and deflectors, with the accessories removed for clarity.
Figure 18B:
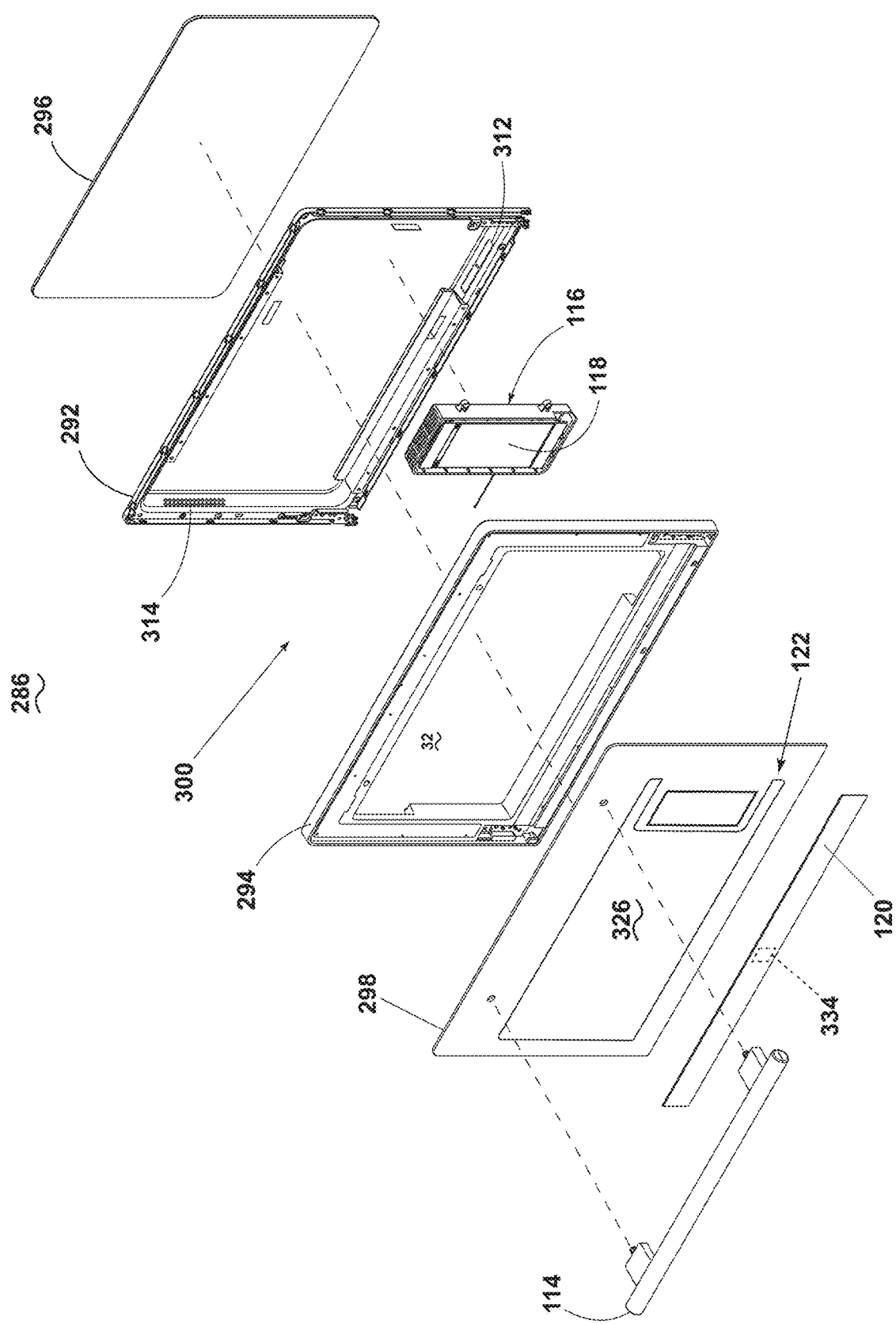
Figure 18C:
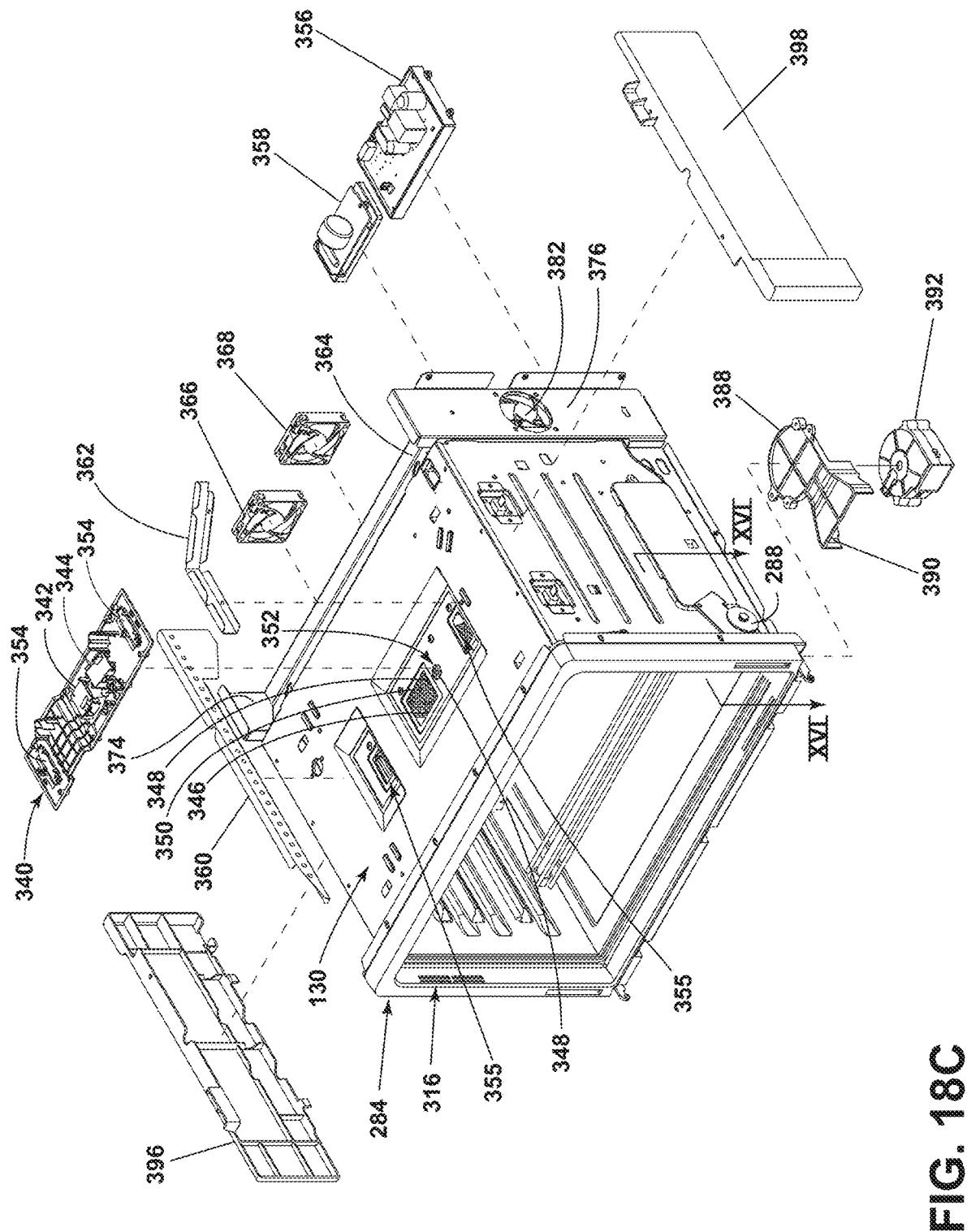

With an overview of the oven 10 completed and an understanding of some of the accessories for the oven 10, attention is now directed to the structural details of the oven 10 by referring to FIGS. 18A-C, which exploded views of the oven 10, without the accessories. As seen in FIG. 18A, the insert 130 forms the core of the oven 10, which is enclosed by a bottom wall 20, rear wall 26, and a wrapper 280, forming the top wall 18, left wall 22, and right wall 24; all of which are spaced from the insert 130 to form an enclosed space between the walls 132-140 of the insert 130 and the walls 18-26 of the cabinet 12, when the insert 130 is received within the cabinet 12. This enclosed space is used for various air flow paths to cool various areas and components of the oven 10. The rear wall 26 comprises rear structural wall 78 and a rear ornamental wall 80. The rear structural wall 78 mechanically fastens to the wrapper 280 and the bottom wall 20 using snaps, pins or fasteners, while the rear ornamental wall 80 snaps to the rear structural wall 78 and hides all of the fasteners. The rear ornamental wall has the embossments 82 and slots 86, 88 forming the vent 84, as shown in FIG. 7.

A door assembly 282 closes the front of the cabinet 12 and the insert 130. The door assembly comprises a cabinet frame 284 mounted to the cabinet 12 and the door 16 is hingedly mounted to the cabinet 12 by hinge assemblies 288.

Referring to FIG. 18B, the door 16 comprises an inner door frame 292 and outer door frame 294, which mount inner and outer panes 296, 298, which form the window 112. The inner and outer panes 296, 298 are in spaced relation and define an interstitial space 300. The inner and outer doors 292, 294 define complementary window openings 304, 306, which are closed by the inner and outer panes 296, 298. In this sense, the door 16 defines a dual-pane window through which the cooking chamber 142 can be viewed.

An outlet vent 310 is located in the lower right of the cabinet frame 284. A corresponding inlet vent 312 is located on the lower right of the inner door frame 292 and is fluidly coupled to the interstitial space 300. The upper right of the inner door frame 292 has an outlet vent 314, which corresponds to an inlet vent 316 (FIG. 18C) on the upper left of the cabinet frame 284 (FIG. 18C). While the outlet vent 314 is illustrated herein as being provided only on one side of the inner door frame 292, it will be understood that any suitable location of the outlet vent 314 can be implemented, including at an upper edge or on both sides of the inner door frame 292.

The handle 114 is attached to the outer pane 298. It can alternatively be attached to the outer door frame 294. The human machine interface ("HMI") 116 is located within the space 300 and has a display 118 facing the outer pane 298.

The mask 122 can be applied to the outer pane 298 and form a border for the outer pane 298, with forms a viewing portal 326 to the cooking chamber 142, along with a border 328 for the HMI 116. The mask 122 is formed such that notches 330 are located between the mask 122 and the border 328.

The spacer or trim element 120 is located between a lower portion of the outer pane 298 and the outer door frame 294. The trim element 120 can include an indicia 334, such as a logo.

Referring to FIG. 18C, looking at the insert 130 in greater detail, a sensor assembly 340 is provided between the insert top 132 and the cabinet top wall 18. The sensor assembly 340 comprises a camera 342 and an Infrared (IR) sensor 344. Corresponding viewing ports, camera port 346 and IR port 348, are located in the insert top 132. Optical elements 350, 352, in the form of glass panes, especially low emissivity or "low-e" glass panes, can be located in the ports to protect the camera 342 and IR sensor 344. The emissivity for such low-e glass is generally less than 0.03 One or more light sources 354, such as an LED array, can also be provided to generate illumination useful for the operation of the camera 342 or the IR sensor 344, and/or for general lighting of the cooking chamber 142. Illumination ports 355 are provided for the LED arrays. While the ports 346, 348 and corresponding optional elements 350, 352 are illustrated separately, they can be combined for a common port and optical element.

A system controller 356, in the form of a circuit board, and a power board 358, also in the form of a circuit board, are located between the insert bottom 134 and the cabinet bottom wall 20 along a rear portion of the cabinet bottom wall 20. The system controller 356 and power board 358 are mounted to the bottom wall 20. The system controller 356 is operably coupled to the HMI 116 and the power board 358. The system controller 356 is also operably coupled to the sensor assembly 340 and the outlet 276 for the temperature probe 196.

Figure 19:
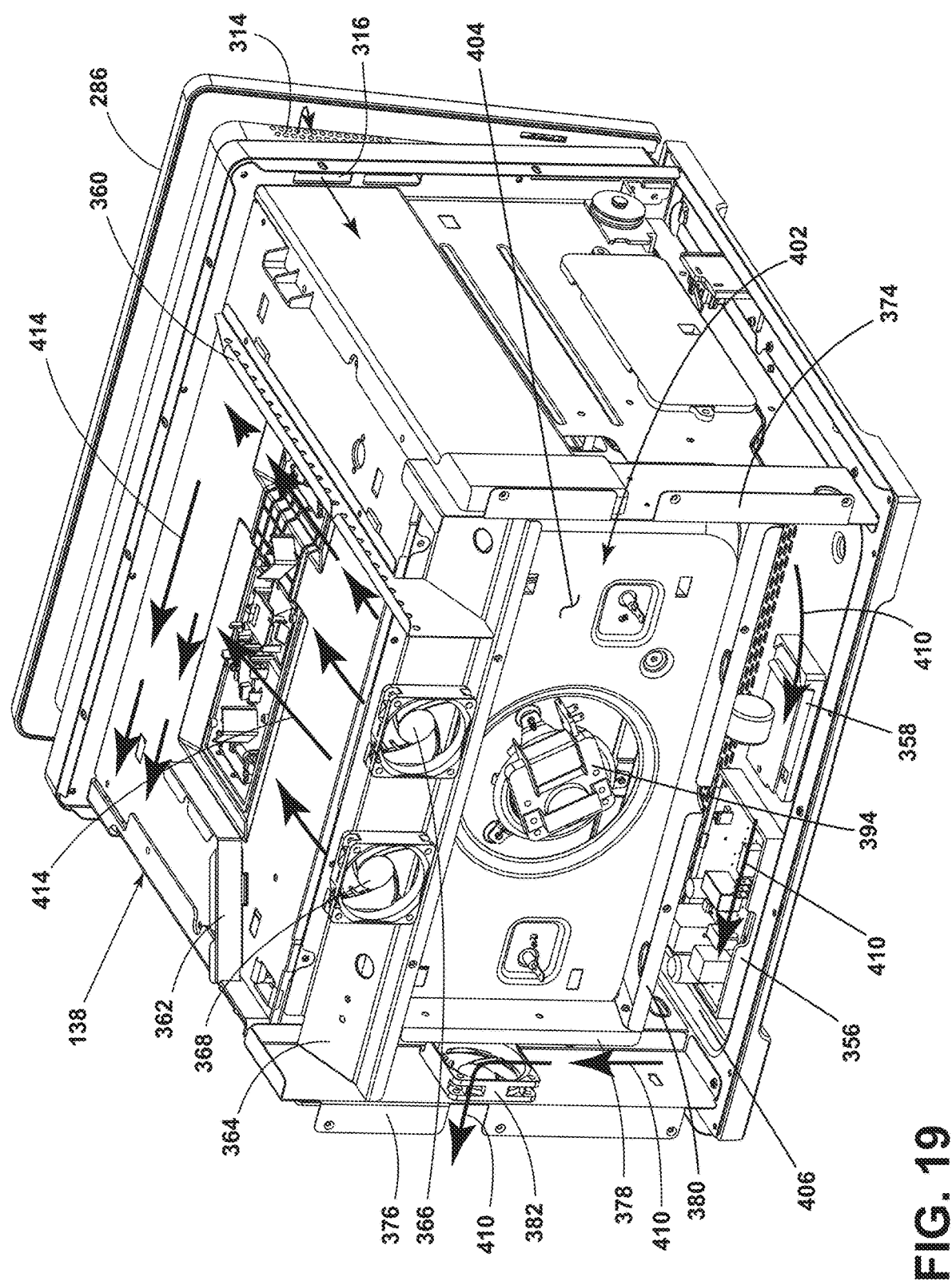
FIG. 19 is a rear perspective view of the oven of FIG. 1 with the top, right side, left side and rear walls of the oven removed to illustrate air flow paths around the cooking chamber insert, including, without limitation a: controller cooling air flow path, sensor assembly cooling air flow path, and convection air flow path.

Air flow elements comprise multiple deflectors and multiple fans to form multiple, fluidly discrete air flow paths. The deflectors are received within the space between the cabinet 12 and the cooking chamber insert 130 to form air flow channels within the space. A first set of top deflectors 360, 362, and a rear deflector 364, along with a pair of rear fans 366, 368 form at least a portion of a cooling air flow path over the sensor assembly 340. Rear, outer side deflectors 374, 376, rear inner side deflector 378 (FIG. 19), and rear bottom deflector 380 (FIG. 19), along with a rear side fan 382 define a cooling air flow path over the system controller 356 and power board 358. Bottom deflectors 388, 390 and bottom fan 392 form at least part of a cooling air flow path to the door assembly 282. A cooking chamber fan 394 (FIG. 19) mounts to the insert rear wall 140 and forces air through the central vent 168.

Blackout panels 396, 398 are located on each side of the oven 10 between the insert right side 138 and cabinet right wall 24 and between the insert left side 136 and the cabinet left wall 22 and prevent a direct line of sight through the right side vent 52 and the left side vent 42 to the insert 130. It is contemplated that the insert will have a silver color, such as when made from aluminum or other suitable metal, which would otherwise be visible through the vents 42, 52, but for the blackout panels 396, 398, which are contemplated to be black or the same color as the cabinet 12.

Figure 18D:
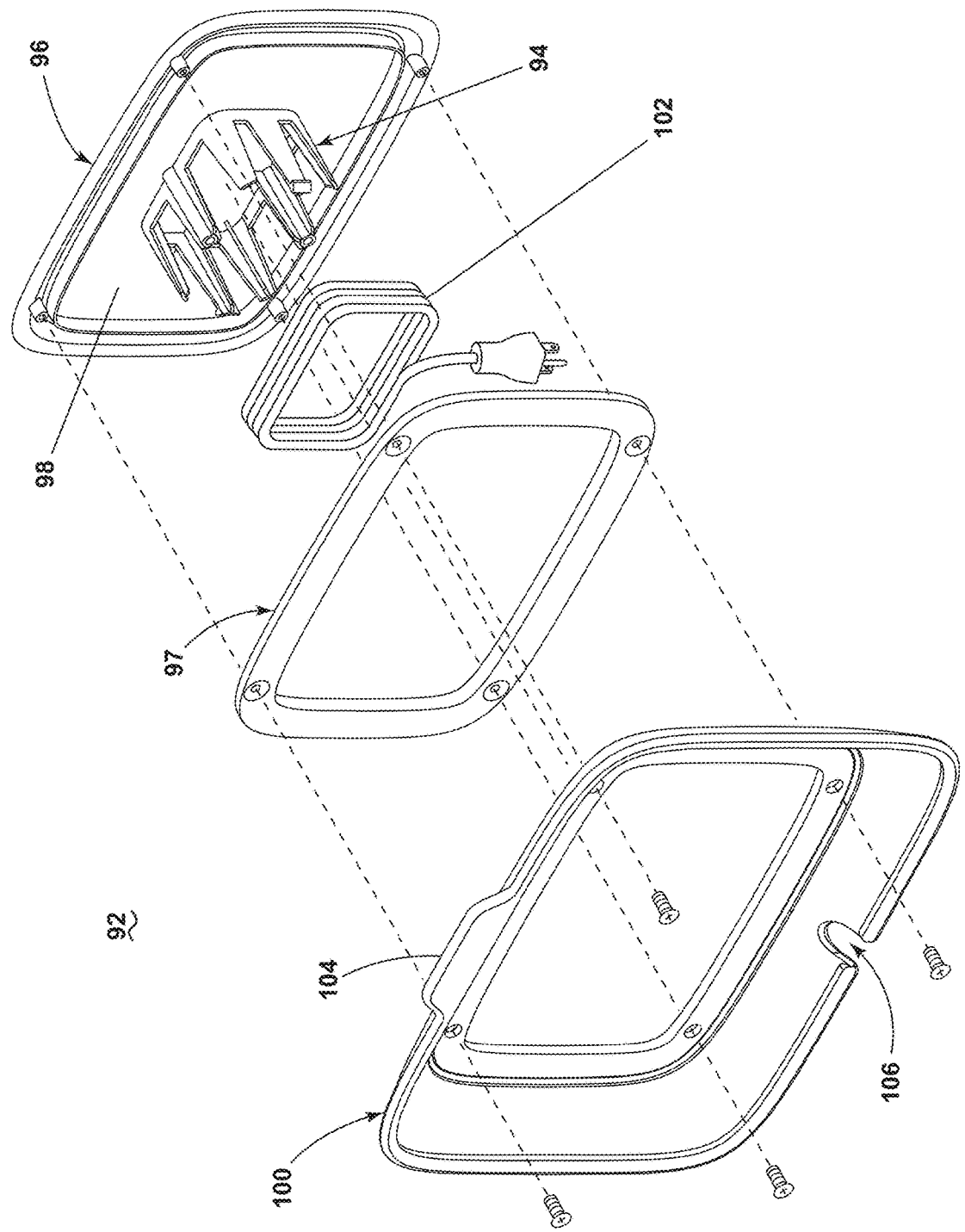

FIG. 18D illustrates an exploded view of the cord wrap 92 and more clearly illustrates the stem 94, end plate 96, mounting bezel 97, cord space 98, flexible flange 100, cord 102, pull tab 104, and cord slot 106. Fasteners (not numbered) can be used to secure the flexible flange 100 to the end plate 96 using the mounting bezel 97. The stem 94 can be snapped to and fastened to the rear ornament wall 80. While the cord wrap 92 is illustrated herein as having a generally rectangular shape, it will be understood that other shapes or cross sections are contemplated and include, without limitation, square, triangular, ovate, polygonal, or irregular. The amount of space in the cord space 98 is great enough that the entire cord 102, including the plug (not numbered), can be completely received within the cord space 98, leaving the cord hidden behind the flexible flange 100.

With the description of the major elements complete, attention is now turned to descriptions of the different functions of the oven 10 and how they are implemented with the described structures. Beginning with a description of the four different air flow systems, and referring to FIG. 19, which is a perspective rear view of the oven 10 with the wrapper 280 and cabinet rear wall 26 removed for clarity, the deflectors are shown in place and visually start to show the different air flow paths. It is understood that the cabinet walls can abut the deflectors to help close off the channel formed by the deflectors and the insert 130. The rear outer side deflectors 374, 376 extend from the insert left, right sides 136, 138 and from the cabinet bottom wall 20. The rear deflector 364 spans the side deflectors 374, 376 and runs along the insert top side 132. Thus, the side deflectors 374, 376, rear deflector 364, and bottom wall form a rear plenum 402, which can be closed by the cabinet rear wall 26. The rear inner side deflector 378 and the rear bottom deflector extend along the insert right side 138 and the insert bottom side 134 to subdivide the rear plenum 402 into a cooking chamber plenum 404 and a controller plenum 406.

The top deflectors 360, 362 are mounted to the insert top side 132, with the top deflector 362 extending the full length of the insert top side 132 to fluidly separate the sensor assembly 340 from the insert left side 136, and the top deflector 360 angles inwardly to the sensor assembly 340 and terminates just after.

This arrangement of deflectors forms a controller cooling air flow path denoted by arrows 410 beginning at cabinet bottom wall vent 58, passing through the controller plenum 406, through the rear side fan 382, and out the cabinet right side vent 52. The operation of the rear side fan 382 by the system controller 356 causes air to flow along the controller cooling air flow path 410, which flows over the system controller 356 and the power board 358 to affect their cooling.

This arrangement of deflectors also forms a sensor assembly cooling air flow path denoted by arrows 414, which begins with air entering the cabinet rear wall vent 84, passing through the dual rear fans 366, 368, flowing over the sensor assembly 340 as the air flows between the top deflectors 360, 362, then over to the insert right side 138, and then exiting the cabinet right side vent 52. The operation of the dual fans 366, 368 by the system controller 356 affects the flow of air along the sensor assembly cooling air flow path to cool the sensor assembly 340.

While the controller cooling air flow path 410 and the sensor assembly cooling air flow path 414 both exit the right side vent 52, as they approach the vent from the front and rear and front, respectively, there is little mixing of the two air flows. Also, the rear side fan 382 is in close proximity to the right side vent 52, which tends to force the controller cooling air flow path 410 more immediately out the right side vent 52. If it is desired to prevent the air flows from mixing the blackout panel 398 can be configured to separate the two air flows relative to the right side vent 52.

Figure 20:
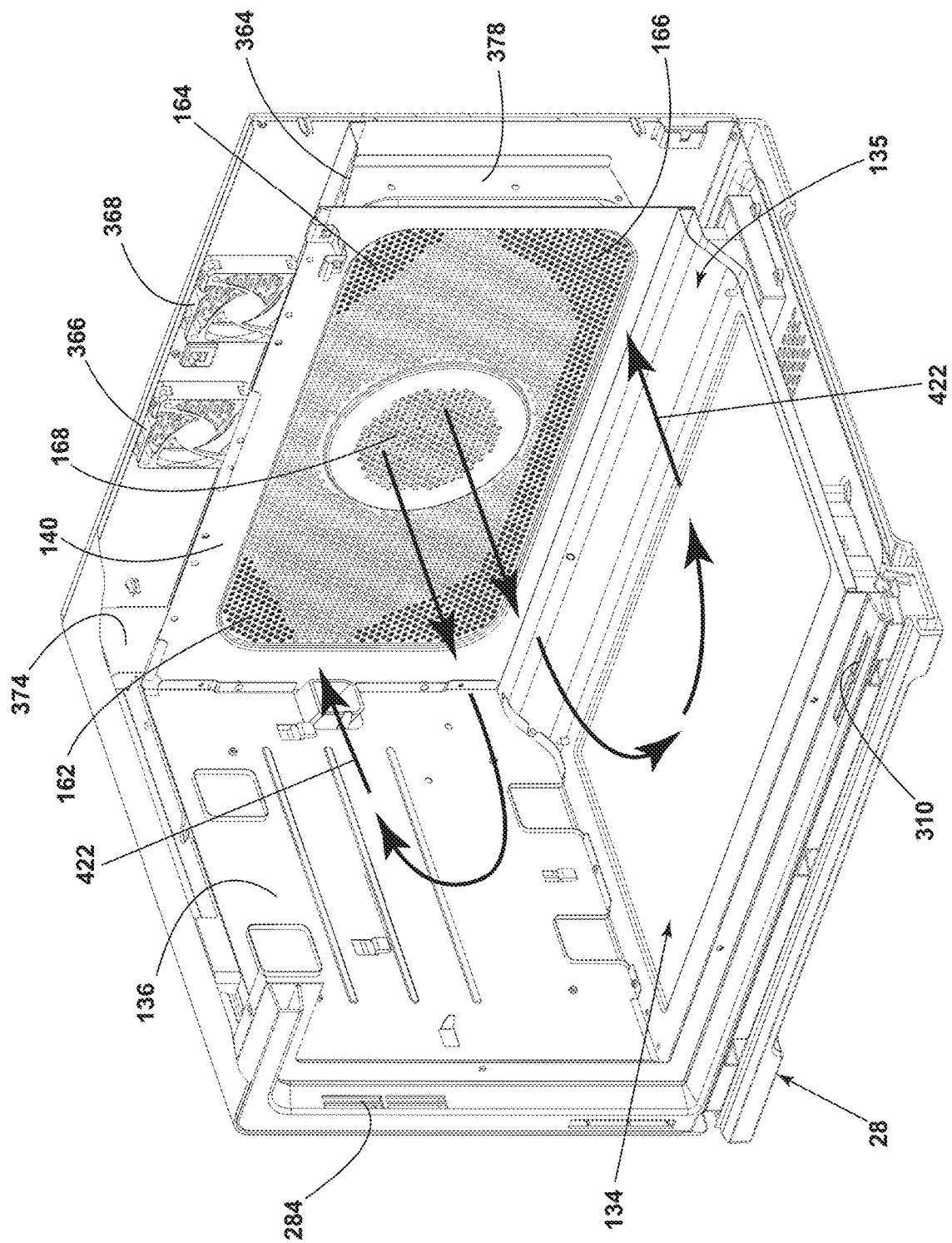
FIG. 20 is a partially sectioned perspective view illustrating a convection air flow within the cooking cavity insert.

Referring to FIG. 20, the arrangement of deflectors further forms a convection air flow path driven by the cooking chamber fan 394. The cooking chamber plenum 404 is fluidly separated from the controller and sensor assembly cooling air flow paths 410, 414 when the cabinet rear wall 26 is in place. The convection air flow path as illustrated by arrows 422. As can be seen, the cooking chamber fan 394 draws air from the cooking chamber plenum 404 and emits it through the central vent 168, where it is directed toward the door 16, which deflects the air back toward the insert rear wall 140, where the air passes through the corner and lower vents 162, 164 to the cooking chamber plenum 404, wherein the air is once again drawn by the cooking chamber plenum 404 to recirculate the air through the cooking chamber 142. The bottom side 134 advantageously has a ramp 135, which deflects the air flowing along the bottom side 134 up to the lower vent 164, reducing the tendency of the air flow to stagnate when hitting the rear wall. The ramp 135 can be shaped and sized so as to accommodate any components of the oven 10 that may be provided underneath the ramp 135.

Figure 21:
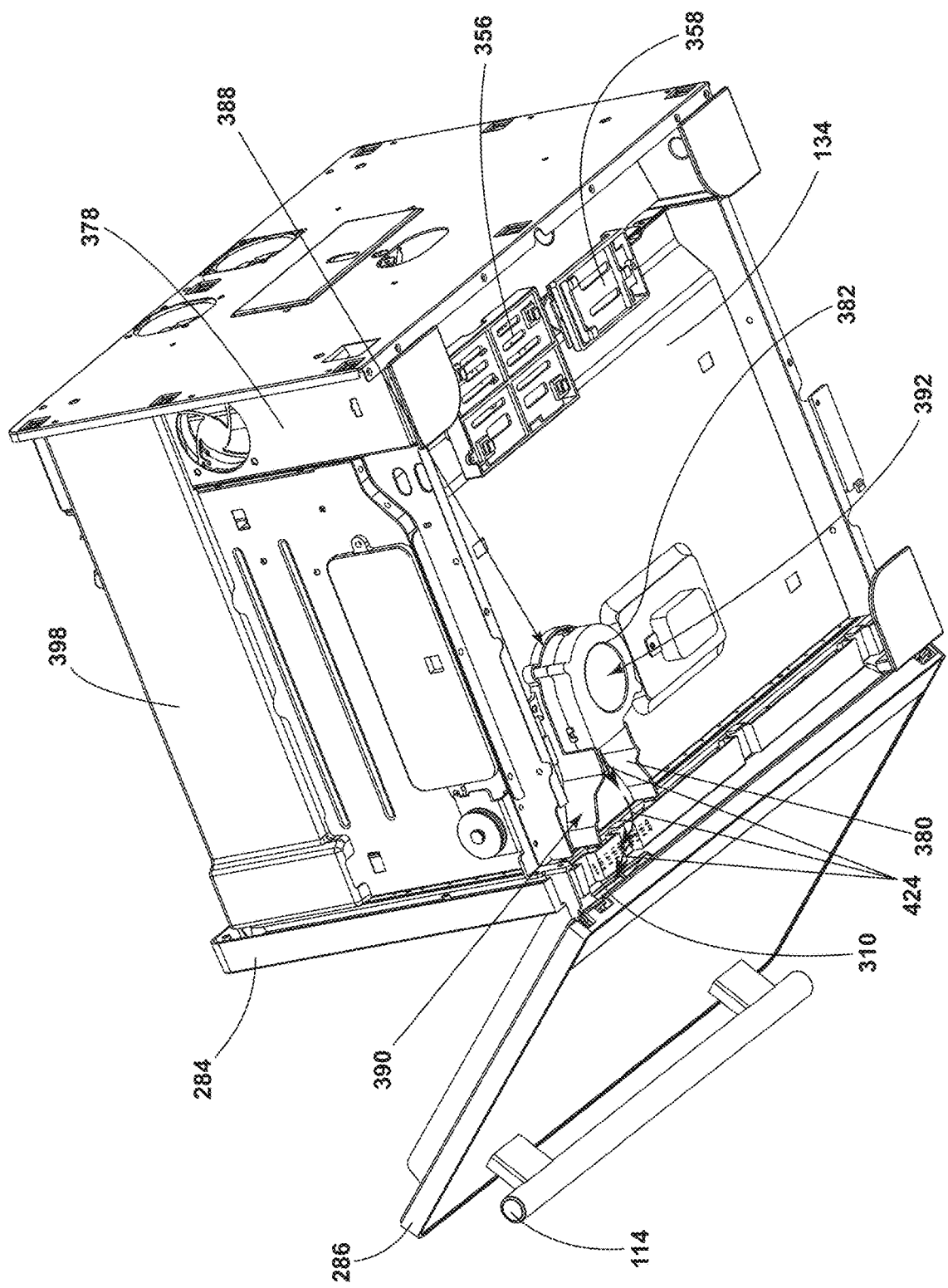
FIG. 21 is a bottom perspective view of the oven of FIG. 1 with the bottom wall removed to illustrate part of a cooling air flow path for the door.
Figure 22:
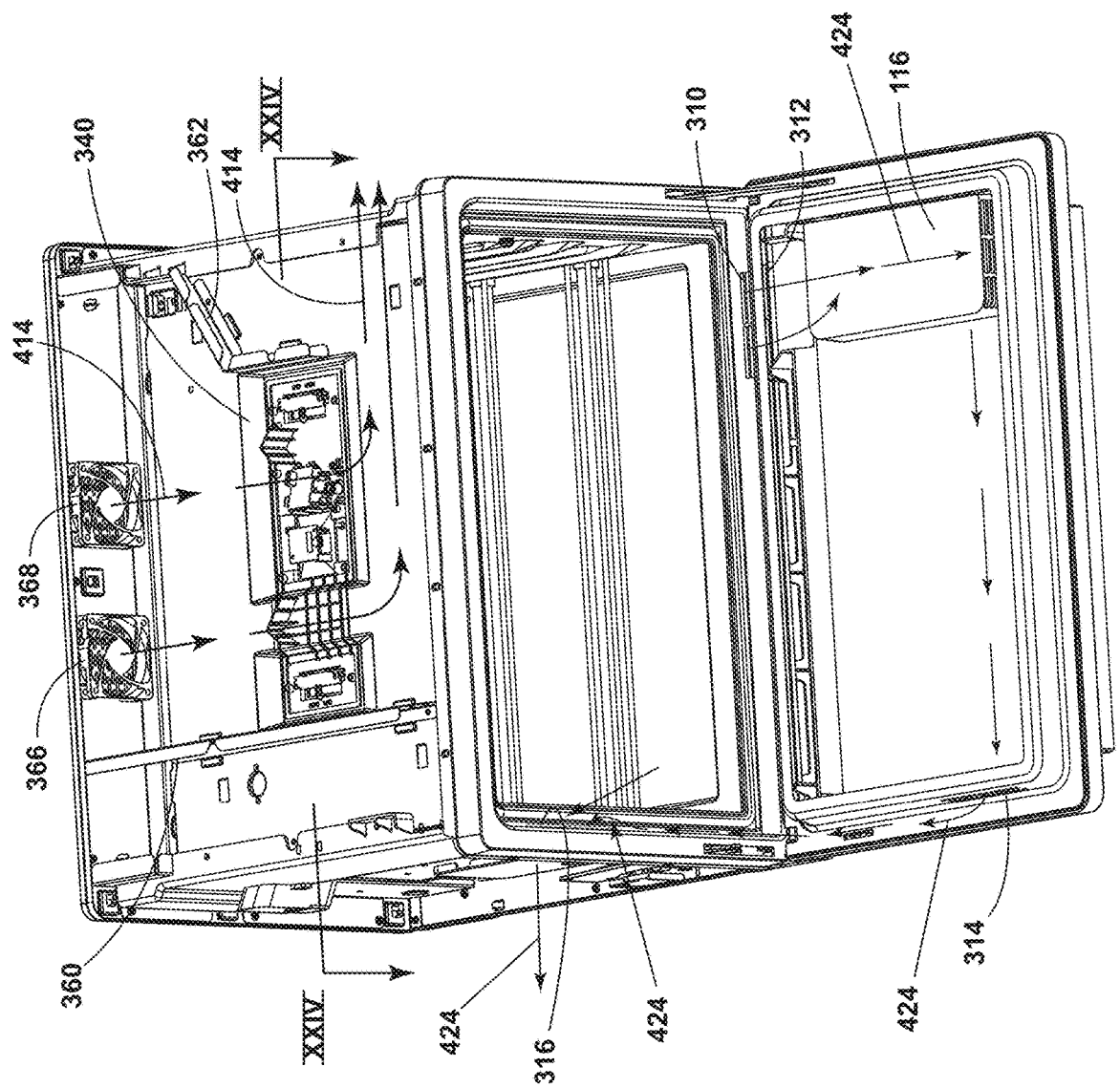
FIG. 22 is a top, front perspective view of the oven of FIG. 21 with the door opened to illustrate an additional part of the cooling air flow path for the door.

Referring to FIG. 21, a door cooling air flow path 424 begins with bottom fan 392 drawing air in through the bottom wall vent 60 (FIG. 5) and flowing between the bottom wall deflectors 388, 390 to the frame outlet vent 310. Referring to FIG. 22, from the frame outlet vent 310, the air enters the interstitial space 300 of the door 286 through the inlet vent 312, where the air passes over the HMI 116 and is then deflected toward the outlet vent 314, where the air exits the door 286 and enters the inlet vent 316 and subsequently is emitted through the cabinet left side vent 42. While FIG. 22 shows the cooling air flow path 424 with the door 286 open for ease of understanding, in operation, the door 286 will be closed and the inlet/outlet vent combinations 310/312 and 314/316 will confront each other to permit the described air flow.

Figure 23:
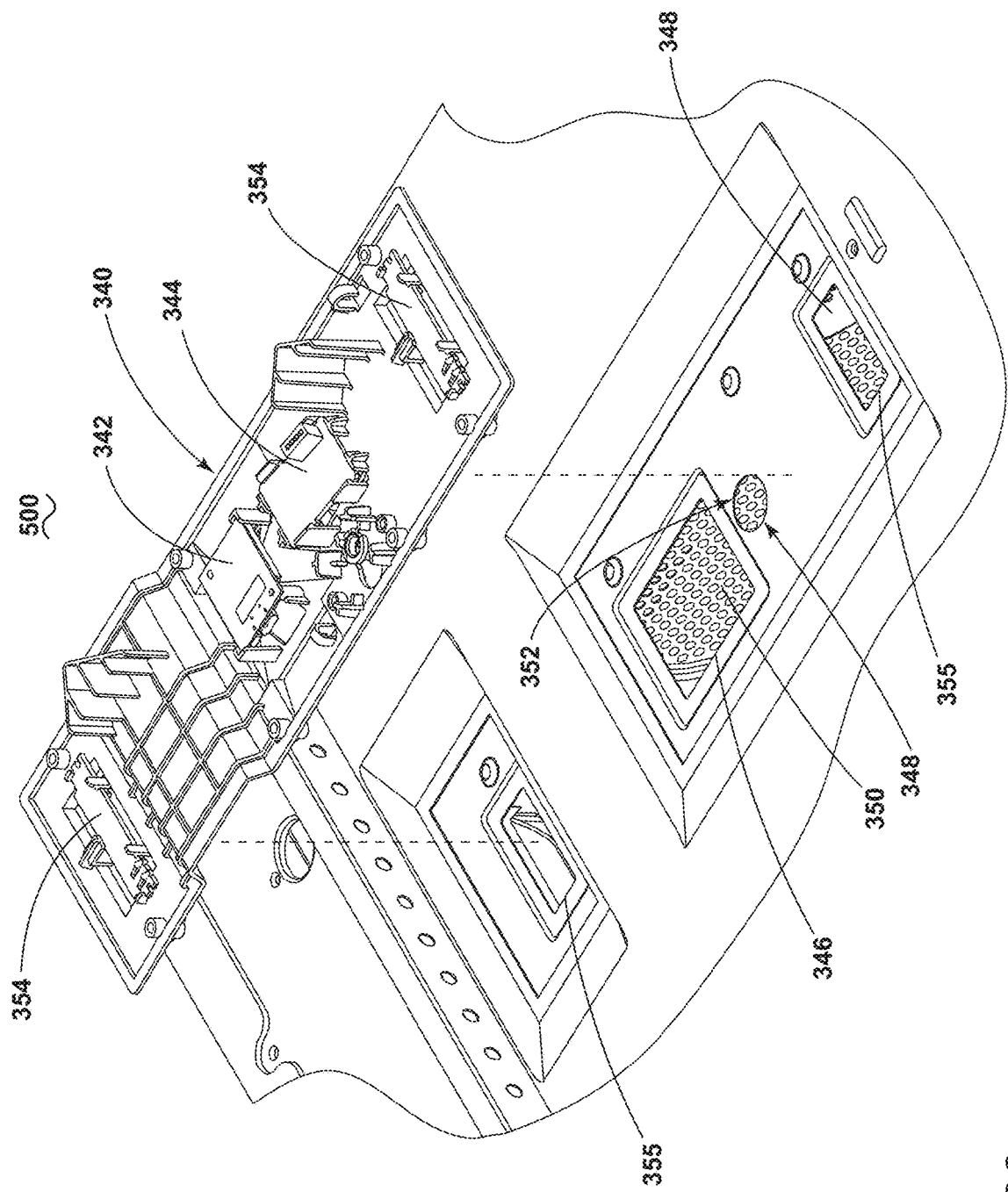
FIG. 23 is a perspective view of a sensor assembly for the oven.

Referring to FIG. 23, attention is now directed to the sensor assembly 340, which is illustrated as a single module 500 housing the camera 342, IR sensor 344, and the illumination source 354. While only the camera 342 an IR sensor 344 are shown, other sensors are contemplated, such as an SCiO sensor that can be used to monitor the nutritional content of the food as it is being cooked. The SCiO sensor if used, need not necessarily be included with the module 500. It could be located elsewhere, such as on a left or right side of the insert. Another contemplated sensor is a weight or mass sensor, which can be located inside or outside of the cooking chamber 142. One possible configuration is to use a strain gage and place it at a location on the cabinet where the weight of the insert is sensed by the strain gage. The insert 130 can be supported by a support structure, such as a bushing, relative to the bottom wall 20 of the cabinet 12 and the stain gage be incorporated in the support structure.

Figure 24:
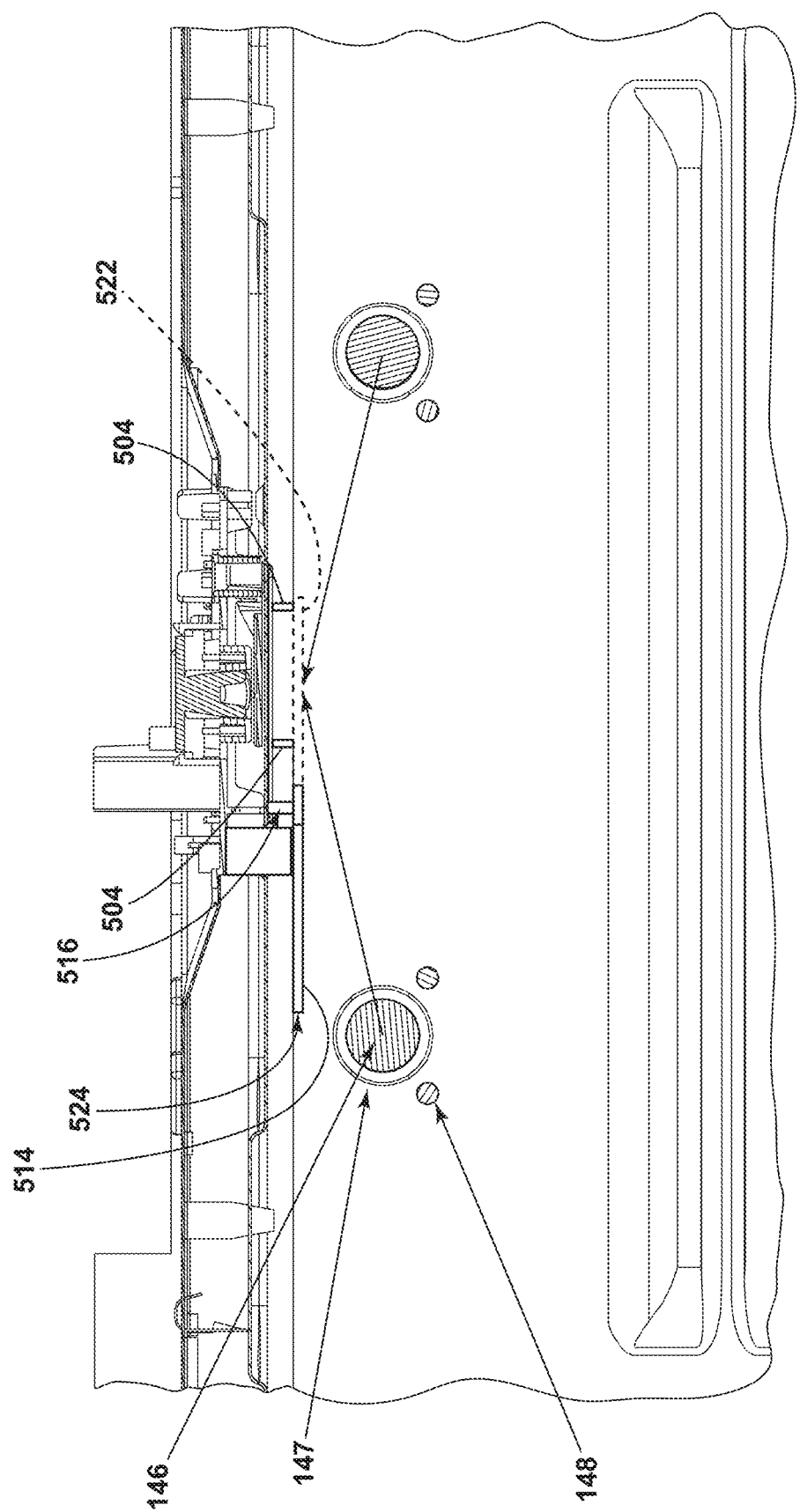
FIG. 24 is a sectional view of the sensor assembly mounted to a top wall and showing the relative location of the heating elements and the sensor assembly.

Referring to FIG. 24, a sectional view of a portion of the cooking chamber 142 shows the physical relationship between the IR sensor 344 and the radiant heating elements 146, which should be taken into consideration as radiant heat emitted directly into the IR sensor 344 can adversely impact the accuracy of the IR sensor 344. As can be seen in an alternatively configuration, the top side 132 of the insert 130 has a shield, illustrated as downwardly turned flanges 504, between the radiant heating elements 146 and the IR port 348, which receives the optical element 352. The flanges 504 function to shield the IR port 348 from directly receiving radiant emission from the radiant heating elements 146 as illustrated by the ray lines 506, which illustrate the path along which radiant heat is directly emitted. In many cases, the low-e glass is sufficient to practically reduce the effects of direction radiation. However, in some cases it may not be, and/or, the low-e glass may not be used. In such an instance, a shield, such as the flanges 504, can be used.

Figure 25:
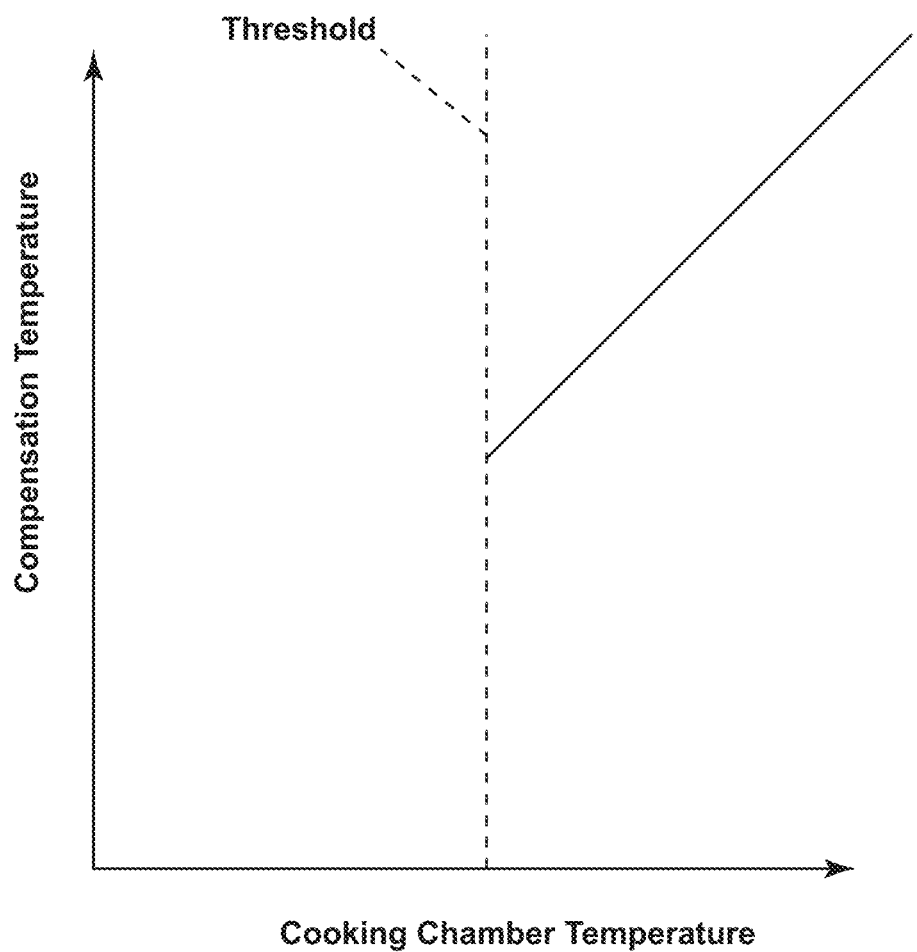
FIG. 25 is a graph of a compensation factor for an IR sensor of the sensor assembly.

As with direct radiation, the temperature of the cooking chamber 142 can also adversely affect the efficacy of the IR sensor 344. As the cooking chamber temperature increases, the IR sensor 344 "sees" the cooking chamber temperature as radiant heat, which can lead to an erroneous temperature reading of the food item placed within the cooking chamber 142. This phenomena is most pronounced when a new food item is placed in the cooking chamber 142 after the completion of a cooking operation and the cooking chamber 142 is still hot from the prior cooking operation. For example, if a frozen food item is placed in the cooking chamber 142 after the completion of a cooking operation, the IR sensor 344 will "see" the radiant heat from the heated cooking chamber, which will overwhelm the IR signature from the frozen food item and lead to a possible erroneous initial reading of the temperature of the frozen food item. Under such circumstances, the IR signal from the IR sensor 344 can be compensated, such as by the controller 356. One suitable compensation scheme can be based on the cooking cavity temperature, which can be determined by a traditional temperature sensor 644 for the cooking chamber 142, with the traditional temperature sensor 644 providing an input signal to a processor/controller representative of the air temperature within the cooking chamber 142, such as the controller 356. The amount of compensation needed has been found to be essentially a linear relationship between the cooking cavity temperature and the IR signal. The linear relationship can be represented by a linear function, such as Actual Food Temperature=IR Sensor Temp−A(Cooking Chamber Temperature) Temp+B. The coefficients A and B will vary depending on the specific oven structure and IR sensor and can be experimentally obtained. As seen in FIG. 25, the linear relationship is normally applicable above a threshold temperature for the cooking chamber 142. Below the threshold cooking chamber temperature, the ambient temperature effects on the IR sensor are not practically consequential.

Figure 26:
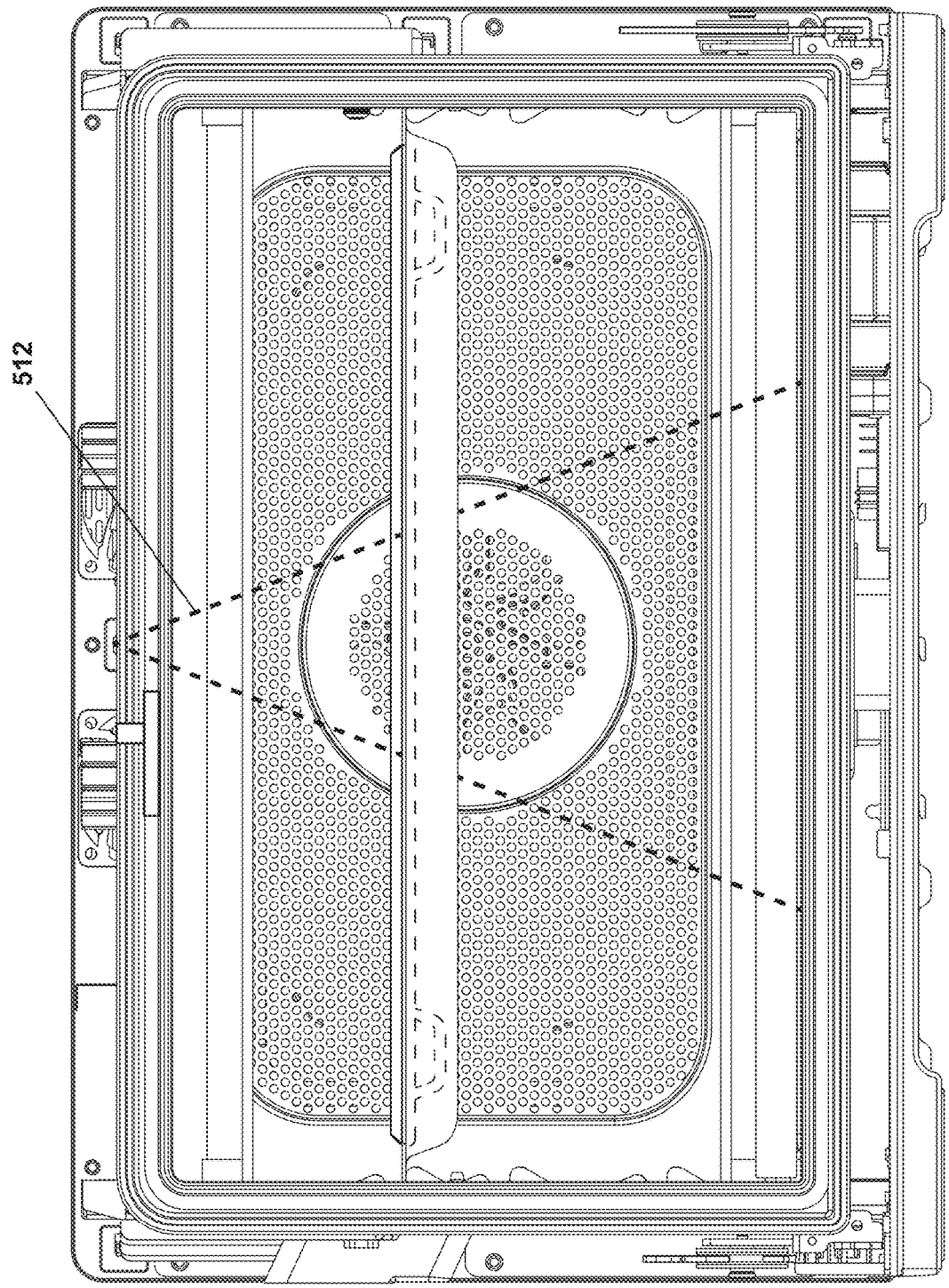
FIG. 26 is a partially-sectioned, perspective view of the cooking chamber insert illustrating the field of view (FOV) of a sensor from the sensor assembly.

Referring to FIG. 26, the camera field of view (FOV) is illustrated by the pyramidal cone 512. The FOV may take on other shapes depending on the shape of the camera sensor 342 and any corresponding lens. As the camera is fixed to the top side 132 of the insert 130, the FOV is fixed, which can provide a physical reference relative to the cooking chamber 142 and aid in the determination of the location of an accessory or food item within the cooking chamber 142. For example, the height of the baking rack 188, or any of the accessories for that matter, can be determined using the camera 342. The camera 342 can be used to take reference images of the baking rack 188 at different levels, as determined by the rails 144, within the cooking chamber 142. The reference images can be saved in the memory of the controller 356. During a cooking operation, the camera 342 can take an operational image of the cooking chamber 142 and compared, such as by an overlay algorithm, to determine which of the reference images best matches the operational image and the corresponding level of the reference image can be used as the level within the cooking chamber 142.

The level of the baking rack 188 within the cooking chamber 142 can be used to control the operation of the radiant heating elements 146. For example, if the identified food is up the type sensitive to radiant heat on one side, such as the browning of the food surface or the burning of the bottom of the bottom of the food item, then the radiant heating elements 146 can be proportionately controlled to control the percentage of radiation from the top (top heat) or bottom (bottom heat) while maintaining the cooking chamber 142 at the desired baking temperature.

During the operating of the oven 10, sensors, like the camera 342 and IR sensor 344, are not always needed. A movable cover can be provided for one or more of these sensors to protect them when not in use. FIG. 24 illustrates one possible sensor assembly 340 configuration having a moveable cover in the form of a shield 514, which is secured to a rotatable shaft 516 that extends through the top side 132 of the insert 130. An actuator in the form of a linear actuator (not shown) is coupled to the shaft 516, whereby linear reciprocation of the linear actuator 518 effects a rotation of the shaft 516 to pivot the shield 514 between a first position 522 (shown in dashed lines), covering the sensor, and a second position 524, uncovering the sensor. Such a cover can be used for any of the sensors. Such a cover is particularly useful for the IR sensor 344.

Over time, the sensors and/or the optical elements 350, 352 protecting the sensors can become dirty and need cleaning for best performance. The camera 342 can be used to determine when it is time to clean the sensors and/or the optical elements 350, 352. The camera 342 can be used in different ways to make a need for cleaning determination. One method is for the camera 342 to take an initial reference image and then take a follow up image. The follow up image is compared, by the controller 356, to the reference image to determine the amount of dirt on the optical elements 350, 352. Once the amount of dirt satisfies a threshold, the cleaning determination is made. An alert can be displayed on the HMI 116 to notify the user that cleaning is needed. The follow up images can be taken at any time. A convenient time to take such an image would be at the beginning of each operation as the sensor being used.

Another method in which the camera can be used is to detect the reduction of light being received by the camera 342. As the optical elements 350, 352 become dirtier over time, the amount of light received by the camera is reduced. To account for variations in ambient light, the illumination source 345 can be energized during this determination in order for the amount of light in the cooking chamber to be consistent. When the light transmission falls off a predetermined amount, as determined by the processor 356, an alert can be displayed on the HMI 116.

As an alternative to the change in light transmission, the modulation transfer function (MTF) of the camera system can be monitored to make the cleaning determination. The MTF represents the spatial frequency response of camera 342. It is the contrast at a given spatial frequency relative to low frequencies. As the MTF is not limited to a camera 342, it can be used for the IR sensor 344. Thus, separate cleaning determinations can be made for the camera 342 and the IR sensor 344.

The MTF for a sensor can be repeatedly determined, such as with each operation of the smart oven 10. For example, at the completion of each cooking operation, a new MTF can be determined. The most recent MTF can be compared to a reference value for the MTF. When the most recent MTF satisfies a threshold relative to the reference value, such as exceeds the reference value, then it can be determined that the sensor needs cleaning. Alternatively, the change over time of the repeatedly determined MTF can be used to determine a change in the MTF. When the change satisfies a reference change value, such as the determined change over time exceeds a change value, then it can be determined that the sensor needs cleaned. The repeatedly determined MTF values can be stored over time, such as in the memory of the controller 356. Alternatively or in addition, a running total of the change can be stored, and the running change can be compared to the change reference value. These are just a few ways in which the use of the MTF to determine cleaning can be implemented.

Another alternative to determining when the sensor or corresponding optical element needs cleaning can be based on either or both the time of operation or the number of executed cooking operations. A counter for the time of operation and/or the number of executed cooking operations can be maintained in the controller 356. When the cumulative time or total number of cooking operations satisfies a corresponding time or number reference value, then an alert can be displayed on the HMI 116.

It will be understood that any of the preceding methods described for determining a need for cleaning of optical elements 350, 352 apply not only to countertop cooking appliances such as the oven 10, but can have applicability in any type of cooking appliance. Further yet, the methods can have applicability in determining a need for cleaning in any context in which an optical system is used, not limited to cooking appliances.

Figure 27:
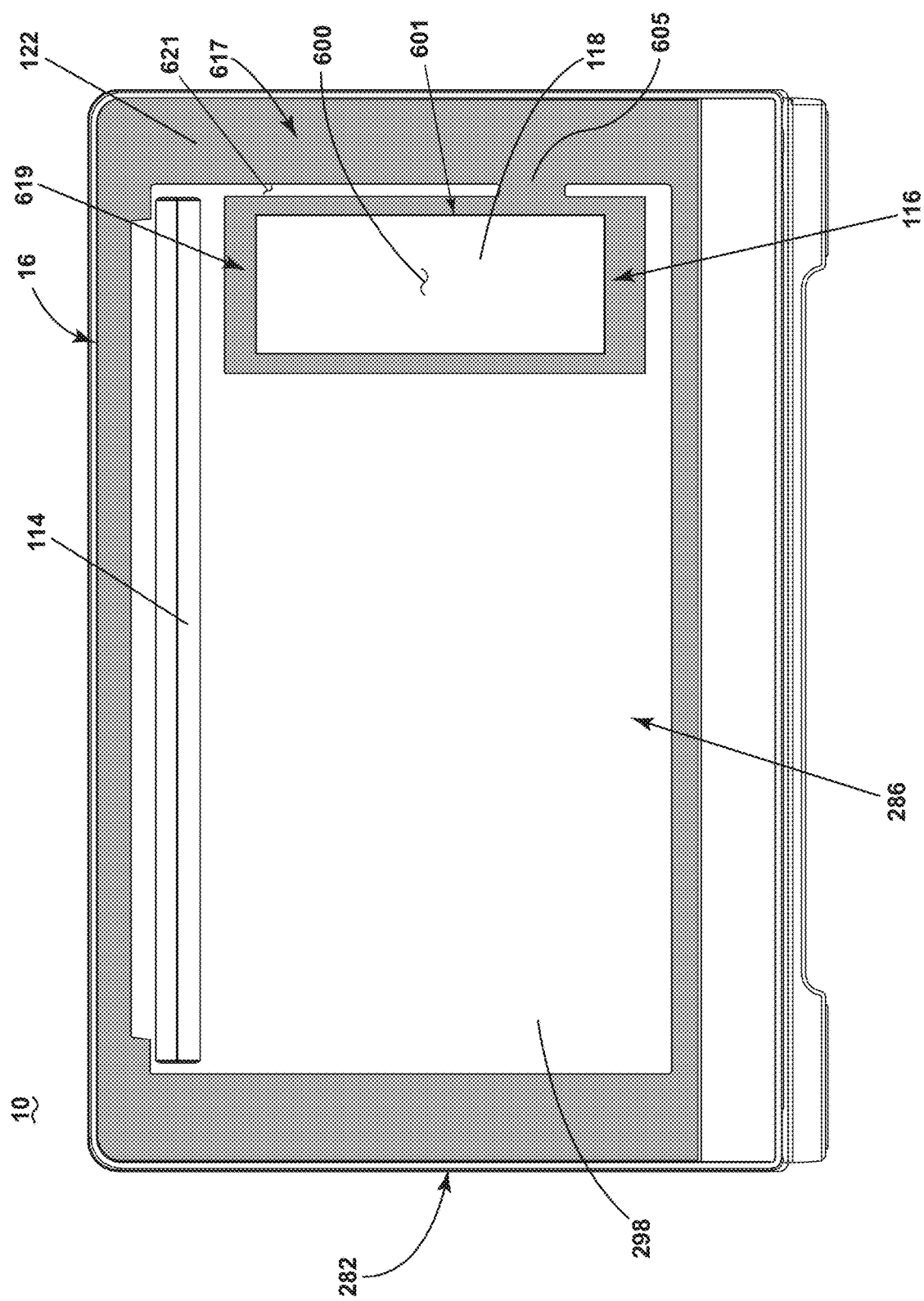
FIG. 27 is a front view of the oven of FIG. 1, illustrating aspects of a human machine interface.

With reference to FIG. 27, attention is now directed to the structure and operation of the control systems and operation of the oven 10. FIG. 27 is a front view of the oven 10 illustrates aspects of the HMI 116 and mask 122 relative to the door 16, shown in a closed position. As shown, the mask 122 can include a defined portion visibly distinguishable from other portions of the door 286, such as the outer pane 298. In this sense, the mask 122 can be colored, doped, or otherwise selected to define a visibly distinctive view. For example, in an aspect of the disclosure where the outer pane 298 is clear or transparent, the mask 122 can be colored, opaque, or tinted so the mask 122 defines a non-transparent portion of the door 16. At least a portion 601 of the door 286 or mask 122 can define a transparent window or aperture 601, through which the HMI 116, or display 118 thereof, can be received.

Referring back to FIG. 7, the mask 122 can include any geometric configuration at or about the door 16, relative to the outer pane 298, the HMI 116, or the like. For example, the mask 122 of FIG. 7 illustrates a first non-limiting example, while the mask 122 of FIG. 27 illustrates another non-limiting example. As shown, non-limiting examples of the mask 122 can further include a first perimeter mask portion 617 that encircles the outer perimeter of the door 286 and a second inset mask portion 619 that encircles the HMI 116. As shown, the second inset mask portion 619 can be at least partially spaced from the first perimeter mask portion 617 by a mask gap 621. In non-limiting example, the second inset mask portion 619 can be at least partially spaced from the first perimeter mask portion 617 by a mask gap 621, while also connected by a mask continuity portion 605. In one example, the second inset mask portion 619 can be sized, shaped, or otherwise geometrically arranged or disposed to correspond with the shape or boundaries of the HMI 116 or display 118. For example, as shown, the HMI 116 is generally rectangular, as is the second inset mask portion 619. The orientation of the HMI 116, the display 118, and the second inset mask portion 619 can also be similarly arranged, such that, for example, all primary dimensions (e.g. major length, minor width) are aligned. In one non-limiting example, the shape of the second inset mask portion 619 can indicate, demarcate, or otherwise identify the general boundaries of position of the HMI 116 or display 118, even when the HMI 116 is not active or the display 118 is not illuminated.

The display 118 can be configured to receive user inputs, for example, by way of a set of depressible buttons, or a touch screen surface 600. In one example, the HMI 116, the display 118, or a touch-sensitive input thereof can be positioned or disposed behind the outer pane 298 of the door 286. Non-limiting aspects of the touch screen surface 600 can include buttons, dedicated functionality indicators or buttons, capacitive or pressure-sensitive grid-based sensors, or the like. In one non-limiting example, the HMI 116 or touch screen surface 600 can include a lighting element (not shown), such as a backlight in order to visibly illuminate the display 118 for the user during operable or non-operable states of the oven 10. In another non-limiting aspect, the coloring, doping, tinting, or the like, of the mask 122 can be selected such that the HMI 116 or display 118 is indistinguishable from the mask during periods when the lighting element is not generating light. Stated another way, the mask 122 can be colored such that the HMI 116 or display 118 blends into the same color of the mask 122 at the aperture 601 when the touch screen surface 600 is not being utilized.

While "a set of" various elements will be described, it will be understood that "a set" can include any number of the respective elements, including only one element.

Figure 28:
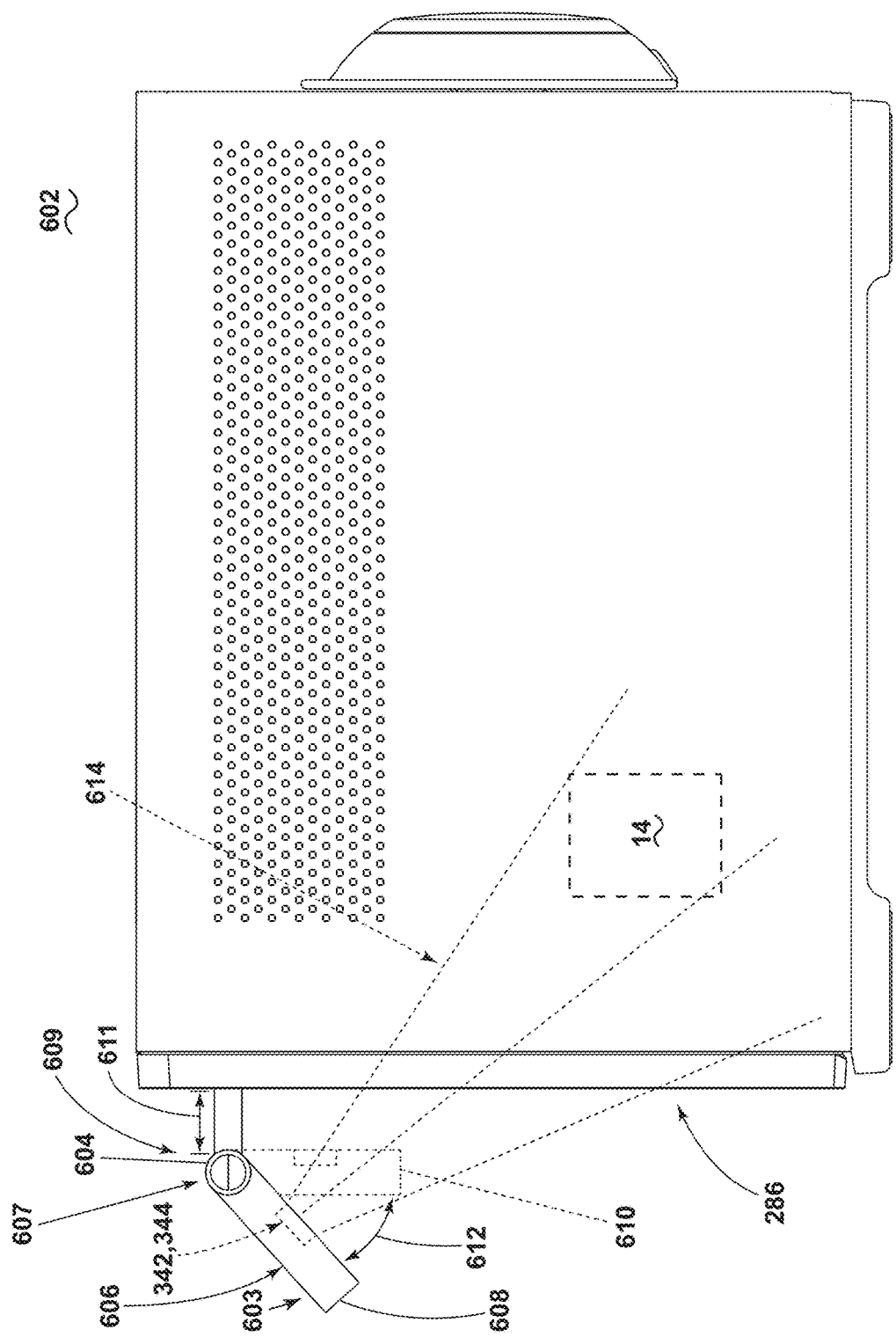
FIG. 28 is a side view of the oven of FIG. 1, illustrating an alternative human machine interface.

FIG. 28 illustrates another oven 602 illustrating an additional or alternative configuration of an HMI 603. The oven 602 is similar to the oven 10; therefore, like parts will be described, with it being understood that the description of the like parts of the oven 10 applies to the oven 602, unless otherwise noted. One difference is that the HMI 603 can be disposed on a portion of a handle 604. As shown from the side view of FIG. 28, the handle 604 can be secured to and extending away from an outer, front-facing surface of the door 286. The handle 604 can further include a grab portion 609, such as a portion adapted for grabbing by a user's hand to open and close the access opening. The grab portion 609 can be spaced from the door 286 to define an air gap (indicated by dimension 611) between the grab portion 609 and the door 286. The handle 604 can also include an extension extending from at least a portion of the grab portion 609 and having a pivotable housing 608. The housing 608 can include a display screen or touch sensitive surface 606, as explained herein, for receiving user inputs.

The housing 608 can be rotatably suspended from, and pivotable about the handle 604 at a pivot point 607 having a range of positions. For instance, the pivotable movement (illustrated by arrows 612) can enable or allow for a user to position or reposition the HMI 603 relative to the handle 604 or the door 286. In this sense, a user can operably move or adjust the HMI 603 about the pivot point 607 to select a preferred viewing angle of the touch sensitive surface 606. Non-limiting aspects of the disclosure can be included wherein the handle 604, pivot point 607, housing 608, or a combination thereof is configured to retain movement initiated by the user. In this sense, the handle 604, pivot point 607, housing 608, or a combination thereof, can include a biasing element to ensure the housing 608 does not rotate about the pivot point 607 without forced intervention by the user. Stated another way, the housing 608 can hold at a particular angle about the pivot point 607, after adjustment by the user. Additionally, aspects of the disclosure can be included wherein the pivotable movement of the housing 608 is restrained such that the housing 608 can only be moveable 612 between a limited range of angles, relative to the handle 604 or the door 286. For example, a dotted housing outline 610 illustrates one example where the housing 608 can be positioned in parallel with the door 286 (e.g. such that the range of motion prevents rotating the housing 608 into the air gap 611), while an example maximum pivotable angle can be 90 degrees (e.g. normal) relative to the outer surface of the door 286. While 90 degrees is described, any maximum angle between the housing 608 and surface of the door 286 can be included in aspects of the disclosure, including larger obtuse angles (greater than 90 degrees) or smaller acute angles (less than 90 degrees).

Additionally, while not shown in the perspective of FIG. 28 non-limiting aspects of the disclosure can be included wherein the HMI 603 or touch sensitive surface 606 can extend at least a portion of, or the entire length of the lateral span of the handle 604 along the outer surface of the door 286. Thus, aspects of the disclosure enable or allow for an HMI 603 mounted relative to a moveably mounted door 286 allowing for selectively opening and closing an access opening to the interior 14 of the oven 602. Additionally, non-limiting aspects of the disclosure can be included wherein the housing 608 can be further slidably moveable along, or in the axial direction of the grab portion 609.

In another non-limiting aspect of the disclosure, the housing 608 or HMI 603 can further include one or more sensors described herein. For example, as schematically dotted in outline, the housing 608 can include the camera 342 or IR sensor 344 described herein. In this sense, during operation of the oven 602, non-limiting aspects can be included wherein one or more sensors, such as the camera 342 or IR sensor 344, can be positioned to sense an aspect of the food stuff, or another aspect of a cycle of operation for the oven 602. For instance, in the example of the camera 342, the camera 342 can define a field of view 614, and whereby the field of view 614 is pivotable by way of the pivot point 607. In this example, the camera 342 can be positioned by a user during adjustment of the HMI 603 or housing 608, and wherein the field of view 614 can visualize, sense, or otherwise view the inner cavity or interior 14 of the oven 602 (or food stuff therein) through a portion of the door 286 (e.g. via a clear or transparent portion of the door 286). The oven 602, in response to the sensing by the sensor, can adjust or otherwise tailor a cycle of operation performed on an article in the treating chamber, such as food stuff in the oven cavity or interior 14.

Figure 29:
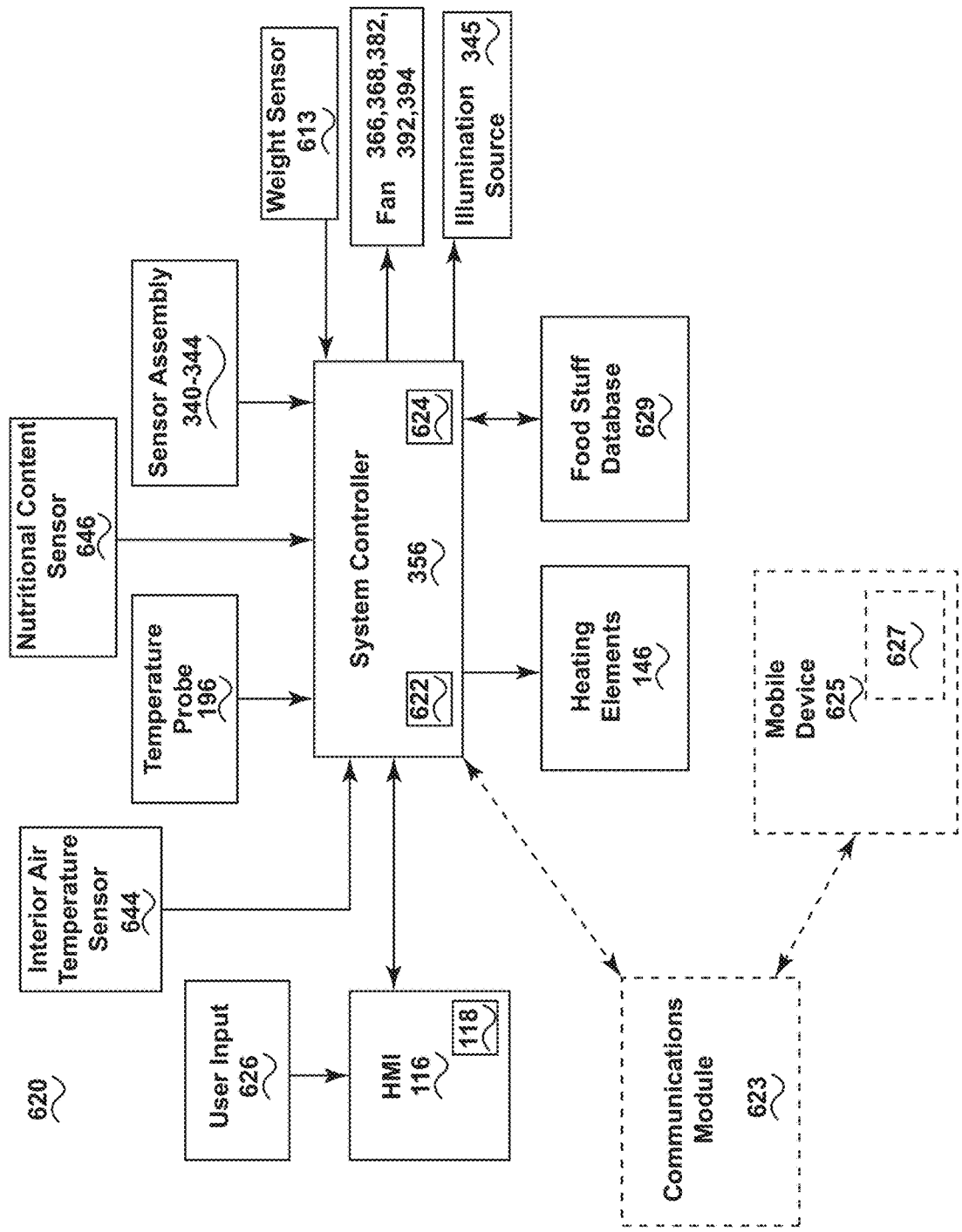
FIG. 29 is a schematic view of an oven system for operating the oven of FIG. 1.

FIG. 29 illustrates a schematic view of an oven system 620 for operating at least one cycle of operation of the oven 10 on an article in the treating chamber. As shown, the oven system 620 can include the system controller 356 having a processor 622 and memory 624. Non-limiting examples of the memory 624 can include Random Access Memory (RAM), Read-Only Memory (ROM), flash memory, or one or more different types of portable electronic memory, such as discs, DVDs, CD-ROMs, etc., or any suitable combination of these types of memory. The processor 622 can be configured to run any suitable programs or executable instructions designed to carry out various methods, functionality, processing tasks, calculations, cycles of operation, or the like, to enable or achieve the technical operations or operations described herein. The program can include a computer program product that can include machine-readable media for carrying or having machine-executable instructions data structures, or cycles of operation stored thereon. Such machine-readable media can be any available media, which can be accessed by a general purpose or special purpose computer or other machine with a processor 622. Generally, such a computer program or "application" can include routines, programs, objects, components, data structures, algorithms, etc., that have the technical effect of performing particular tasks or implement particular abstract data types.

An "application," as used herein, can include an application programing interface (API) for interacting with the application or a user, and can enable accessing the memory 624 in which digital data can be stored or retrieved. The application can use the processor 622 or system controller 356 to operate, execute, or otherwise "run" the application, as desired. Additionally, the application can use the display 118, the HMI 116, or the like, as an interactive display or user interface to allow for receiving user input in order for a user to manipulate the application or operation of the oven 10 or oven system 620.

In one non-limiting aspect, the system controller 356 can be communicatively connected to a set of sensors or data inputs for receiving sensed or measured values or other inputs. For example, the system controller 356 can receive inputs from at least a subset of the temperature probe 196, the sensor assembly 340, the camera 342, the IR sensor 344 (for sensing the temperature of a food item), mass or weight sensor 613 (for sensing the weight of the food item), a nutritional content sensor 646, an air temperature sensor 644 (for sensing the air temperature of the interior 14 or cooking chamber), or a combination thereof. Additional sensors or data inputs are envisioned. The system controller 356 can further be communicatively connected with controllable element, including, but not limited to, a set of heating elements 146, the set of aforementioned fans 366, 368, 382, 392, 394, an illumination source 345, and the like. In this sense, the system controller 356 can be configured or adapted to receive a set of inputs, and based on at least a subset of inputs, generate a set of control signals to operate the set of controllable elements.

In one example, receiving the inputs and controlling the outputs can be based on one or more comparisons of received inputs with dynamic or predetermined values (e.g. oven temperature or food stuff temperature being heated to a threshold temperature value), and determinations made from these comparisons (e.g. continue cooking). In another non-limiting example, receiving the inputs and controlling the outputs can further be based on operating a cycle of operation of the oven 10 on an article in the interior 14, such as food stuff. Non-limiting examples can further be included wherein a set of components are independently operable or controllable. For instance, the cycle of operation, or the controllable output of the system controller 356 can be adapted to operate only a subset of the fans 366, 368, 382, 392, 394, or a subset of the four heating elements 146. In another non-limiting example, the set or a subset of the heating elements can be energized or enabled to control different cycles of operations, such as radiant heat control (e.g. for "browning" or "searing" a food item by enabling a set of top heating elements 146) compared with air temperature control.

At least a subset cycles of operations can be stored, for example, in the memory 624 of the system controller 356. The cycle of operation can further be based on a particular food stuff that the cycle of operation is being executed upon. For example, the oven system 620 can further include a food stuff database 629 having a set of stored data related to different food stuff, and wherein the cycle of operation is at least partially based on data received from the food stuff database 629.

The system controller 356 can further be communicatively coupled with the HMI 116, and can receive a user input 626 provided to the HMI 116 or the display 118. In this sense, the operation of the system controller 356 or one or more cycles of operations or cooking options can be presented to a user for selection or confirmation, and upon selection or confirmation, a selected cycle of operation can be executed or effected by the system controller 356 based on receiving the inputs and controlling the outputs, as described.

As used herein, while sensors or inputs can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to the system controller 356 or processor 622, and the system controller 356 or processor 622 can perform processing on the value to determine a representative value or an electrical characteristic representative of said value.

Optionally, the system controller 356 can further be communicatively connected with a communications module 623 configured or adapted for communicative transmission of data, images, control parameters, or the like to another device, shown for example as a mobile device 625. Aspects of the disclosure can also include communication modules configured or adapted to enable communication between a first component and a second component. In this sense, the first component can be operably coupled to the communication module to allow, enable, or otherwise provide for data, messages, transmissions, or the like, in at least one direction (unilateral communication or bidirectional communication) with the second component. It is contemplated that a communications module can be adapted to enable the communication over a communication link, including but not limited to, a wired or a wireless communication link. The communication link can be any variety of communication mechanism capable of wirelessly linking with other systems and devices and can include, but is not limited to, packet radio, satellite uplink, Wireless Fidelity (WiFi), WiMax, Bluetooth, ZigBee, 3G wireless signal, code division multiple access (CDMA) wireless signal, global system for mobile communication (GSM), 3G, 4G, or 5G wireless signal, long term evolution (LTE) signal, Ethernet, or any combinations thereof. It will also be understood that the particular type or mode of wireless communication of the communication link is not germane to aspects of the disclosure, and later-developed communication links are certainly contemplated as within the scope of aspects of the disclosure. Non-limiting examples of the communications module 623 can include one or more antennae or a direct wired or conductive connection and executable instructions for transmitting or receiving communications to and from a network (not shown), or to and from nodes of the network.

In one non-limiting example adaptation, the communications module 623 of the oven system 620 can include transmitting or receiving capabilities, including one or more antennae and executable instructions for transmitting or receiving communications by way of the antennae. Thus, aspects of the disclosure can be included wherein the communication module 623 is enabled to send and receive messages or data to and from the system controller 356 to other devices, components, nodes of a network, or the like.

In the illustrated example, the mobile device 625 can include a mobile device display 627. Aspects of the disclosure can be included wherein at least one of the mobile device 625 or the mobile device screen 627 can display interface elements, cycles or operation, cooking options, or any other information provided or displayed by the HMI display 118. In this sense, the oven system 620 can be configured or adapted to co-display similar or complimentary interface elements of the HMI 116 on at least one of, or both, the HMI display 118 and a mobile device screen 627. The system controller 356 can further be configured or adapted to receive inputs provided by a user on either or both the HMI 116 and mobile device 625 to operably control oven system 620 operations described herein. Thus, aspects of the disclosure can include displaying interface aspects or elements on the HMI 116 or display that can be physically coupled to the cooking appliance or physically separated from the cooking appliance. In the event the display is physically separated from the cooking appliance, such as in the example of the mobile device screen 627, the interface aspects or elements on the HMI 116 can be wirelessly or indirectly wirelessly displayed on the mobile device screen 627 by way of a wireless connection to a local area network, a cellular data network, or any combination of networks. Additionally, the HMI 116, when presented on the mobile device screen 267 can also include a controllably mode to display an image or video feed of the oven 10. For example, a user can utilize the HMI 116 by way of the mobile device screen 267 to receive an image of a food item in the interior 14 of the oven 10, such as during cooking cycles of operation, in order to ensure desired cooking preferences. In this sense, a user can utilize the mobile device 625 to have a live feed or image of the cooking operations.

While a mobile device 625 is schematically illustrated, a similarly adapted node can include, but is not limited to, a laptop computer, desktop computer, tablet, mobile phone, browser window or portal having a network connection, or the like. The mobile device 625 or similarly adapted node can also include interactive elements for providing inputs, such as a keyboard, a mouse, a touch screen device, or a combination thereof, for interacting with executable applications. In one non-limiting example, the mobile devices 625 can include a processor or system controller, memory, one or more sets of executable instructions and be adapted for remotely executing a cycle of operation on the oven 10 or oven system 620.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements.

FIGS. 30A-30C illustrate a set of exemplary interface screens demonstrating characteristics of the HMI 116. As used herein, the illustrated example screens 4A-4C can be displayed by any available display associated with the oven 10, including, but not limited to, the HMI display 118, the mobile device display 627, or the like. As shown, the HMI 116 can include a display or set of display elements for displaying or interacting with HMI 116 or a user interface thereof. In one non-limiting aspect, the HMI 116 can include a first screen (FIG. 4A) viewable to a user for interacting with the oven 10, the oven system 620, or for operating aspects of the oven 10 or oven system 620. For instance, the HMI 116 can include displaying a current time 630 to the user, a text portion 634, a graphical portion 635, a set of selectable buttons 636, 637, or a combination thereof. As shown, the text portion 634 can include a timely greeting (e.g. "good evening," based on the current time 630), a set of instructions ("place you food into the oven"), or the like. Similarly, the graphical portion 635 can include images or graphics associated with the greeting, the set of instructions, or the like.

In another non-limiting example, the text portion 634, the graphical portion 635, the set of selectable buttons 636, 637, or a combination thereof, can be based upon a current cycle of operation. Non-limiting example cycles, sub-cycles, phases, or the like, of a cooking cycle of operation can include, but are not limited to, sensing, preheating, baking, searing, browning, thawing, defrosting, reheating, toasting, food-specific phases (e.g. pizza, cookies, etc.), or the like. For instance, when the oven 10 or oven system 620 is operating a cycle of operation, the HMI 116 can displayed additional textual or graphical information to the user. The additional textual information can include a cycle time 631 (such as a cooking time), a set of selectable options for the cycle of operation (selectable by way of a "gear" icon 633), an option to save the cycle of operation as a "favorite" cycle of operation 632, or the like. The HMI 116 can display additional graphical information in many different forms, including, but not limited to, dynamic or moving images or graphics demonstrating a cycle of operation is running or being executed, pulsing graphics, countdown-based graphics or progress-based graphics, or the like.

FIG. 30B illustrates another non-limiting exemplary interface screen for the HMI 116, wherein, for example, the HMI 116 includes another set of textual and graphical information related to the current cooking cycle of operation, or sub-cycle thereof. As shown, the textual information can include, but is not limited to, a current cycle, sub-cycle, or step of a current operation (e.g. "preheating" 638), a current temperature of the oven or food stuff 639, for example, as sensed or measured by an input or the temperature probe 196, one or more selectable option indicators 640 for the cycle of operation, or the like. While the sense or measured temperature is shown and described, aspects of the disclosure can include displaying sensed or measured temperatures or values for the interior 14 air temperature from the air temperature sensor 644, a food item interior temperature from the temperature probe 196, an external food item temperature from the IR sensor 344, or a combination thereof. Also as shown, the graphical information can include a ring-like progress indicator 641 having contrasting identifiers (color, sizing, pulsing versus non-pulsing) indicating the progress of the current cycle, sub-cycle, or step of a current operation. Additionally, a set of selectable buttons 642, 643 can be included, wherein the set of selectable buttons 642, 643 are related to the current cycle, sub-cycle, or step of a current operation. FIG. 30C illustrates yet another non-limiting exemplary interface screen for the HMI 116, for example, when no activity is requested or required by the user, or after a period of inactivity. As shown, the HMI 116 can continue to textually or graphically present information related to the current cycle, sub-cycle, or step of a current operation, while, for example, dimming the screen or removing a subset of the textual or graphical information present during interactive periods of operation.

Figure 31:
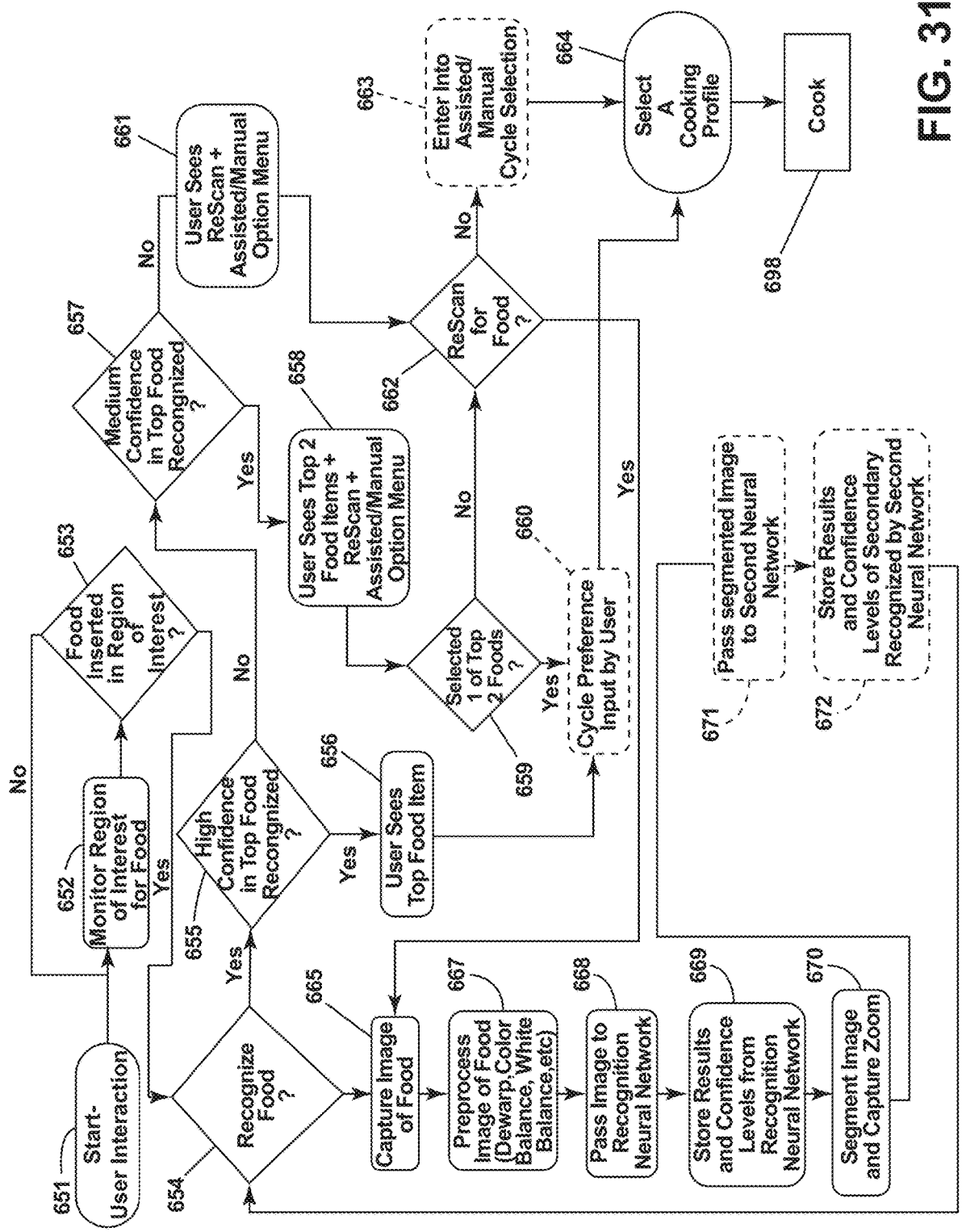
FIG. 31 is an example flowchart diagram of demonstrating a method of automatically cooking a food item in the oven of FIG. 1.

FIG. 31 illustrates a method of automatically cooking a food item in the cooking chamber, such as the interior 14, of a cooking appliance, such as an oven 10 or oven system 620. As shown, the method begins by starting user interactions, at 651. In one example, the method can include sensing the opening or closing of the door 286 to initiate starting the user interactions at 651. The user interactions can be facilitated by way of the HMI 116, for example. The method monitors a region of interest for food stuff, relative to the oven 10, such as within the cooking chamber or interior 15, by way of a set or subset of aforementioned sensors (camera 342, IR sensor 344, etc.), at 652. At 653, the method senses or determines if food is inserted in the region of interest. If food is not inserted in the region of interest, the method returns to 652. If food is inserted into the region of interest, the method proceeds to attempt to recognize the food inserted in the region of interest, at 654.

Recognizing the food can include, but is not limited to, sensing at least two characteristics of the food stuff, including shape, volume, mass, temperature, or color of a food item placed within the cooking chamber, to define a sensed dataset. In one non-limiting example, the sensing can be enabled by way of the camera 342, IR sensor 344, the mass or weight sensor 613, or the like. In one example, the camera 342 can measure, determine, or estimate a volume value of the food item, while the weight sensor 613 can measure, determine, or estimate a weight value for the food item. The combination of volume and weight of the food item can be utilized to measure, determine, or estimate a density of the food item, for recognition purposes. In another example, the IR sensor 344 can measure, determine, or estimate an initial temperature of the food item, which could include frozen, refrigerated, thawed, or room temperature values. The initial temperature of the food item can be utilized for recognition purposes, as well.

The recognizing of the food can be further based on, for example, automatically determining the food item based on the sensed dataset. The automatically determining can include, for example, executing a set of instructions by the system controller 356 whereby the sensed dataset can be compared with data elements or entries of the food stuff database 629. The automatically determining can further include determining a confidence level or value related to the certainty of the recognition or association of the food inserted into the region of interest and the automatic determination of the food item based on the sensed dataset. Example confidence levels or values can include, but are not limited to, high confidence, medium confidence, low confidence, or no confidence. Furthermore, the confidence levels or values can return a predetermined number of the "most confident" food item based on the determination. For example, a high confidence level includes a determination that the food item is the highest confidence associated with one food item (e.g. the item is a steak), while a medium or low confidence level determination can include a determination that the food item is likely one of a set of the highest confidence food items (e.g. the item could be a zucchini or a cucumber). A low confidence level determination can include even more possible food items than, for example, a medium confidence level determination.

In the event that the automatic recognition of the food inserted into the region of interest at 654 determines the food item based on the sensed dataset with at least a minimal threshold confidence level, the method can proceed, based on that confidence level. For example, the method can proceed to determining if the confidence level is at least at a high threshold confidence level, at 655. If the determined confidence level is a high confidence level, the method can including displaying, by the system controller 356 such as on the display screen 118, HMI 116, or the like, the most likely determined food item (e.g. the "top food item"), at 656. The method can proceed to optionally receiving one or more cycle of operation preference inputs from a user (for example, by way of the HMI 116 or the like) at 660. The method then proceeds to automatically selecting a cooking profile for the determined food item based on the automatic determination at 664, and can automatically proceed with cooking the determined food item based on the automatically selected cooking profile, at 698.

Thus, aspects of the disclosure can be included wherein, for example, the oven 10 or oven system 620 automatically determines a food item based on sensing the food item, automatically selects a cooking profile based on the determined food item, and automatically operating the cooking appliance, without further user confirmation, in accordance with the selected cooking profile, to cook the food item when the confidence level satisfies a confidence threshold (such as a high confidence level). Non-limiting examples of the cooking profile can include sub-cycles or phases of the cooking cycle of operation, time and temperature combinations for the respective phases, radiant heat control for the respective phases, or the like. Additionally, the cooking profile can also include user preferences (if known), especially for preferred cooking options such as doneness, searing, or the like. The user preferences can be received at the oven 10, for example, by way of the HMI 116, and stored by the system controller 356, such as in the memory 624, or as the preferences relate to specific food items, such as in the food stuff database 629.

In the event that the automatic recognition of the food inserted into the region of interest at 654 determines the food item with less than a high threshold confidence level, the method can proceed with another set of operations. For example, if the food inserted is determined with a medium threshold confidence level based on the sensed dataset at 657, the user can be presented with a set of options at the HMI 116. The set of options can include, but are not limited to, the top two confidence food stuff determinations for the user to select from (e.g. a zucchini or a cucumber), or options to rescan or re-determine the food item based on the sensed or a re-sensed dataset, at 658. In the event the user selects one of the presented food stuff options at 659, the method can proceed to receiving optional user cycle of operation preference inputs from a user at 660, followed by automatically selecting a cooking profile for the selected food item in 664 and cooking the selected food item at 698. If the user does not select one of the presented food stuff options, the method can proceed with rescanning the food inserted into the region of interest at 662, or optionally manually entering (or with assistance) cycle of operation selection information for the oven 10 or oven system 620, at 663. If the user optionally enters cycle of operation selection information at 663, the method can proceed to automatically cooking the food item in accordance with the manually entered cycle of operation at 698.

In the event that the automatic recognition of the food inserted into the region of interest at 654 determines the food item with less than a medium threshold confidence level, the method can proceed with yet another set of operations. For example, if the food inserted is determined with less than a medium threshold confidence level based on the sensed dataset at 657, the user can be presented with a set of options at the HMI 116. The set of options can include, but are not limited to, options to rescan or re-determine the food item based on the sensed or a re-sensed dataset, at 661. The method can proceed with rescanning the food inserted into the region of interest at 662, or a following action, as described herein.

In the event that the automatic recognition of the food inserted into the region of interest at 654 does not determine the food item with a minimal threshold of confidence level (e.g. low confidence level or no confidence level), or in the event that a rescan of the food item at 662 does not determine the food item with a minimal threshold of confidence level, the method can proceed to attempt to further identify or recognize the food. For instance, the method can proceed to capture an image of the food item by the camera 342 at 665. From there, the system controller 356 can operate to preprocess the image of the food item (e.g. dewarp, color balance, white balance, or another filtering or image processing technique) at 667. The method then passes the captured and processed image to a recognition neural network at 668, wherein the recognition neural network can be included in the oven 10 or oven system 620, or at a remote location, such as a third party networked server.

The method then stores the results and confidence levels for the food item and returned from the recognition neural network at 669. Next, the method can further segment or zoom based on the image captured at 665, and store the image for future use, for example, in the food stuff database 629, at 670. Optionally, the method can further pass the captured or segmented image to a second neural network at 671 for further identification, then stores the results and confidence levels for the food item based on the secondary recognition by the second neural network at 672. The method then returns to attempt to re-recognize the food inserted in the region of interest, at 654.

The sequence depicted is for illustrative purposes only and is not meant to limit the method in any way as it is understood that the portions of the method can proceed in a different logical order, additional or intervening portions can be included, or described portions of the method can be divided into multiple portions, or described portions of the method can be omitted without detracting from the described method. For example, in one non-limiting example, the method can include additional determination levels based on varying confidence levels. For instance, if the food inserted is determined with a low threshold confidence level based on the sensed dataset at 657, the user can be presented with another set of options at the HMI 116, such as selecting a food item from the top four confidence food stuff determinations for the user to select from, or options to rescan or re-determine the food item based on the sensed or a re-sensed dataset. In another non-limiting example, the method can include to recognize the food at 654 by way of sensing at least three of the shape, volume, mass, temperature, and color food stuff characteristics. In another example, recognizing the food is the based on all of the sensed shape, volume, mass, and color of the food item. The confidence level can be improved based on the time of day. For example, certain types of food are more likely to be cooked at certain times of day, such as traditional breakfast foods during breakfast time, traditional lunch foods at lunch time, and traditional dinner foods at dinner times. For example, if an initial detection identifies a breakfast food and dinner food as two equally possible food types, the time of day can be determined, and, if the time of day is a traditional breakfast time, then greater confidence can be given to the traditional breakfast food over the traditional dinner food.

In yet another non-limiting example, the user-selected or automatically selected cooking profile can include selecting the cooking profile based on the automatic determination and the sensed temperature of the food item. In yet another non-limiting example, the cooking profile can include at least one of a defrost phase or a thawing phase followed by a cooking phase, based on the sensed temperature of the food item. In even yet another non-limiting example, the cooking profile can include both a cooking phase and a searing phase. In yet another example, determining the confidence level can include comparing the sensed dataset to prior sensed datasets with corresponding user confirmation. In yet another example, the automatic selection of cooking options can occur based on the expiration of a predetermined amount of time, wherein the user could select or modify presented cooking cycle options.

Figure 32:
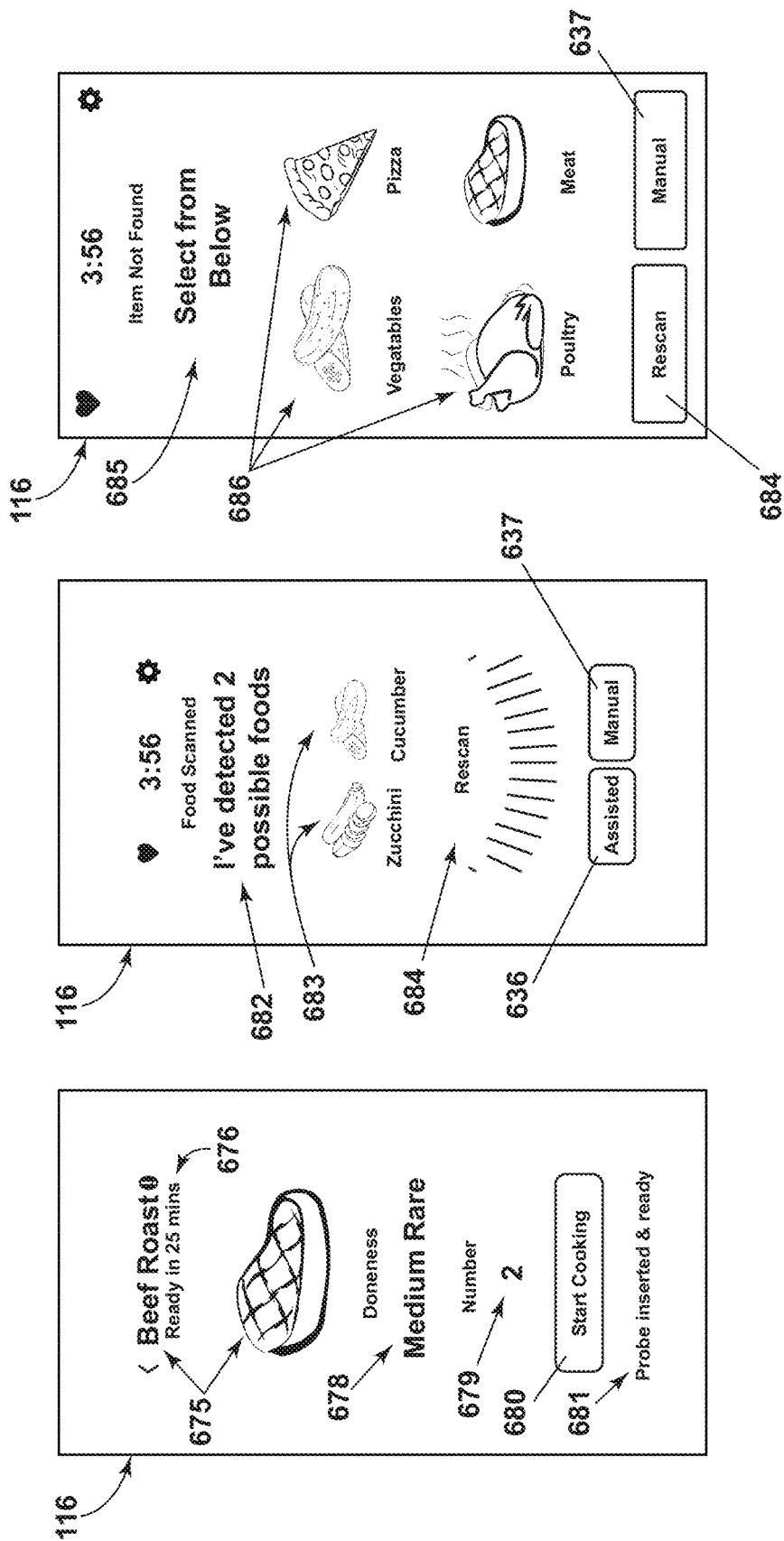
FIGS. 32A-C are a set of exemplary interactive displays demonstrating a view of available interaction screens of the human machine interface while operating the method of automatically cooking the food item in the oven of FIG. 1.

FIG. 32A illustrates an example of the HMI 116 presented to a user in the event of a high confidence level determination. As shown, the HMI 116 can textually or visually describe the identified food item 675, or a food stuff item representative thereof (e.g. a stored generic image of the item, compared with an image captured by the camera 342). The HMI 116 can further provide an estimated cooking time 676 of the food item, as well as optionally selectable cooking cycle of operation selection information 678, 679, 680, 681. For instance, in the illustrated example, a steak is identified, enabling optionally selectable cooking cycle of operation selections for "Doneness" 678, a selectable quantity of steaks 679 to be cooked, an option to utilize the temperature probe 196, and an option to begin the cooking cycle of operation 680. As described, the selectable cooking cycle of operation selection information can affect the selected cooking cycles of operation. As shown, the HMI 116 can further include the use of identification of optional cooking accessory information ("probe inserted and ready" 681).

FIG. 32B illustrates an example of the HMI 116 presented to a user in the event of a medium confidence level determination. As shown, the HMI 116 can textually or visually describe a message 682 indicating the confidence level, instructions for the user to complete, or the like, as well as images 683 for the top confidence food determinations. The user can further be presented with an option to rescan 684 the food item or buttons for manual or assisted entry of cooking cycles of operation 636, 637.

FIG. 32C illustrates an example of the HMI 116 presented to a user in the event of a low confidence level determination. As shown, the HMI 116 can textually or visually describe a message 685 indicating the confidence level, instructions for the user to complete, or the like, as well as images 686 for the top confidence food determinations. The user can further be presented with an option to rescan 684 the food item or for manual entry of cooking cycles of operation 637.

Figure 33:
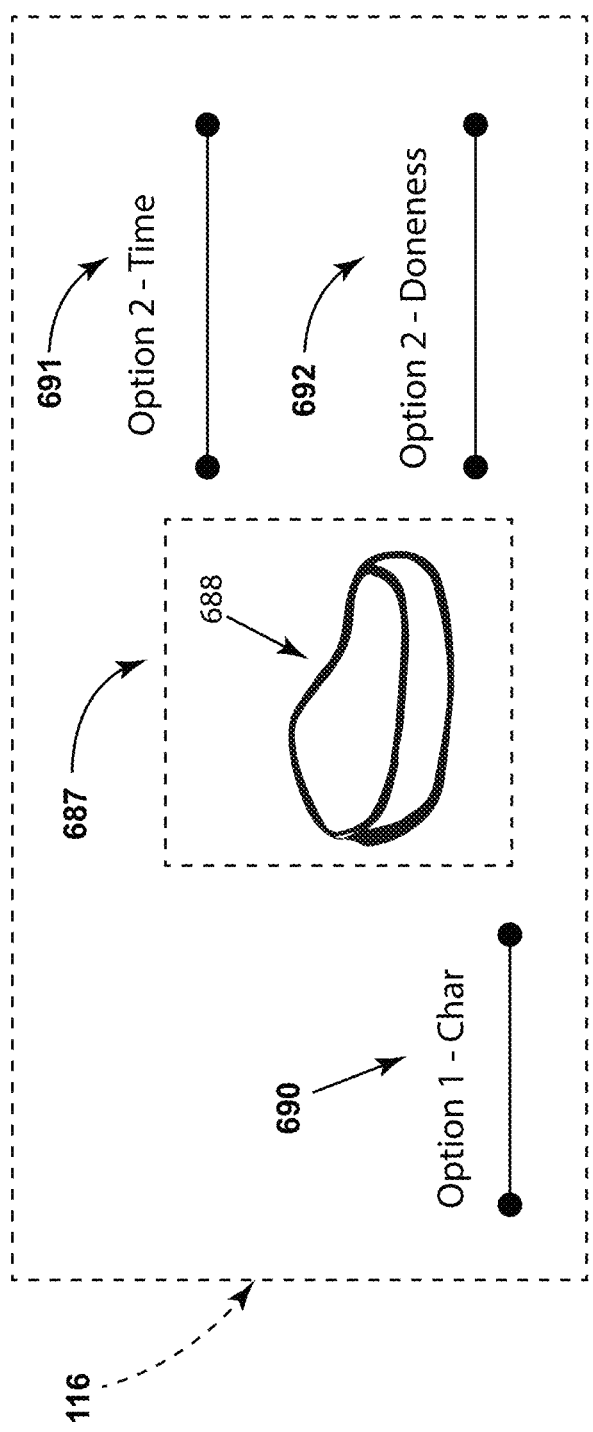
FIG. 33 is an exemplary interactive display demonstrating a view of cooking options of the human machine interface.

Non-limiting aspects of the disclosure can further include a method of determining a preferred cooking cycle of operation, such as a preferred level of "doneness" for the food item automatically cooked in a cooking appliance. As shown in FIG. 33, the HMI 116 can display an example image of the recognized food item (shown as an example steak 688) or an image of the actual food item in the interior 14 of the oven 10, as a graphical layer 687. The HMI 116 can further include user-selectable options related to the cooking cycle of operation, including, but not limited to, "char" of the steak 690, a cooking time for the steak 691, and a "doneness" of the steak 692. Each user-selectable option 690, 691, 692 is shown having a slide mechanism for selecting a value for each option, but additional selection options are envisioned.

In addition to displaying on a HMI for the oven 10 an image of the food item 688 being cooked, aspects of the disclosure can be included wherein the selection of the user-selectable options 690, 691, 692 can affect the image of the food item 688 to enable or otherwise provide feedback of the selected option to the user prior to initiating or completing the cooking cycle of operation. As shown in FIG. 34A, a set of graphical or video overlays corresponding to one or more options or characteristics of the cooking cycle of operation can be overlain or placed on top of the food item or displayed image 688 (shown in dotted outline) to display one or more possible cooking cycle of operation conditions or outcomes. For example, a first "char" option selection 693 is shown wherein the user-selectable char option 690 indicates little to no char on the steak. In turn, the HMI 116 or system controller 356 has overlain the image 688 without much or any "char" overlay. In comparison, a second "char" selection 694 is shown wherein the user-selectable char option 690 indicates heavy or much char on the steak. In turn, the HMI 116 or system controller 356 has overlain the image 688 with a higher level of "char" overlay to present the user the possible char cooking cycle of operation condition or outcome. As used herein, a "higher level" of char can include a less-transparent overlay of char marks, darkened char marks, or a larger number of char lines, compared with a "lower level" of char.

Similarly, as shown in FIG. 34B, a set of graphical or video overlays corresponding to a user's "doneness" option selection 692. A first "doneness" selection 695 is shown wherein the user-selectable doneness option 692 indicates little to no "doneness" on the steak. In one non-limiting example, the level of "doneness" can be represented, for example, by a color change from red or rare steak to a darker or browner shade of steak. In turn, the HMI 116 or system controller 356 has overlain the image 688 without much or any "doneness" overlay (e.g. rare-cooked steak). In comparison, a second "doneness" selection 696 is shown wherein the user-selectable doneness option 690 indicates on the steak indicate a well-done steak.

Additional graphical or video overlays can be included in aspects of the disclosure. For instance, in another example, when the user is viewing images related to the cooked or cooking of the graphical layer 687, such as the steak image 688, the HMI 116 or system controller 356 can overlay the image with additional or alternative overlays indicating preferred cooking presentations. For instance, as shown in FIG. 34C, a set of steam "streams" 697 or overlays can be overlain on the image 688 to indicate an example cooked item. In another non-limiting instance, the set of steam streams 697 or overlay can include a moving graphics, videos, or the like. Additionally, the amount of quantity of "streams" 697 can be varied based on cooking cycle of operation selections (e.g. longer cooking results in additional streams 697).

It will be understood that the overlays described herein can match or conform to the identified, recognized, or selected food item, or wherein the system controller 356 modifies or tailors a generic overlay graphic or video to match a food item. In another non-limiting example, the overlays can be layered on top of an actual image of the food item, such as an image captured by the camera 342. In yet another non-limiting example, the graphical or video overlays are transmitted by the system controller 356 to the HMI 116 for display, or are transmitted from at least one of the oven 10 or a cloud-based database. Additionally, the graphical or video overlays can include layered aspects related to a rare done food item, medium done food item, well done food item, grill marks, bake, broil, steam, or a combination thereof.

FIGS. 35A and 35B illustrate a set of HMI 116 interfaces for capturing feedback from the user after a cooking cycle of operation has been concluded. As shown by FIG. 35A, the HMI 116 can include an image and description of the food item cooked (shown as steak 688), and a feedback input 615, allowing for a user to input positive (thumbs up) or negative (thumbs down) feedback to the oven 10 or oven system 620. While binary feedback is shown, any number of feedback inputs (sliding scale, numerical scale, etc.) are envisioned. The HMI 116 can also include a button to avoid, ignore, or otherwise not provide feedback by the user ("remind me later" 616). If the user selects the "remind me later" 616 button, the oven system 620 can query the user at another time. FIG. 35B illustrates another HMI 116 interface, upon selection of the feedback input 615. The HMI 116 can ask additional questions to further determine where the user's feedback originates or relates to. For example, the HMI 116 can ask a set of specific feedback questions 618 beyond the positive or negative feedback input 615 to attempt to identify a user preference, oven 10 operation consistency, that oven 10 maintenance is needed, or the like. The oven 10 or oven system 620 can further store the feedback, and operate further cooking cycles of operation based on the received feedback. For example, through feedback, the oven 10 can adjust user preferences or cooking cycle of operation preferences, phases, sub-cycles, or the like, in order to better prepare food items based on the user's preferences, as expressed through the feedback inputs 615, 618.

Figure 36:
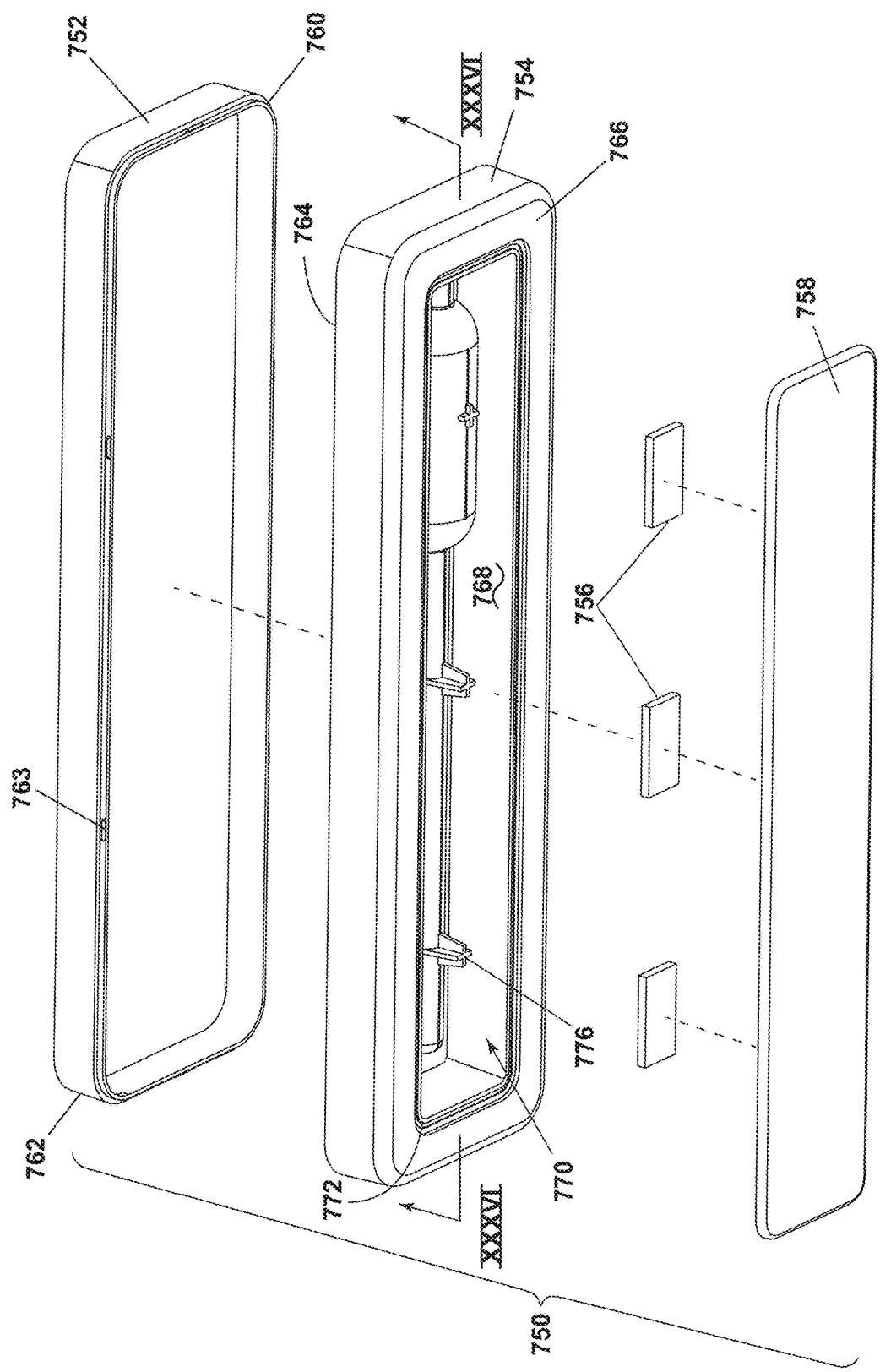
FIG. 36 is an exploded bottom perspective view of a temperature probe storage assembly for storing the temperature probe when not in use.

Turning attention to the temperature probe 196, FIG. 36 illustrates an exploded bottom perspective view of a temperature probe storage assembly 750 for storing the temperature probe 196 when not in use. The temperature probe storage assembly 750 comprises a top cover 752, a storage housing 754, one or more magnets 756, and a bottom cover 758. While the top cover 752, storage housing 754, magnets 756, and bottom cover 758 are illustrated herein as separate parts, it will be understood that the parts can be coupled with or integrated with one another in any suitable combinations to form the overall temperature probe storage assembly 750.

The top cover 752 includes a ridge 760 extending from a peripheral edge 762. The storage housing 754 has a top side 764 defining a peripheral opening in which the ridge 760 is received to index the position of the top cover 752 with the storage housing 754. The ridge 760 can optionally include one or more snap members 763 or alternatively, the snap member 763 can be a single snap member formed along the entirety of the ridge 760. The snap members 763 snap-fit with the top side 764 to secure the top cover 752 to the storage housing 754. Alternately or additionally, the top cover 752 can have a friction or interference fit to the storage housing 754.

The storage housing 754 includes a bottom side 766 having a bottom cavity 768 with a cavity opening 770 that can be closed with the bottom cover 758. The cavity opening 770 includes a peripheral ledge 772 configured to receive the bottom cover 758. The bottom cover 758 can be removably or fixedly attached to the storage housing 754 with a snap-fit connection or one or more fasteners fastener, such as screws or adhesive. The bottom cavity 768 can include one or more bracing elements 776 extending from the storage housing 754 into the bottom cavity 768.

The one or more magnets 756 can be provided in the bottom cavity 768. While the one or more magnets 756 are illustrated as three magnets provided in the bottom cavity 768, alternatively the one or more magnets 756 can be integrally formed with the bottom cover 758, or in any suitable configuration in which to magnetize at least a portion of the bottom cover 758 or bottom side 766 of the storage housing 754.

Figure 37:
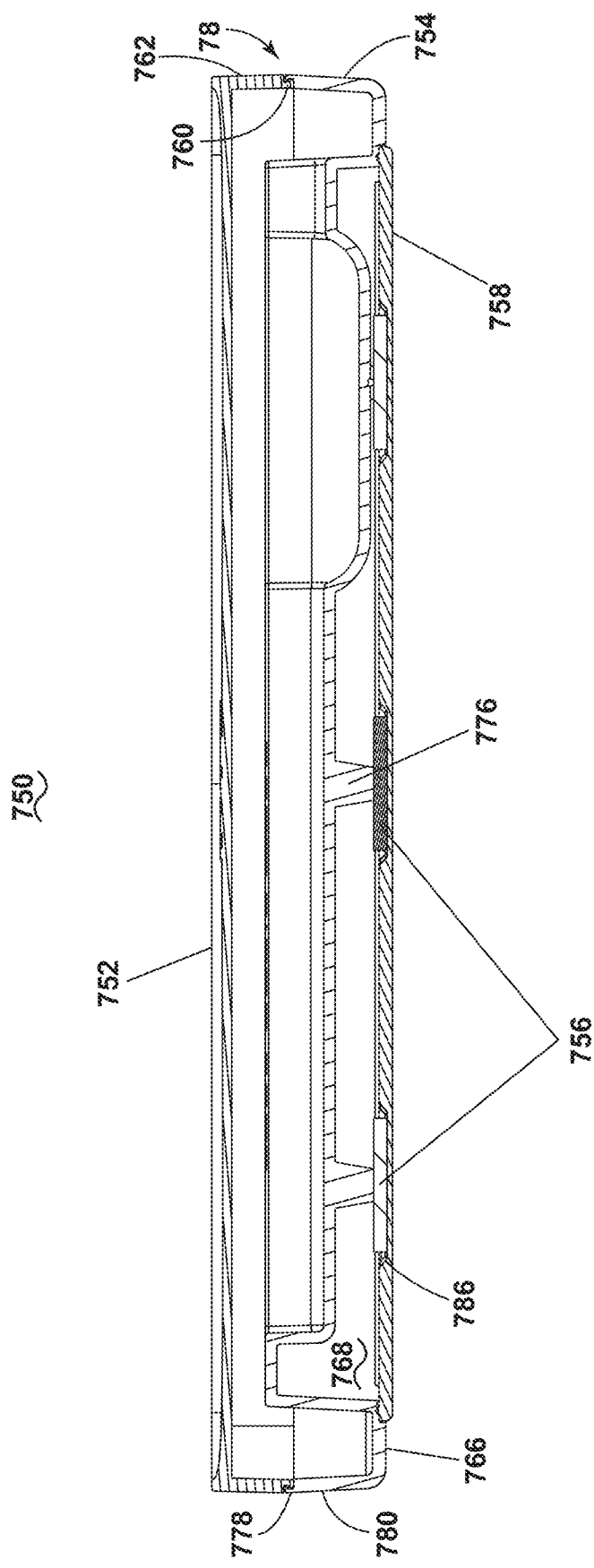
FIG. 37 is a cross sectional view of the assembled temperature probe storage assembly of FIG. 36 along the line XXXVI-XXXVI.

FIG. 37 is a cross-sectional view of the assembled temperature probe storage assembly 750 along the line XXXVI-XXXVI of FIG. 36 where the connection of the top cover 752 and bottom cover 758 to the storage housing 754 is better illustrated. As can be seen, the storage housing 754 can include a second ridge 778 extending from a peripheral edge 780 and complimentary in shape to the first ridge 760. The top cover 752 is removably attached to the storage housing 754 by a snap-fit connection 782 formed by a pair of complementary flanges. While a snap-fit connection 782 is illustrated, other types of connections are contemplated and include a spring finger, hinged, latched or magnetic.

The bottom cover 758 includes one or more recesses 786 corresponding to the number of magnets 756 in the temperature probe assembly 750. The one or more recesses 786 are configured to receive the one or more magnets 756 provided in the bottom cavity 768. Each of the bracing elements 776 extend into the bottom cavity 768 a suitable distance in which to support the magnet 756 in the recess 786.

Figure 38:
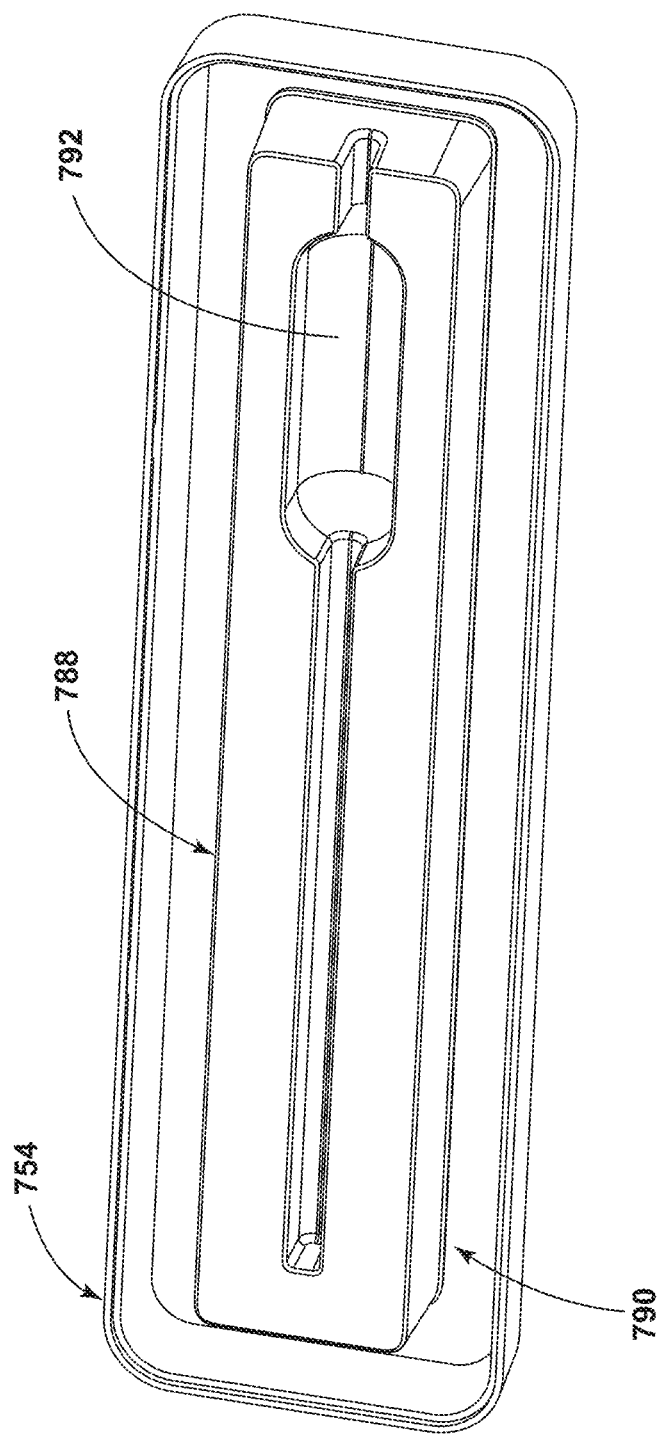
FIG. 38 is a top perspective view of the temperature probe storage assembly of FIG. 36 with a top cover removed and the temperature probe removed.

FIG. 38 illustrates the storage housing 754 of the temperature probe storage assembly 750 with the top cover 752 removed. The storage housing 754 includes a probe receiver 788 surrounded by a cord guide in the form of a channel 790. While illustrated as having generally flat sides, the cord guide can alternatively include recessed outer walls and optionally include cord locking features such as clips or spring fingers. The probe receiver 788 includes a probe seat 792 formed from a recess in the probe receiver 788. The probe seat 792 is complementary in shape to at least a portion of the temperature probe 196 and configured to complementarily receive at least a portion of the temperature probe 196. While the probe receiver 788 is illustrated as generally rectangular in shape, it will be understood that the shape of the probe receiver 788 can be any shape suitable to accommodate the temperature probe 196 for storage in the temperature probe storage assembly 750.

Figure 39:
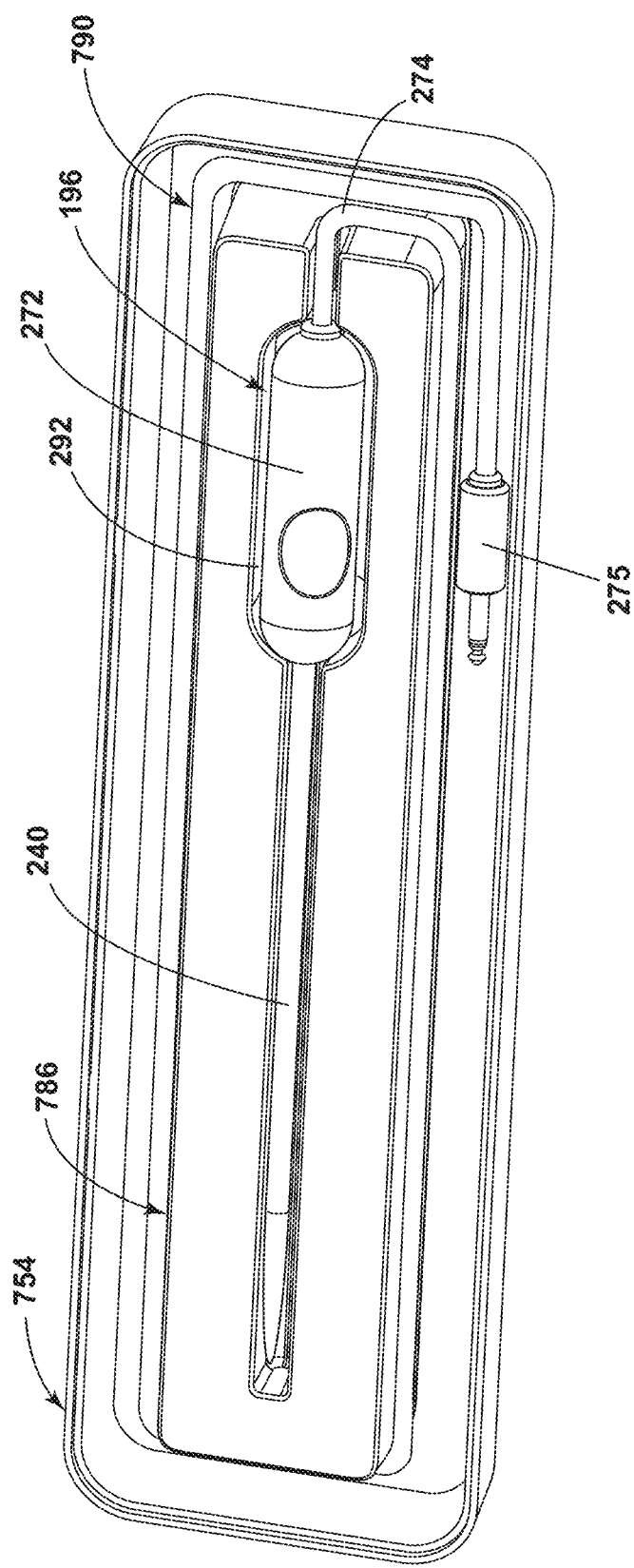
FIG. 39 is the same as FIG. 38, but with the temperature probe.

FIG. 39 illustrates the temperature probe 196 seated in the temperature probe storage assembly 750 with the top cover 752 removed. The probe 240, processor 272, and a portion of the cord 274 are received in the probe seat 792. The remainder of the cord 274 can be wrapped around the channel 790 in either a clockwise or counter clockwise direction. The plug 275 can be seated in the channel 790, or optionally, the probe receiver 788 can further include a plug seat in which to receive the plug 275. Alternatively, the plug 275 can be received by a catch feature in the channel 790 of the storage housing 754. While illustrated as having a generally flat surface, the channel 790 can alternatively include a recess in which the cord 274 can be recessed while stored.

Figure 40:
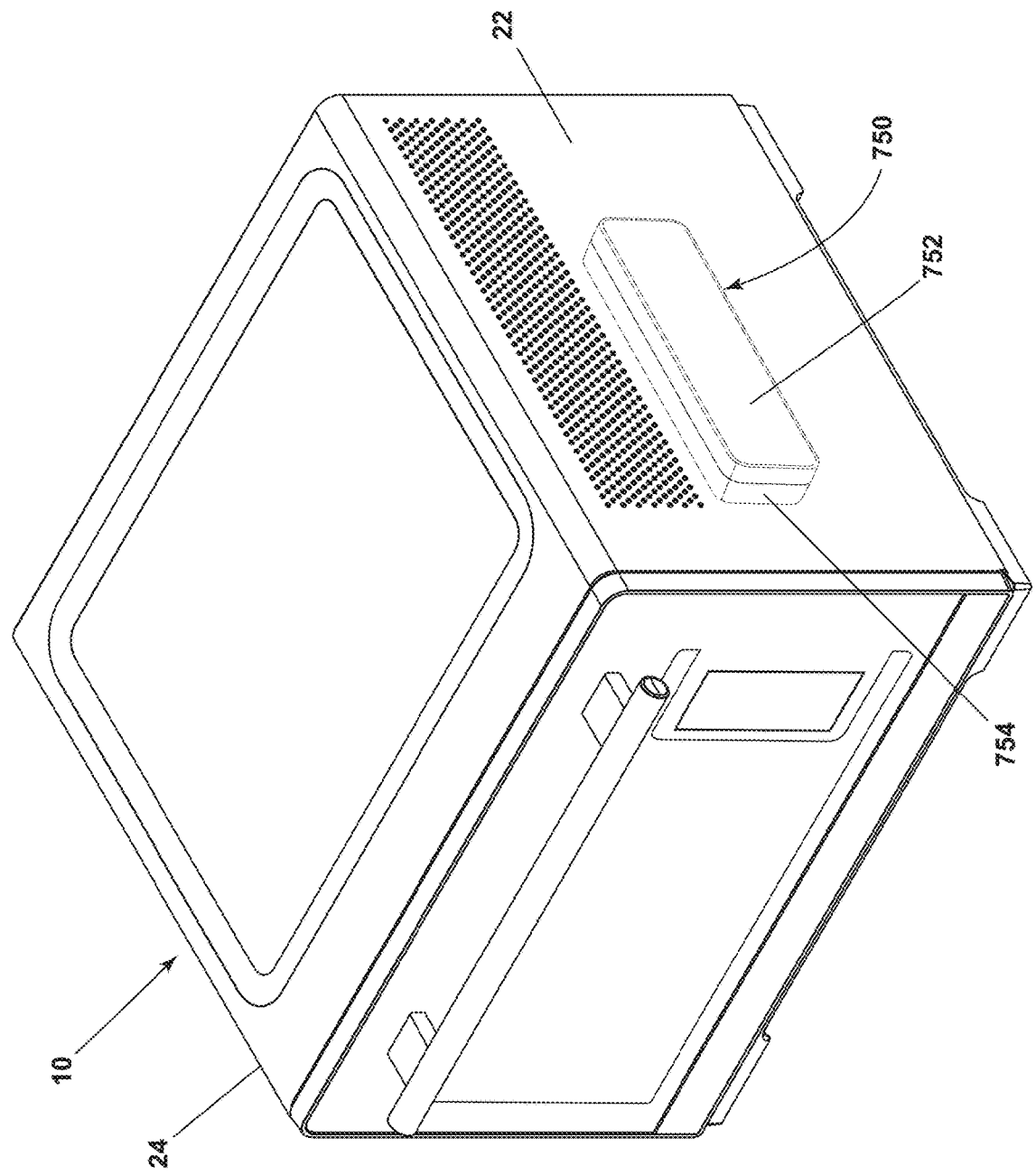
FIG. 40 is a side perspective view of the oven of FIG. 1 with the temperature probe storage assembly of FIG. 36 magnetically attached.

FIG. 40 illustrates the temperature probe storage assembly 750 magnetically affixed to the right side wall 24 of the automatic oven 10. Additionally, the temperature probe storage assembly 750 can be magnetically affixed to the left side wall 24 or any other exterior surface of the automatic oven 10 capable of magnetization.

Alternatively, the temperature probe storage assembly 750 can be releasably affixed to any exterior surface of the automatic oven 10 without the use of magnets 756. For example, the bottom cover 758 can be permanently affixed to one of the side walls 22, 24 such that the temperature probe storage assembly 750 can optionally be removed via a releasable snap-fit, interference fit, or friction fit assembly adjoining the bottom cover 758 to the storage housing 754. Further, the temperature probe storage assembly 750 can be permanently affixed to one of the side walls 22, 24 via permanently attaching the bottom cover 758 and/or the storage housing 754 to one of the side walls 22, 24 or any other suitable exterior surface of the automatic oven 10. Further still, the temperature probe storage assembly 750 can be configured with or without magnets 756 and stored separately from the automatic oven 10 entirely.

Figure 41:
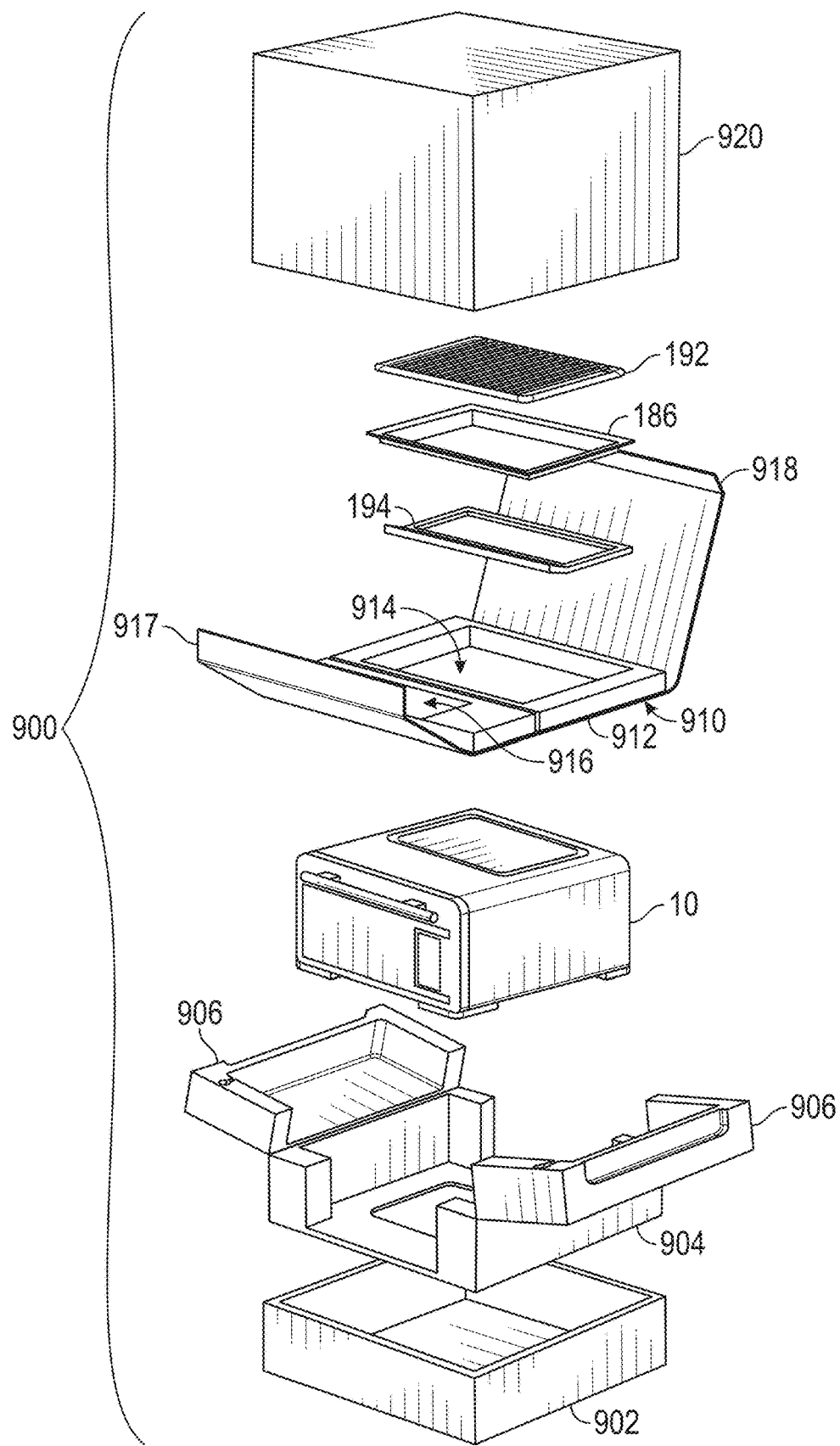
FIG. 41 is an exploded view of a packaging assembly for the oven of FIG. 1 and illustrating the major elements of an upper carton, an accessory box, a set of side cushions, and a lower carton.

FIG. 41 is an exploded view of a packaging assembly 900 within which the oven 10 can be packaged for storage, shipping, display at a point of sales, and transport to a user's location. The packaging assembly 900 comprises a lower carton 902, a lower cushion 904, a set of side cushions 906, an accessory box 910, and an upper carton 920. While the packaging assembly 900 is illustrated herein as having a square profile, it will be understood that the packaging assembly 900 can have any suitable shape such that the oven 10 can be entirely received within the packaging assembly 900.

The lower carton 902 can be formed from a material having sufficient rigidity to support the weight of the oven 10, such as, by way of non-limiting example, a paperboard material, which can optionally be corrugated. While the lower carton 902 is illustrated herein as having a reduced height compared to the upper carton 920, it will be understood that the lower carton 902 can have any suitable height, up to and include a height equal to or greater than the height of the upper carton 920. The lower carton 902 can also be provided with perforations, lines of weakness, portions of reduced thickness, or scored portions that would allow the sides to be opened or folded down.

The lower cushion 904 can be shaped and sized such that the lower cushion 904 can at least partially nest within and be received by the lower carton 902. The lower cushion 904, as well as the set of side cushions 906, can be formed of a shock absorbing material that can protect and cushion the oven 10 during storage and shipping. By way of non-limiting example, the lower cushion 904 and the set of side cushions 906 can be formed of a foam, such as an expanded polystyrene (EPS) or an expanded polyethylene (EPE) foam, which may or may not be laminated, and can be any suitable color, such as black or white. The lower cushion 904 and the set of side cushions 906 can include a variety of additional features, such as, but not limited to, recesses for receiving accessories and/or packaging materials, or logos and text messages to be displayed to the user.

The set of side cushions 906 can be detachably or pivotably coupled to the lower cushion 904 about a line of weakness 908. It will be understood that, in addition to or in place of the line of weakness 908, the set of side cushions 906 can be detachably or pivotably coupled to the lower cushion 904 by perforations, portions of reduced thickness, or scored portions. In an initial or an upright condition (FIG. 43), the set of side cushions 906 can be provided generally perpendicular to the lower cushion 904, with the line of weakness 908 intact. As illustrated, the set of side cushions 906 can occupy a folded down condition relative to the lower cushion 904. In the folded down condition, the set of side cushions 906 can pivot about the line of weakness 908 relative to the lower cushion 904, with the line of weakness 908 allowing the pivoting movement of the set of side cushions 906, but not allowing the set of side cushions 906 to be completely detached from the lower cushion 904. Alternately, the line of weakness 908 can be configured to sever completely when the set of side cushions 906 are pivoted relative to the lower cushion 904, causing the set of side cushions 906 to detach from the lower cushion 904. In yet another example, the set of side cushions 906 and the lower cushion 904 can be provided as separate pieces that are positioned adjacent one another but are not connected.

The accessory box 910 comprises an accessory box body 912 that defines an accessory recess 914 and a temperature probe recess 916. The accessory box 910 can further comprise a front flap 917 and a rear flap 918. The front flap 917 can be positioned and configured to fold over and prevent access to the temperature probe recess 916 when the accessory box 910 is in a closed condition. The rear flap 918 can be positioned and configured to fold over and prevent access to at least the accessory recess 914 when the accessory box 910 is in the closed condition. It will be understood that the rear flap 918 can cover only the portion of the accessory box 910 that includes the accessory recess 914, or the rear flap 918 can cover both the accessory recess 914 and cover at least a portion of the front flap 917.

A variety of accessories associated with the oven 10 can be received within the accessory recess 914. In one non-limiting example, the crumb pan 194, the baking sheet 186, and the baking rack 192 can be stacked and/or nested with one another to fit within the accessory recess 914. The accessory box 910 can be formed from, by way of non-limiting example, corrugated paperboard, a foam such as EPS, or a mixture of corrugated paperboard and EPS foam. The accessory box 910 can rest on top of the set of side cushions 906 when the packaging assembly 900 is in a fully assembled and unopened condition.

The upper carton 920 can be shaped and sized such that it can fit over and at least partially receive within it the lower carton 902, the lower cushion 904, the set of side cushions 906, and the accessory box 910. The upper carton 920 can cover only a portion of the height of the lower carton 902, or the upper carton 920 can cover the entire height of the lower carton 902. Optionally, the upper carton 920 can also include handles (not shown), which can be provided as, for example, through openings, indentations, or a liftable or pull-tab handle in the upper carton 920 to allow a user to easily grip the upper carton 920 for removing the upper carton 920 from the lower carton 902.

Figure 42:
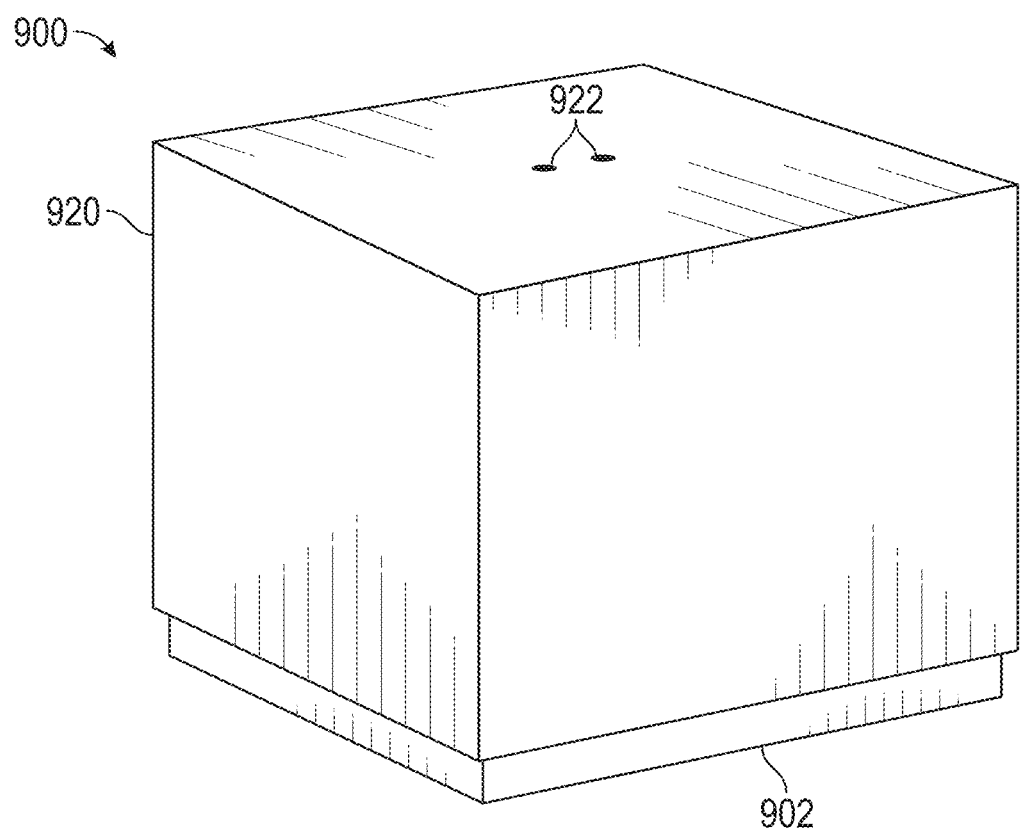
FIG. 42 is a perspective view of the packaging assembly of FIG. 41 in an unopened condition.

FIG. 42 illustrates a perspective view of the packaging assembly 900 in the unopened condition. The lower carton 902 is at least partially received within and covered by the upper carton 920. The upper carton 920 can further include at least one vent opening 922. The at least one vent opening 922 can prevent an air lock from occurring within the packaging assembly 900, ensuring that a user can lift the upper carton 920 off with ease. The at least one vent opening 922 can be provided at any suitable position within the upper carton 920. While the upper carton 920 is illustrated herein as sliding downwardly over the lower carton 902, it will be understood that alternate configurations are contemplated. By way of non-limiting example, the upper carton 920 could slide sideways over the lower carton 902, or the upper carton 920 could be pivoted or folded downwardly over the lower carton 902. In addition, locking features, such as detents, can be provided with the lower carton 902 and the upper carton 920 to ensure the packaging assembly 900 is durably maintained in the unopened condition until unpackaging by a user.

Figure 43:
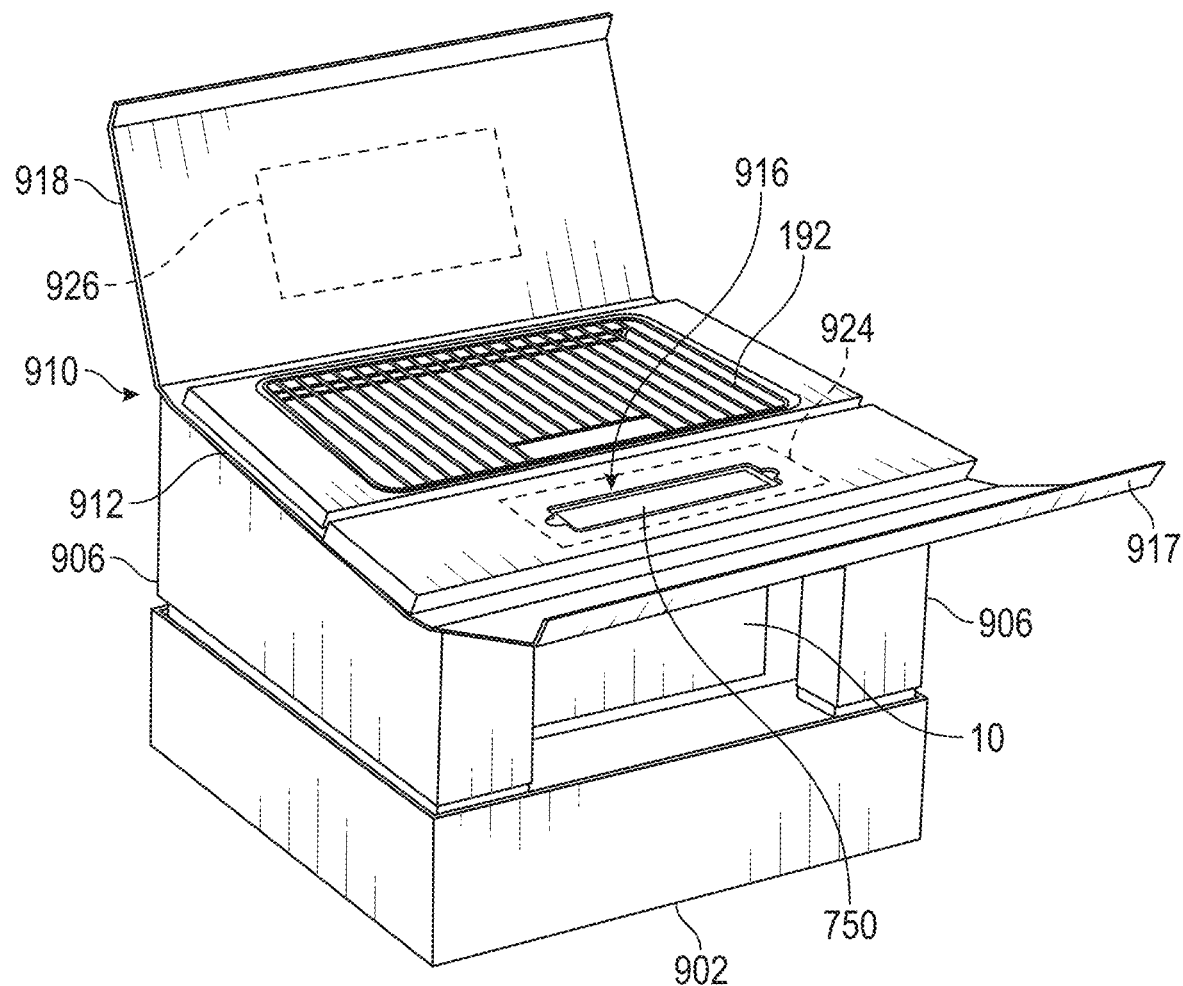
FIG. 43 is a perspective view of the packaging assembly of FIG. 42 with the upper carton removed and the accessory box in a partially opened condition.

FIG. 43 illustrates the packaging assembly 900 in a partially opened condition, with the upper carton 920 removed. In this partially opened condition, the set of side cushions 906 are in the upright position and generally perpendicular to the lower cushion 904 and to the lower carton 902. The oven 10 is provided within the packaging assembly 900 such that it rests on top of and is received by the lower cushion 904 and the lower carton 902, and is also received and partially surrounded by the set of side cushions 906.

The accessory box 910 can rest on top of the set of side cushions 906. In this view, the accessory box 910 is shown in an opened condition. A welcome card 924 can be included with the accessory box 910. By way of non-limiting example, the welcome card 924 can overlie the temperature probe recess 916, though it will be understood that the welcome card 924 can be provided at any suitable location on the accessory box such that it becomes visible to a user during the unpackaging process. The welcome card 924 can be used to provide any suitable message to the user, such as, but not limited to, a welcome, a slogan, or unpackaging or usage instructions. It will also be understood that the welcome card 924 can be provided as a booklet or pamphlet rather than a card, or as an envelope that contains at least a user manual.

The temperature probe storage assembly 750 can be received within the temperature probe recess 916, which can be underneath the welcome card 924 such that the temperature probe storage assembly 750 is exposed to the user when the welcome card 924 is picked up or removed from the accessory box 910. The rear flap 918 can include a text portion 926 that is visible to the user when the rear flap of the accessory box 910 is in the opened condition. The text portion 926 can provide a message to the user, such as a list of the items contained within the accessory box 910.

While the oven accessories are illustrated herein as being received within the accessory box 910, it will be understood that alternate locations for the accessories can be included. For example, the set of side cushions 906 can define recesses for receiving some oven accessories, such as the temperature probe storage assembly 750. Further, the oven accessories can be directly received by the accessory box 910, or the accessories can be provided within bags and then received within the accessory box 910.

Figure 44:
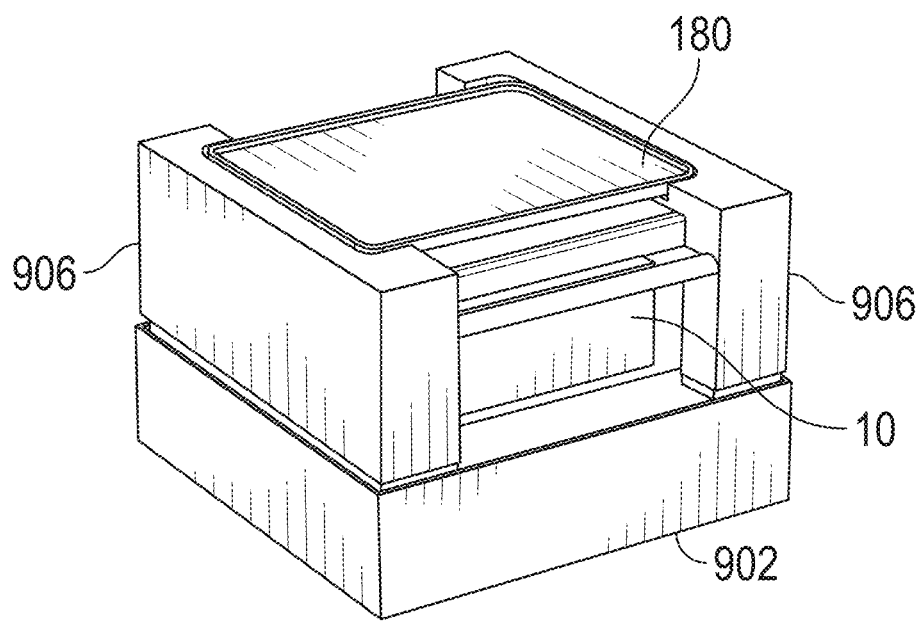
FIG. 44 is a perspective view of the packaging assembly of FIG. 43 with the accessory box removed.

FIG. 44 illustrates the packaging assembly 900 of FIG. 43, further with the accessory box 910 removed. The cutting board 180 or the baking stone 182 can be positioned above the oven 10 and can be placed on top of or received by the set of side cushions 906 for safety during transport. The set of side cushions 906 can support or receive the cutting board 180 when the set of side cushions 906 are in the upright position. The cutting board 180 can be removed from the packaging assembly 900 before the set of side cushions 906 are moved from the upright position.

Figure 45:
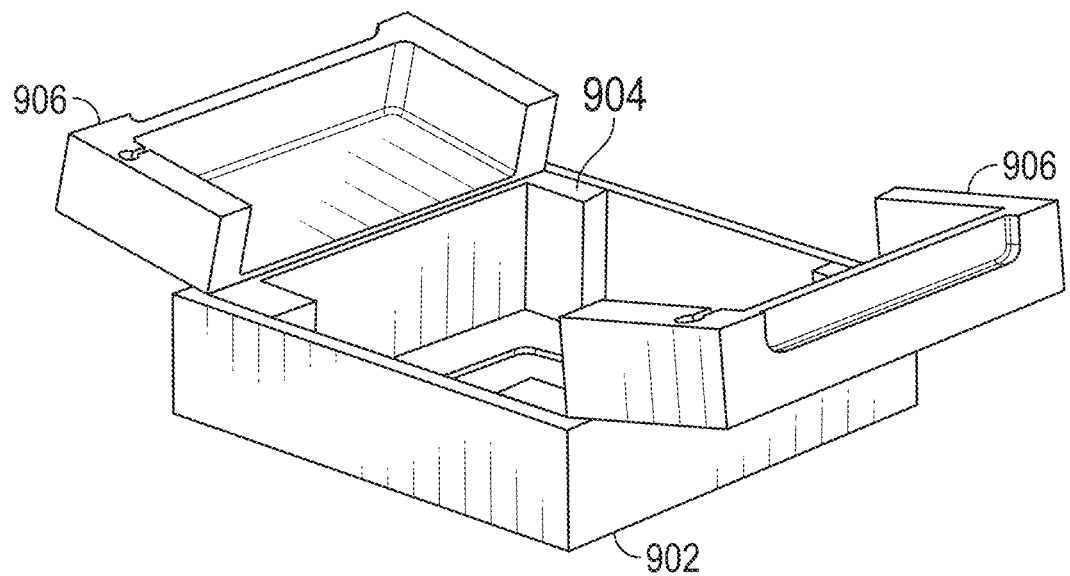
FIG. 45 is a perspective view of the packaging assembly of FIG. 44 with the set of side cushions in a folded down condition.

FIG. 45 illustrates the packaging assembly 900 of FIG. 44, further with the cutting board 180 removed and the set of side cushions 906 pivoted to the folded down condition. When the set of side cushions 906 are pivoted to the folded down condition as shown, or when the set of side cushions 906 are detached or removed completely from the lower cushion 904, improved user access to the oven 10 is allowed. Specifically, it is contemplated that, when the set of side cushions 906 are pivoted or tilted to the folded down condition, a user can then reach the grips 72 in order to lift and remove the oven 10 from the lower cushion 904 and the lower carton 902.

In conventional packaging assemblies for countertop appliances, such as the oven 10, the appliance may be withdrawable only through an open top of, for example, a box. In such a case, the user must reach down into the box a distance corresponding to the entire height of the appliance in order to remove the appliance from the box. Due to the necessary height of withdrawal, this often requires the box to be set on the floor or other low surface and for a user to bend over the box to withdraw the appliance, which can result in user discomfort and ergonomic challenges.

The packaging assembly 900 of the present disclosure allows for the oven 10 to be unpackaged while sitting on, by way of non-limiting example, a countertop or a table, since the height of the lower carton 902 from which the oven 10 can be withdrawn is less than the height of the oven 10. By way of non-limiting example, the height of the lower carton 902 can be less than half of the height of the oven 10, optionally less than one third of the height of the oven 10, and further optionally less than one quarter of the height of the oven 10. In this way, user comfort and ergonomic satisfaction during the unpackaging process can be improved as compared to conventional removal of countertop appliances through an open top of a box having a height greater than or equal to the height of the countertop appliance.

Figure 46:
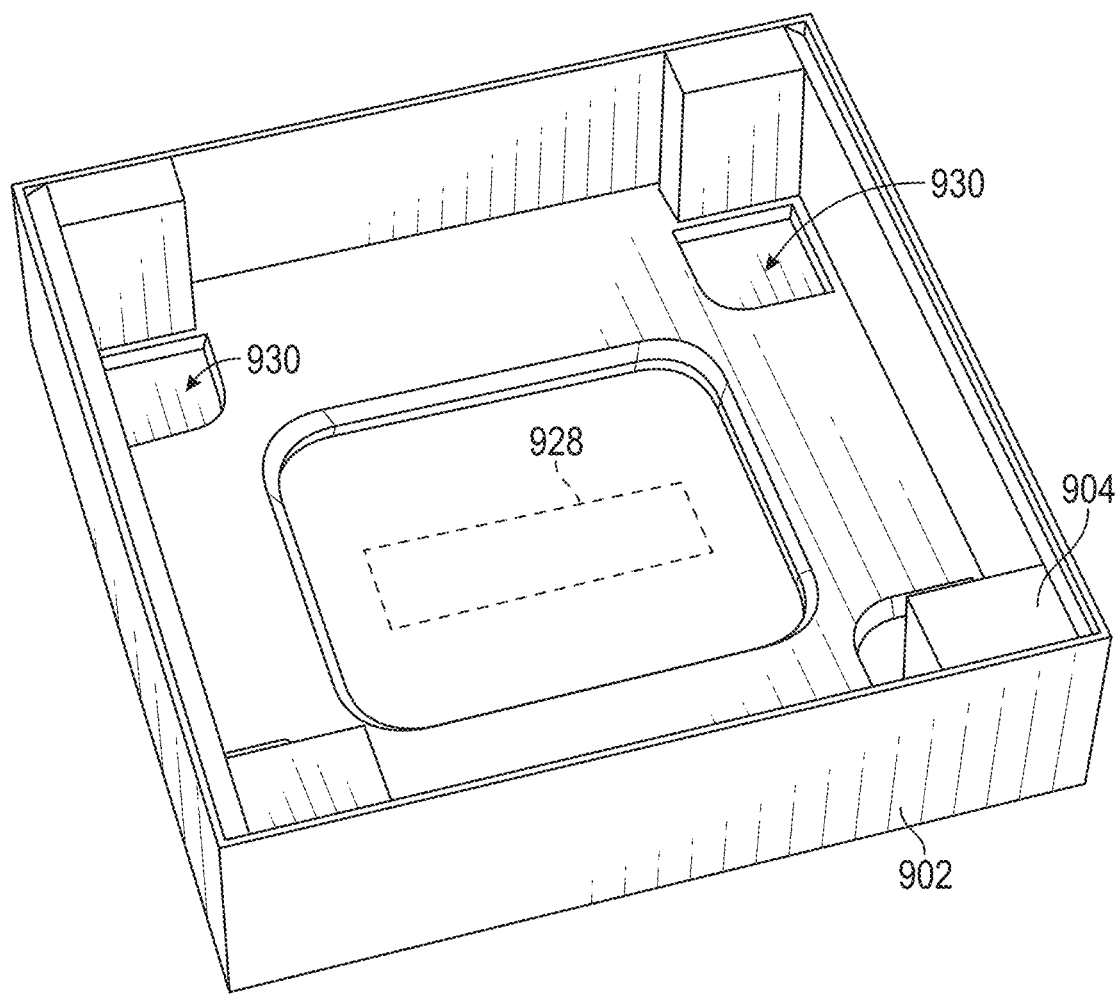
FIG. 46 is a perspective view of the packaging assembly of FIG. 45 with the oven removed and the lower carton exposed.

FIG. 46 shows a perspective view with the oven 10 removed of the lower carton 902 and the lower cushion 904 received within the lower carton 902. The lower cushion 904 can define foot recesses 930 that are shaped and positioned so as to receive the plurality of feet 66 of the oven 10. By having the plurality of feet 66 received within the foot recesses 930, side-to-side and front-to-back shifting of the oven 10 within the packaging assembly 900 can be restricted or prevented. The lower carton 902 can further include a lower carton text portion 928 for displaying a text message to the user. By way of non-limiting example, such a message can include a thank you to the user or a congratulatory message.

While the various aspects of the disclosure are described in the environment of a table-top oven, the various aspects have applicability to any type of cooking device, including, without limitation, a built-in oven, a range with oven, a microwave, a toaster oven, and other any other cooking appliances or platforms.

The invention claimed is:

1. A method of cooling a cooking appliance having a cabinet including an insert within the cabinet to define a cooking chamber with an access opening and a door selectively closing/opening the access opening, the method comprising at least two of:
    flowing cooling air through a back wall of the cabinet, over a top wall of the insert, and out a side wall of the cabinet to define a first cooling flow path;
    flowing cooling air through a bottom wall of the cabinet, along the bottom wall of the cabinet, and out a side wall of the cabinet to define a second cooling flow path; and
    flowing cooling air through a bottom wall of the cabinet, out a front wall of the cabinet, into the door, out of the door, into a front wall of the cabinet, and out of a side wall of the cabinet to define a third cooling flow path.

2. The method of claim 1 wherein the at least two of the first cooling flow path, the second cooling flow path, and the third cooling flow paths are fluidly isolated from each other.

3. The method of claim 1 wherein the first and second cooling flow paths flow out different side walls of the cabinet.

4. The method of claim 1 wherein the first and second cooling flow paths flow out a common vent in a same side wall.

5. The method of claim 1 wherein the first cooling flow path flows over a sensor assembly.

6. The method of claim 1 wherein the second cooling flow path flows over a controller.

7. The method of claim 1 wherein the third cooling flow path flows over a human machine interface (HMI).

8. The method of claim 7 wherein the HMI is located in the door.

9. A cooking appliance having a cabinet including an insert within the cabinet to define a cooking chamber with an access opening and a door selectively closing/opening the access opening, the cooking appliance comprising at least two of:
    a first cooling flow path through a back wall of the cabinet, over a top wall of the insert, and out a side wall of the cabinet;
    a second cooling flow path through a bottom wall of the cabinet, along the bottom wall of the cabinet, and out a side wall of the cabinet; and
    a third cooling flow path through a bottom wall of the cabinet, out a front wall of the cabinet, into the door, out of the door, into a front wall of the cabinet, and out of a side wall of the cabinet.

10. The cooking appliance of claim 9 wherein the first, second, and third cooling flow paths are fluidly isolated from each other.

11. The cooking appliance of claim 9 wherein the first and second cooling flow paths flow out different side walls of the cabinet.

12. The cooking appliance of claim 9 wherein the first and second cooling flow paths flow out a common vent in a same side wall.

13. The cooking appliance of claim 9 wherein the first cooling flow path flows over a sensor assembly.

14. The cooking appliance of claim 9 wherein the second cooling flow path flows over a controller.

15. The cooking appliance of claim 9 wherein the third cooling flow path flows over a human machine interface (HMI).

16. The cooking appliance of claim 15 wherein the HMI is located in the door.

17. The cooking appliance of claim 9, further comprising at least one fan for generating an air flow flowing through each of the at least two of the first cooling flow path, the second cooling flow path, and the third cooling flow path.

18. The cooking appliance of claim 9 further comprising at least one deflector defining the at least two of the first cooling flow path, the second cooling flow path, and the third cooling flow path.

19. The method of claim 1, wherein the method comprises flowing cooling air through each of the first cooling flow path, the second cooling flow path, and the third cooling flow path.

\* \* \* \* \*